PROJECTION TYPE VIDEO DISPLAY UNIT AND ILLUMINATING DEVICE

(12) United States Patent
Taoka et al.

(10) Patent No.: US 7,465,053 B2
(45) Date of Patent: Dec. 16, 2008

(54) PROJECTION TYPE VIDEO DISPLAY UNIT AND ILLUMINATING DEVICE

(75) Inventors: Mineki Taoka, Osaka (JP); Haruhiko Murata, Osaka (JP); Toshiya Iinuma, Osaka (JP); Koji Ishii, Osaka (JP); Kazuki Hashizumi, Hyogo (JP); Kazuhiro Arai, Osaka (JP); Hideyuki Kanayama, Kyoto (JP); Takashi Ikeda, Osaka (JP); Shouichi Yoshii, Osaka (JP); Yoshihiro Yokote, Osaka (JP); Yasuo Funazou, Nara (JP)

(73) Assignee: Sanyo Electric Co., Ltd., Osaka (JP)

( * ) Notice: Subject to any disclaimer, the term of this patent is extended or adjusted under 35 U.S.C. 154(b) by 605 days.

(21) Appl. No.: 10/509,516

(22) PCT Filed: Mar. 26, 2003

(86) PCT No.: PCT/JP03/03751

§ 371 (c)(1),
(2), (4) Date: May 10, 2005

(87) PCT Pub. No.: WO03/083573

PCT Pub. Date: Oct. 9, 2003

(65) Prior Publication Data

US 2005/0213045 A1    Sep. 29, 2005

(30) Foreign Application Priority Data

| Mar. 28, 2002 | (JP) | 2002-091926 |
| Oct. 8, 2002 | (JP) | 2002-295354 |
| Mar. 14, 2003 | (JP) | 2003-070930 |
| Mar. 17, 2003 | (JP) | 2003-072158 |
| Mar. 17, 2003 | (JP) | 2003-072159 |

(51) Int. Cl.
*G03B 21/14* (2006.01)
*H04N 9/64* (2006.01)

(52) U.S. Cl. .................................. 353/31; 348/744

(58) Field of Classification Search ......... 348/743–745; 353/31, 33, 81
See application file for complete search history.

(56) References Cited

U.S. PATENT DOCUMENTS 4,292,602 A * 9/1981 Bergqvist .................. 372/108

(Continued)

FOREIGN PATENT DOCUMENTS

JP    09-325715    12/1997

(Continued)

OTHER PUBLICATIONS

Chinese Office Action issued in Chinese Patent Application No. CN 038072467, mailed Feb. 1, 2008.

*Primary Examiner*—Paulos M Natnael
(74) *Attorney, Agent, or Firm*—McDermott Will & Emery LLP

(57) ABSTRACT

A lens array wheel 4 receives light irradiated in a direction parallel to its rotation axis, to cyclically deflect the light. On each of liquid crystal display panels 7R, 7G, and 7B, the light is circularly scrolled, the effect of substantial intermittent illumination is produced, and hold blurring is reduced. A panel driver 15 starts to feed a pixel-driving signal in the succeeding frame to a pixel existing at a position, through which an illuminating area passes, on each of the liquid crystal display panels 7R, 7G, and 7B.

44 Claims, 60 Drawing Sheets

U.S. PATENT DOCUMENTS

| | | | |
|---|---|---|---|
| 5,121,137 A * | 6/1992 | Taki et al. | 347/232 |
| 5,463,468 A * | 10/1995 | Takanashi et al. | 358/296 |
| 6,324,330 B1 * | 11/2001 | Stites | 385/133 |
| 6,674,415 B2 * | 1/2004 | Nakamura et al. | 345/32 |
| 6,827,450 B1 * | 12/2004 | McGettigan et al. | 353/31 |
| 6,910,775 B2 * | 6/2005 | Imahase et al. | 353/31 |
| 7,061,512 B2 * | 6/2006 | Morgan et al. | 345/691 |
| 7,168,811 B2 * | 1/2007 | Kojima | 353/81 |
| 7,185,986 B2 * | 3/2007 | Taoka et al. | 353/31 |

FOREIGN PATENT DOCUMENTS

| | | |
|---|---|---|
| JP | 11-109921 | 4/1999 |
| JP | 2000-194067 | 7/2000 |
| JP | 2001-174913 | 6/2001 |
| JP | 2001-235720 | 9/2001 |
| JP | 2001-296841 | 10/2001 |
| JP | 2001-605484 | 10/2001 |
| JP | 2002-6815 A | 1/2002 |
| WO | WO 00/60397 | 10/2000 |
| WO | WO 02/086617 A2 | 10/2002 |

* cited by examiner (a)

TIME t

LINE OF SIGHT MOVES (b)

POSITION OF LINE OF SIGHT FOR EACH MOMENT

PICTURE WHICH SEEMS TO GO BACK REMAINS IN VISION

⇩

RECOGNIZE AS BLURRED PICTURE BY INTEGRATION

TIME t (a)

(b)

(a)

CASE OF CRT

TIME t $$I(t) = \int_{t=T}^{t=T+\tau} i(t)\,dt$$

(b)

i(t)          I(t)

INTEGRATE (a)

CONVENTIONAL TECHNOLOGY (CASE OF DIRECT VIEW-TYPE)

$$I(t) = \int_{t=T}^{t=T+\tau} i(t)\,dt$$

(b)

(a)

(b)

(c)

(a)

PERIOD OF ONE FRAME
PERIOD OF TWO FRAME (b)

PERIOD OF ONE FRAME
PERIOD OF TWO FRAME (a)

(b)

(a)

(b)

(c)

(a)

(b)

(c)

(a)

(b)

(a)

(b)

(a)

A

| 106 | 103 | 101 | 100 | 102 | 105 | 108 | 107 |
| --- | --- | --- | --- | --- | --- | --- | --- |
| 104 | 102 | 99  | 97  | 98  | 102 | 103 | 105 |
| 102 | 100 | 99  | 98  | 99  | 100 | 100 | 103 |
| 103 | 104 | 100 | 100 | 101 | 100 | 101 | 104 |
| 100 | 103 | 102 | 103 | 104 | 103 | 105 | 102 |
| 98  | 100 | 99  | 98  | 96  | 99  | 100 | 99  |

(b)

B

| 104 | 102 | 100 | 99  | 100 | 103 | 106 | 104 |
| --- | --- | --- | --- | --- | --- | --- | --- |
| 102 | 100 | 99  | 96  | 99  | 100 | 101 | 105 |
| 99  | 101 | 102 | 103 | 100 | 103 | 101 | 101 |
| 100 | 99  | 102 | 105 | 104 | 107 | 106 | 103 |
| 99  | 102 | 103 | 105 | 106 | 102 | 100 | 102 |
| 95  | 99  | 99  | 97  | 96  | 101 | 100 | 101 |

ADJUST LUMINANCE IN EACH AREA BASED ON MINIMUM VALUE (a)

CORRECT LUMINANCE BY SIGNAL PROCESSING (b)

(a)

(b)

(a) ODD FIELD (b) EVEN FIELD

STRIPE WIDTH : A>B (a)

(b)

PROJECTION TYPE VIDEO DISPLAY UNIT AND ILLUMINATING DEVICE

TECHNICAL FIELD

The present invention relates to a projection type video display and an illuminating device.

BACKGROUND ART

Displays such as a liquid crystal display panel (LCD), a digital micro mirror device (DMD), and a plasma display panel (PDP) are referred to as hold type displays. This means that a cathode-ray tube (CRT) provides impulse-type image output, while the LCD or the like maintains its image output state until the subsequent image is outputted, as shown in FIG. 1. On such hold type displays, when moving images are displayed, the images become unclear, unlike those on the CRT.

It has been conventionally considered that in a case where moving images are displayed, degradation in their image qualities is due to delay in a response to display by a display device. As studies on vision have proceeded in recent years, the response speed of the display device has been improved. Therefore, it has been found that even if the display device responds instantaneously, some degree of degradation in image qualities cannot be avoided. Such degradation in image qualities is referred to as hold blurring.

The hold blurring is due to a cumulative effect in a visual information processing system of human beings, and is a phenomenon which does not occur on an impulse output type display device such as a CRT, as shown in FIG. 2. A human being follows, when he or she observes a moving image, an object in the moving image with his or her eyes. At this time, the following speed of the eyeball cannot be rapidly changed. In a normal refresh period (17 ms) of the moving image, therefore, the eyeball moves at an approximately constant speed. In a hold type display device, however, the same image is displayed in a predetermined period (17 ms) at the same position, as shown in FIGS. 3 and 4(a). Therefore, the displayed image goes back relative to the position of the line of sight, so that an image with retreat movement is projected on the retina, as shown in FIGS. 4(b) and 5(a).

However, these occur in the preceding stage of the visual information processing system. The speed actually recognized is considerably slower than 17 ms. The images are integrated within a predetermined period, as shown in FIG. 5(b), and an image obtained by the integration is recognized as vision, as shown in FIG. 5(b). As a result, the recognized image is such a blurred image that trails which have moved on the retina for a predetermined period are overlapped with each other. The integration period is known as a Bloch's theorem, and is said to be approximately 50 ms to 80 ms. On the other hand, in the case of the CRT, images instantaneously displayed are only integrated, as shown in FIGS. 6(a) and 6(b). Even if the integration is performed by tracking, an image gone back toward the line of sight is not projected on the retina, so that a clear image is recognized.

The most general method of restraining hold blurring is to make the hold type display device analogous to the properties of the CRT. The CRT is an impulse output type display device, so that the above-mentioned problem does not occur. Therefore, the most effective method of improving moving image display characteristics of a hold type display is to perform intermittent display by applying light intermittently to a liquid crystal or a DMD, as shown in FIGS. 7(a) and 7(b) (see JP-A-09-325715: IPC G09F 9/35).

However, an irradiation time period is restricted to approximately 60% in reality. As a result, the luminance of a liquid crystal is also decreased to 60%. It cannot be said that the restriction of the irradiation time period to 60% is sufficient for an improvement in degradation in image qualities by a defect of a hold type display. Naturally, the shorter the irradiation time period is made, the greater the improving effect becomes. However, the rise in cost due to the necessity of a bright backlight, the increase in the size of a power supply or the like, and so on present a great problem.

Such a method is difficult to realize by a liquid crystal projector employing a high-output lamp. The flashing of the lamp heavily damages the lamp and affects the life. Even when light is shuttered, a large part of the shuttered light becomes heat, so that a problem of radiation of heat arises.

There is a method of separating backlights in a direct view type liquid crystal display and scrolling the flashing of each of the backlights to obtain the same effect as that in shuttering (see JP-A-2001-235720: IPC G02F 1/133). This method also has the disadvantages of making it difficult to adjust synchronization and reducing display luminance, similarly to the above-mentioned method. Further, a circuit is increased in size, and the manufacturing cost thereof is significantly increased.

A method of inserting a black level display for each predetermined time period in the case of display on a hold type display has been proposed (see JP-A-11-109921: IPC G09F 9/36). Generally, the predetermined time period corresponds to a refreshment period of a frame. For example, a method of displaying an image during a period of 9 ms in a period of 17 ms and displaying black during the remaining period of 8 ms is employed. When the method is used, the synchronization is stabilized. However, the reduction in the display luminance can not be avoided. In the case of a liquid crystal or the like, a device which is high in response speed is required.

An example of a method of restraining hold blurring other than intermittent display is frame rate conversion. This method presents intermediate image in a period of 17 ms, because blurring is recognized as a result of presentation of the same image in the period in the case of the hold type display. Specifically, 60 images each corresponding to an intermediate part of the image are produced on the basis of original 60 images in outputting 60 Hz images. Then 120 images are displayed as 120 Hz images. As a result, a period during which the same image is presented, which is a cause of hold blurring, is halved. Consequently, the recognized blurring is halved, thereby obtaining clearer images than those in a case where the 60 Hz images are displayed.

However, this method requires some degree of accuracy in the intermediate images. In the current technique, such intermediate images cannot be reliably produced.

With regard to a liquid crystal projector, JP-A-2002-6815 (G09G 3/36) discloses a method of scrolling light onto a panel using a condenser mirror. In a condensing system (a polygonal mirror) herein disclosed, however, light is scrolled by a reflecting function. When a projector is constructed, therefore, an optical system is made significantly large.

In view of the foregoing circumstances, an object of the present invention is to provide a projection type video display capable of improving degradation in image quality, in a case where a moving image is displayed, which is referred to as hold blurring, by scrolling light onto a hold type display element.

DISCLOSURE OF INVENTION

A projection type video display according to the present invention is characterized by comprising light deflecting means for circularly deflecting, in receiving irradiated light and transmitting the received light, the light; color separating means for separating the light into lights in the three primary colors and respectively introducing the lights into three hold type display elements; projecting means for recombining image lights in the respective colors obtained through the hold type display elements and projecting the recombined image lights; and element driving means for feeding a pixel-driving signal to each of the hold type display elements, and characterized in that the amount of light which will be wasted in producing said circular deflection is reduced by utilizing at least one of the functions including condensing. more than twice reflecting. and refracting, and in that each of the lights in the respective colors condensed in smaller areas than those of the element are circularly scrolled on the hold type display elements.

In the above-mentioned configuration, on the hold type display elements, the lights in the respective colors condensed in the smaller areas than those of the elements are circularly scrolled. Therefore, the light is substantially intermittently irradiated onto the hold type display element, thereby making it possible to restrain hold blurring.

The element driving means may start to feed pixel-driving signals for the succeeding frame to pixels which are located at a position, through which an illuminating area passes, on each of the hold type display elements. This makes it easy to match the irradiation period (at the time of display) of scrolling light with the time point where a response of the pixel is completed (the time point where a display target value is attained).

The pixel-driving signal may be fed at N times (N is an integer of 2 or more) of a frame rate, and the timing of illumination of a pixel may be matched with the time when a response of the pixel is flattened out. Here, the response of the pixel is exponentially changed. Therefore, the luminance of the pixel is changed in the irradiation period of the scrolling light, so that a double image is felt. However, the double images due to the luminance change can be reduced by matching the timing of illumination of the pixel with the time when a response of the pixel is flattened out, as described above.

In the above-mentioned configuration in which the response of the pixel is flattened out, a pixel-driving signal whose level is higher than a pixel-driving signal allowing a necessary response value of the pixel to be obtained may be fed to the pixel, to compensate for delay. This makes it possible to also cope with a case where the response speed of the pixel is low. In such a configuration, there may be provided a table which the higher level pixel-driving signal can be found by using the final pixel value in the preceding frame and the current pixel value.

There may be provided control means for detecting a difference between a frame period and a deflection period by the light deflecting means and carrying out correction control of the deflection period such that the difference is eliminated or occurs in a constant manner. This makes it possible to also cope with a case where the rotation precision of the light deflecting means is inconstant.

Such control that the luminance value of the pixel determined by a response of the pixel and a period of light irradiation onto the pixel in a case where the difference occurs is matched with a predetermined luminance value in a case where no difference occurs may be carried out. This makes it possible to overcome lack of response to the luminance change. In such a configuration, a pixel-driving signal set to higher level than the target value of the response of the pixel is fed to the pixel depending on the difference. Alternatively, the timing of feeding of the pixel-driving signal may be controlled depending on the difference.

There may be provided a rod prism for introducing light emitted from a light source with a reflector and condensed into the light deflecting means. The rod prism may have a tapered shape so as to reduce the dispersion of the light.

Used as the light deflecting means may be a lens array wheel having a plurality of functional units each composed of a convex lens arranged in a disc shape along its circumference, a scrolling prism constructed by rotatably providing a prism, a disc member having a light transmitter formed in a spiral shape and having a reflecting surface in an area other than the light transmitter, or a cylindrical member having light transmitters and reflectors alternately formed repeatedly on its surface.

The rod prism may be folded such that the light entrance direction and the light exit direction differ, the light deflecting means may be composed of a cylindrical member having light transmitters and reflectors alternately formed repeatedly on its surface, and the whole or a part of the rod prism may be positioned inside the cylindrical member.

In the configuration having the light transmitter formed in the spiral shape, the disc member may be inclined to the direction of light irradiation, an auxiliary mirror may be provided at a position where light from the reflecting surface of the disc member is received, and the light reflected from the auxiliary mirror may be introduced into the light transmitter in the disc member. The disc member may be composed of a transparent member, and reflecting surfaces may be respectively formed on both surfaces of the transparent member.

In the projection type video display, the light deflecting means may comprise a single spiral light transmitter, and may produce a single scrolling light per rotation driving. In such a configuration, the single scrolling light is produced, so that there occurs no periodic change in light amount in the scrolling light, thereby making it possible to restrain flicker.

In the projection type video display, the light deflecting means may be constructed by putting a first rotating disc having one spiral light transmitter or at least two spiral light transmitters and a second rotating disc having a spiral light transmitter for adjustment corresponding to the spiral light transmitter close together, and there may be further provided a width adjusting mechanism for changing and setting a relative rotation angle between the first rotating disc and the second rotating disc around its rotation axis, to adjust the width of the spiral light transmitter. The width adjustment mechanism may be composed of means for forming a direct or indirect meshed state between the first rotating disc and the second rotating disc and releasing the meshed state, and means for releasing the meshed state after stopping the rotation of the first rotating disc and the second rotating disc, to fix either one of the first rotating disc and the second rotating disc and rotate the other rotating disc. The width adjustment mechanism may be composed of driving means for generating a relative rotation driving force between the first rotating disc and the second rotating disc while maintaining a state where the first rotating disc and the second rotating disc are together rotated.

In the projection type video display, the light deflecting means may comprise at least two light deflecting elements, and may periodically produce at least two different scrolling lights, and there may be further provided video signal correcting means for subjecting the input video signal to luminance value correction corresponding to each of at least the two different scrolling lights for each irradiation period of the scrolling light. This allows, even if at least the two scrolling lights which differ in light amounts are periodically produced, the difference to be resolved by correcting the luminance of the video signal, thereby making it possible to prevent flicker from being produced. In such a configuration, there may be provided means which receives the video signal to control the rotation driving of the light deflecting means in synchronization with a synchronizing signal in the video signal, the video signal correcting means may comprise a plurality of correction tables corresponding to at least the two scrolling lights, the correction table may be selected by phase information in the rotation of the light deflecting means, and an address may be generated on the basis of the synchronizing signal in the video signal, to read out correction data from the selected correction table. Furthermore, the projection type video display may comprise image photographing means, and means for producing a plurality of correction tables on the basis of luminance information in each area at the time of projecting a predetermined image on a screen obtained by the image photographing means and phase information in the rotation of the light deflecting means. The correction table may also serve as a correction table for correcting color nonuniformity.

The projection type video display may comprise means for driving a light source by a pulse which is synchronized with the video signal, and means for controlling the rotation driving of the light deflecting means in synchronization with the video signal. In such a configuration, a periodic change in light amount based on an instantaneous increase in light amount by pulse-driving the light source is solved, thereby making it possible to prevent flicker.

In the projection type video display, the lights in the respective colors separated by the color separating means may be introduced into the hold type elements for the respective colors in optical path lengths which are equal to one another.

In the projection type video display, the light deflecting means may be arranged on the optical path of the light in each of the colors in the color separation optical system.

BRIEF DESCRIPTION OF DRAWINGS

FIG. 36(a) is a side view, and FIG. 36(b) is a front view;

FIG. 37(a) is a side view, and FIG. 37(b) is a front view;

FIG. 62(b) is an explanatory view showing how synchronization between an instantaneous increase in light amount and scrolling light is not established;

BEST MODE FOR CARRYING OUT THE INVENTION

Projection type video displays according to embodiments of the present invention will be described on the basis of FIGS. 8 to 41.

Embodiment 1

Figure 1:
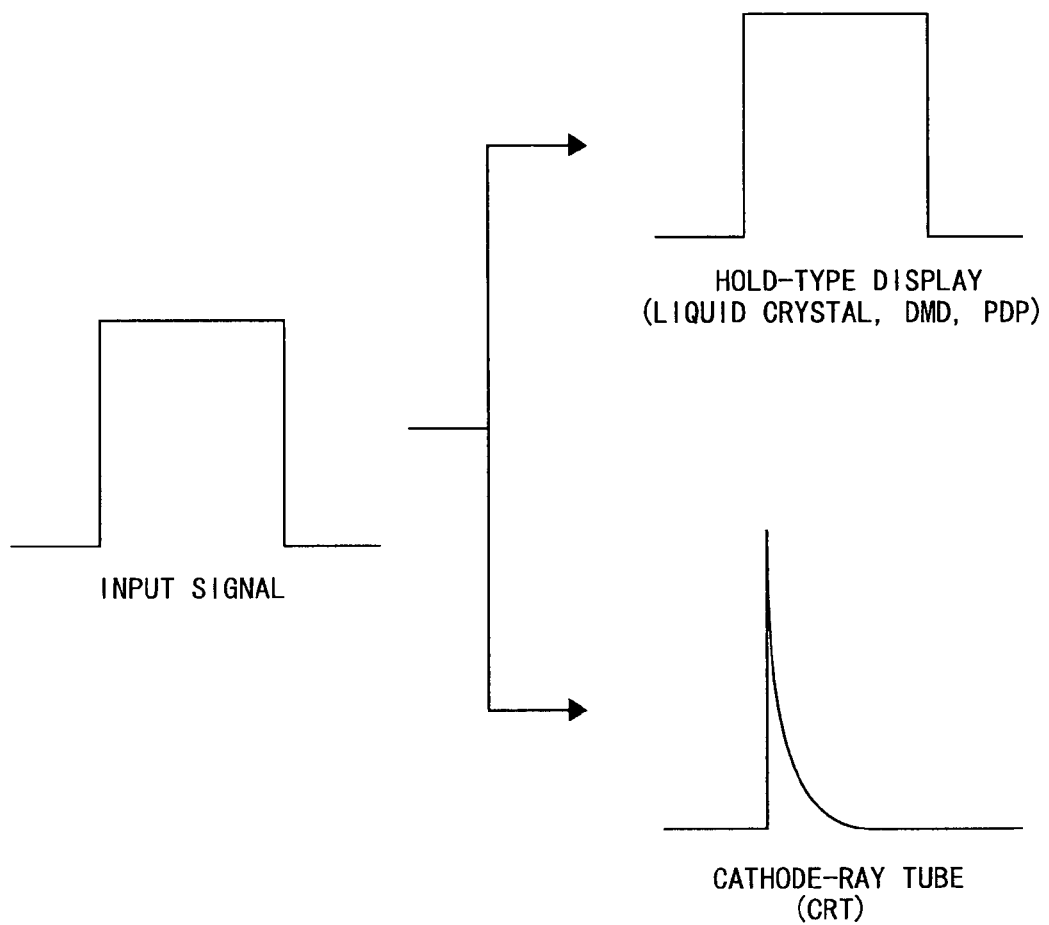
FIG. 1 is an explanatory view showing light output characteristics corresponding to respective input signals to a CRT and a hold type display element.
Figure 2:
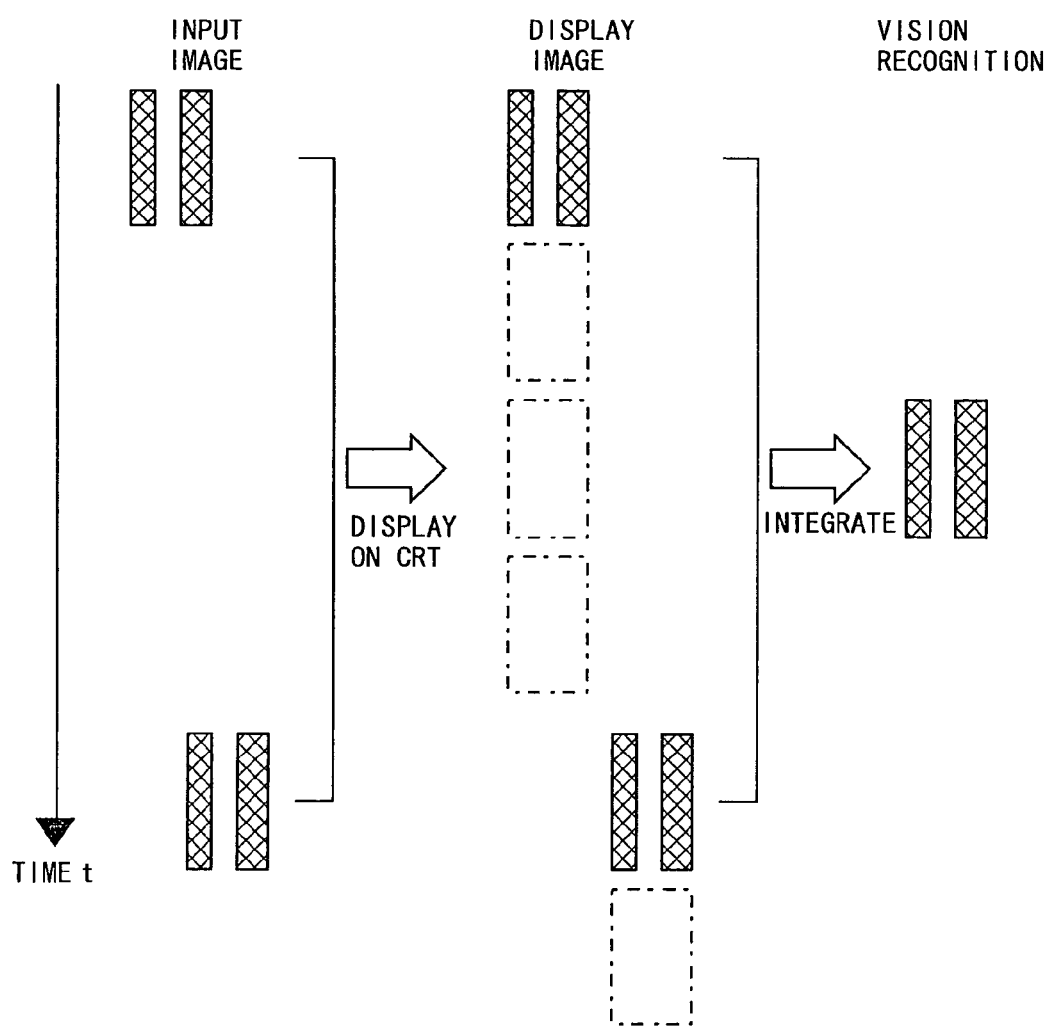
FIG. 2 is an explanatory view showing a display image and characteristics of vision in a CRT.
Figure 3:
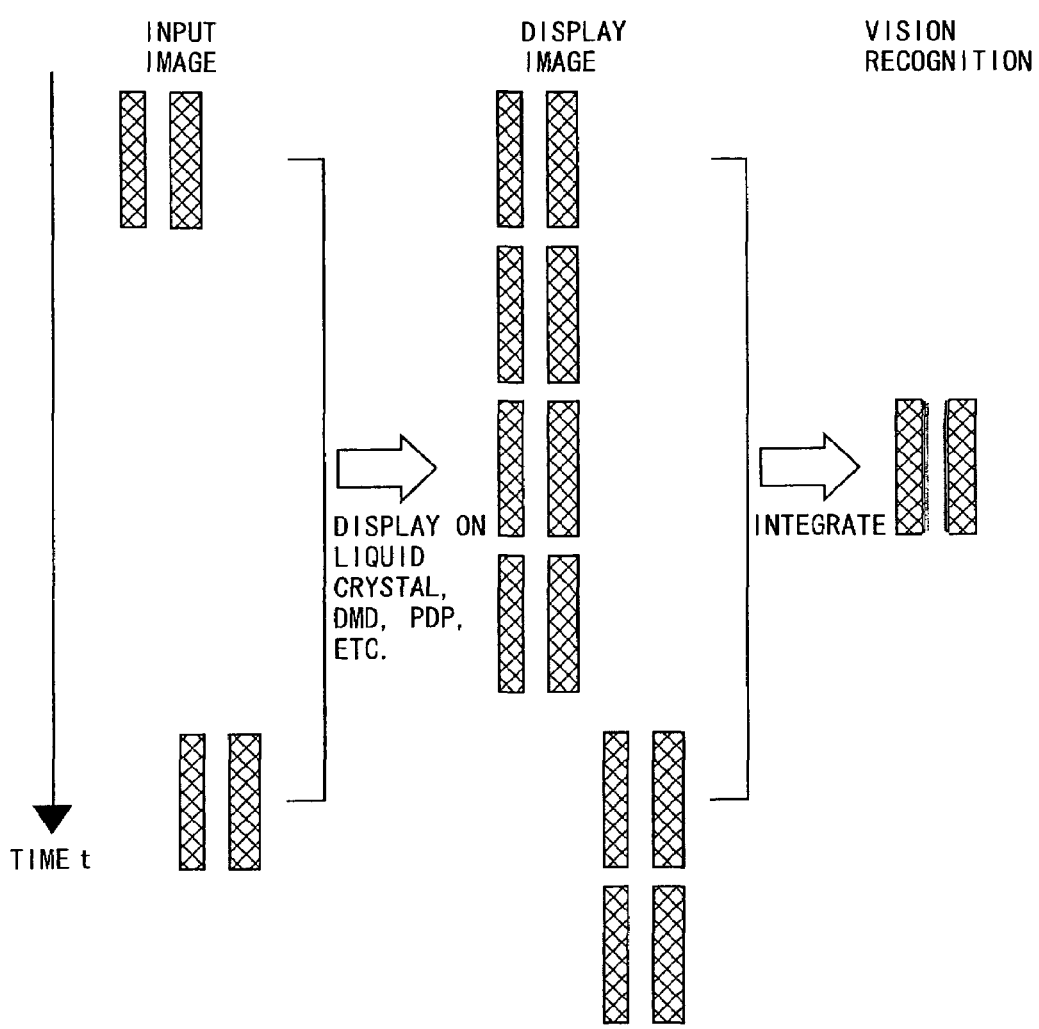
FIG. 3 is an explanatory view showing a display image and characteristics of vision in a hold type display element.
Figure 4:
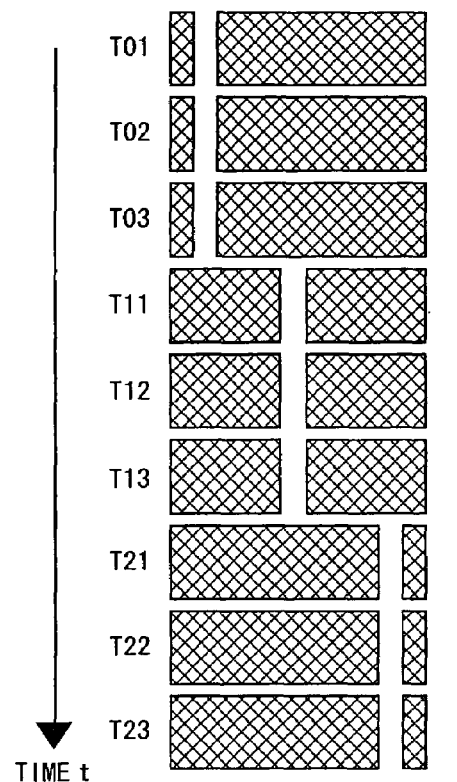
FIGS. 4(a) and 4(b) are explanatory views for explaining the production of a double image in a hold type display element.
Figure 4:
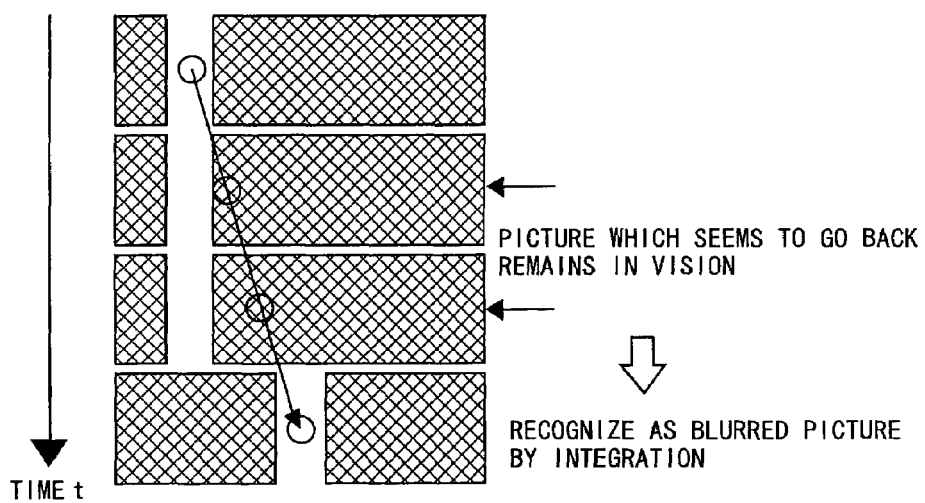
Figure 5:
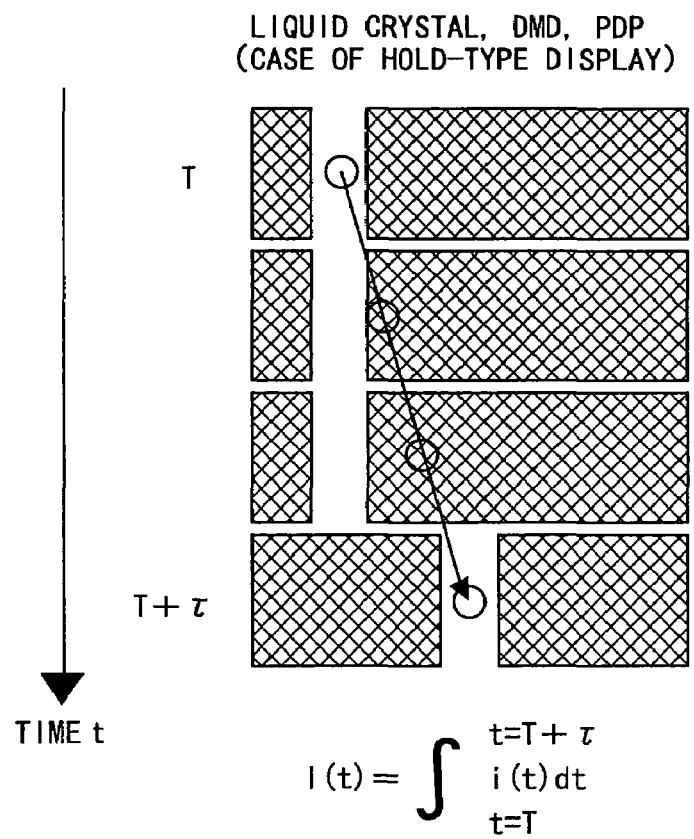
FIGS. 5(a) and 5(b) are explanatory views for explaining the production of a double image in a hold type display element.
Figure 5:
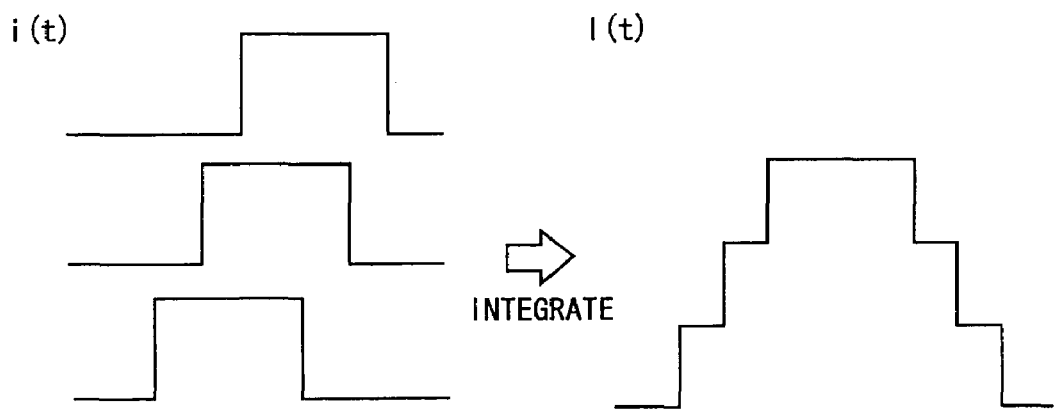
Figure 6:
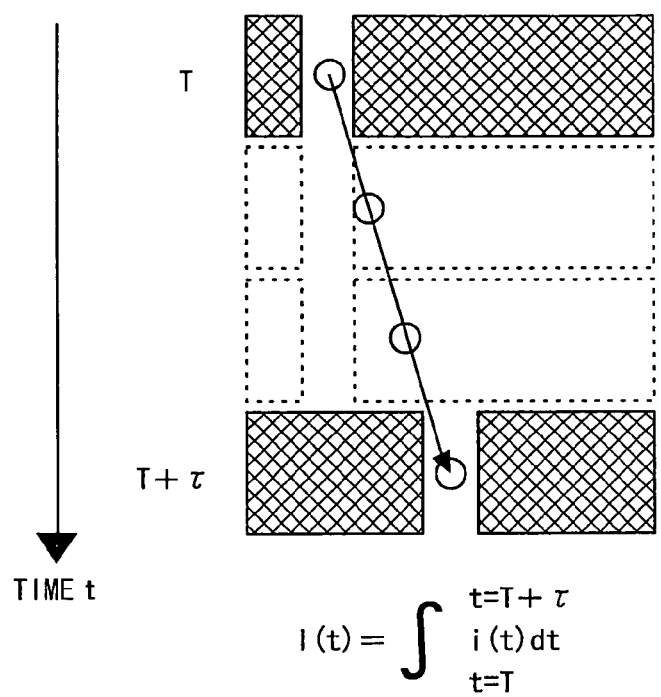
FIGS. 6(a) and 6(b) are explanatory views for explaining that no double image is produced in a CRT.
Figure 6:
Figure 7:
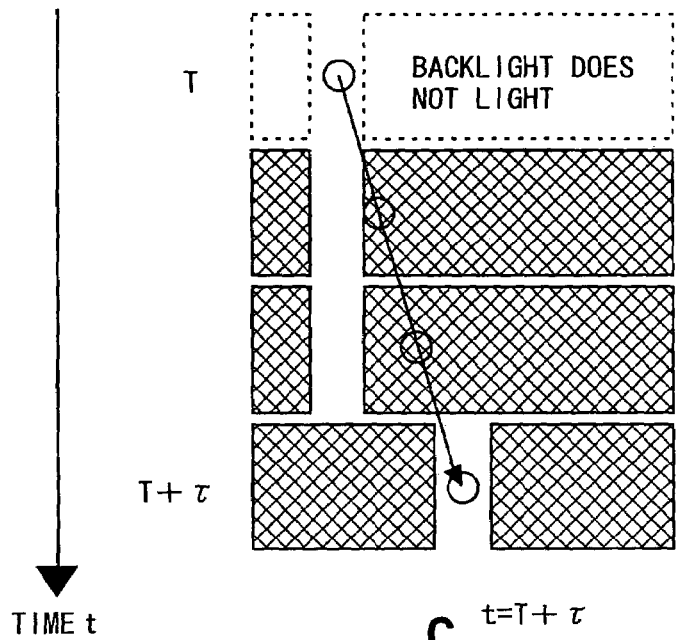
FIGS. 7(a) and 7(b) are explanatory views showing that a double image is improved by performing intermittent illumination in a hold type display element.
Figure 7:
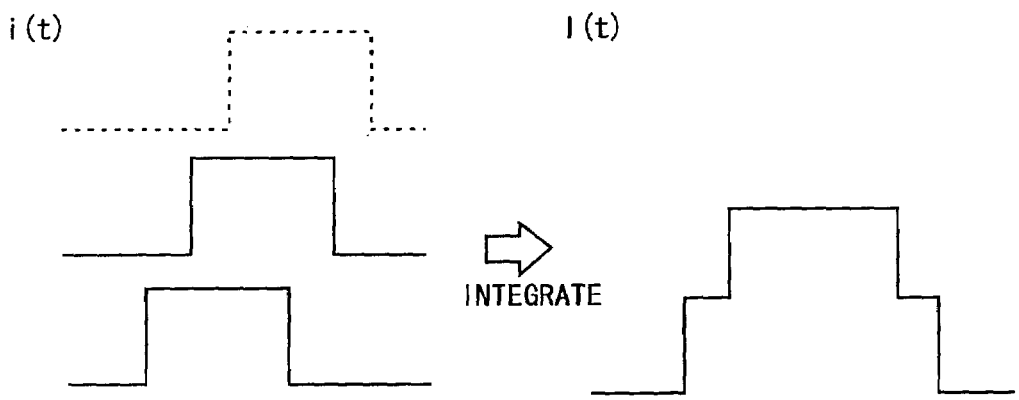
Figure 8:
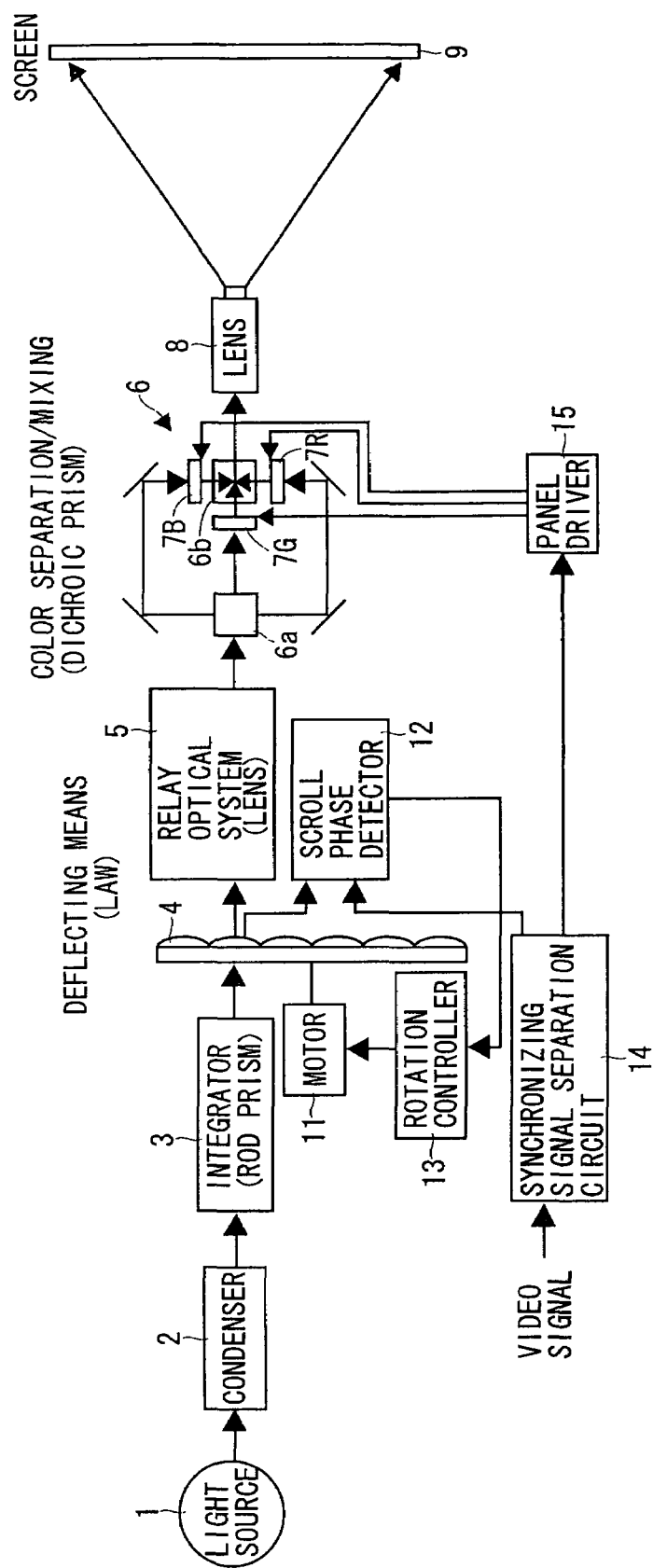
FIG. 8 is a block diagram showing a projection type video display according to an embodiment 1 of the present invention.
Figure 9:
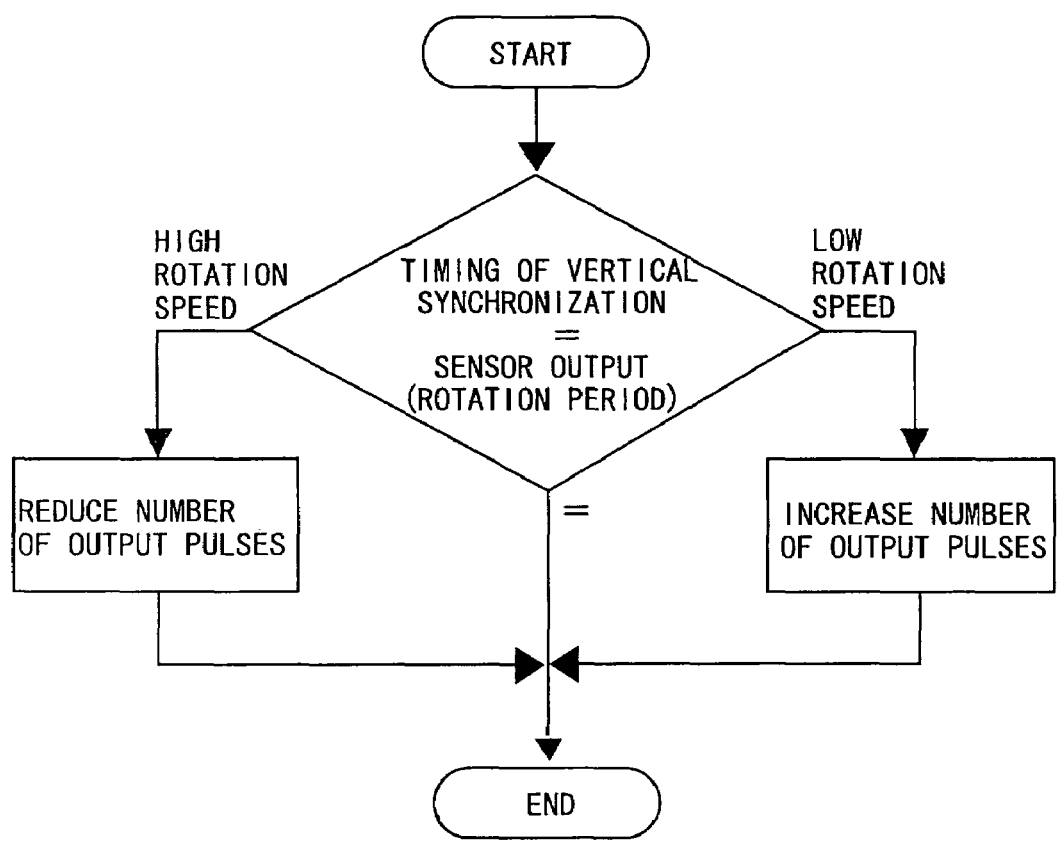
FIG. 9 is a flow chart showing that motor control is carried out by a video synchronizing signal and an output of a scroll phase detecting circuit.
Figure 10:
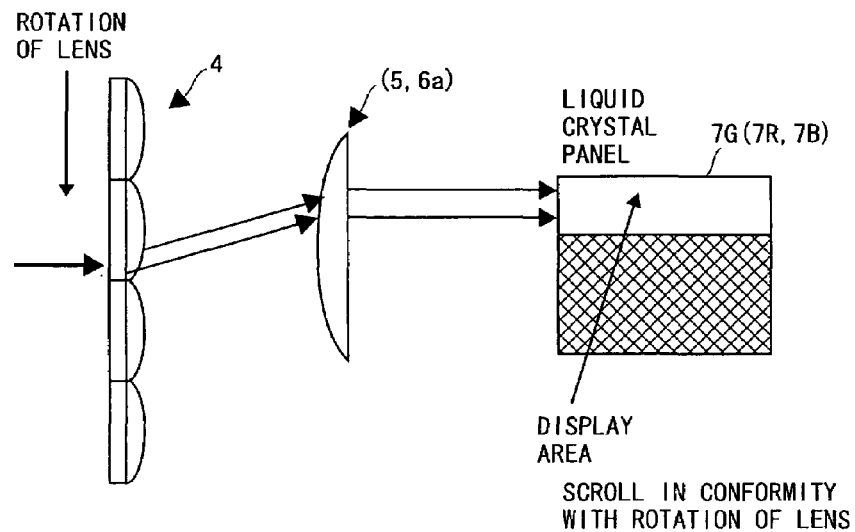
FIG. 10 is an explanatory view showing how illuminating light is scrolled onto a liquid crystal panel.
Figure 11:
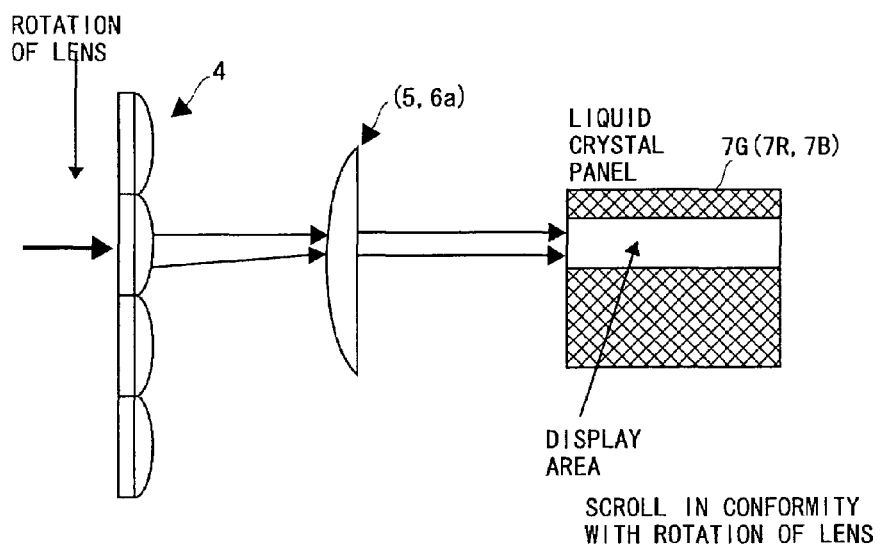
FIG. 11 is an explanatory view showing how illuminating light is scrolled onto a liquid crystal panel.
Figure 12:
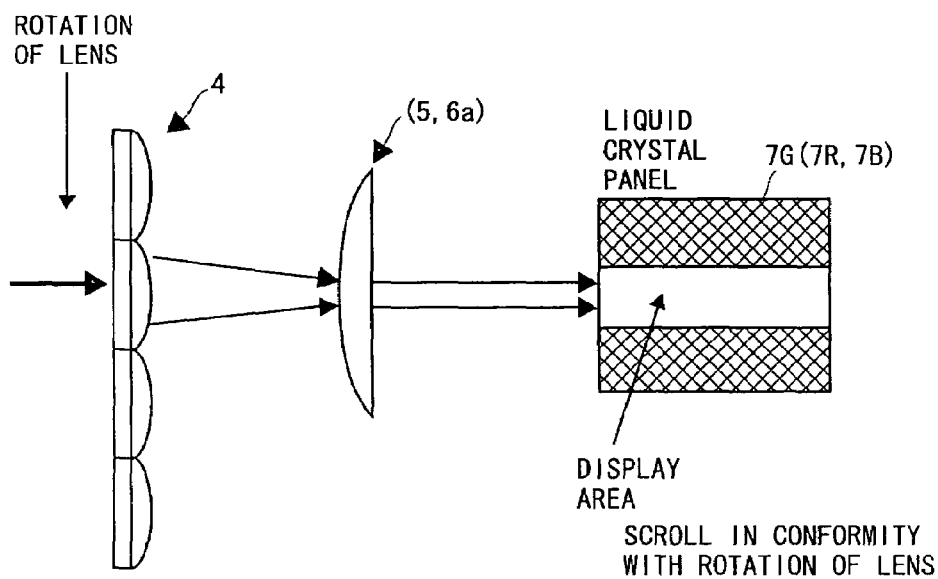
FIG. 12 is an explanatory view showing how illuminating light is scrolled onto a liquid crystal panel.
Figure 13:
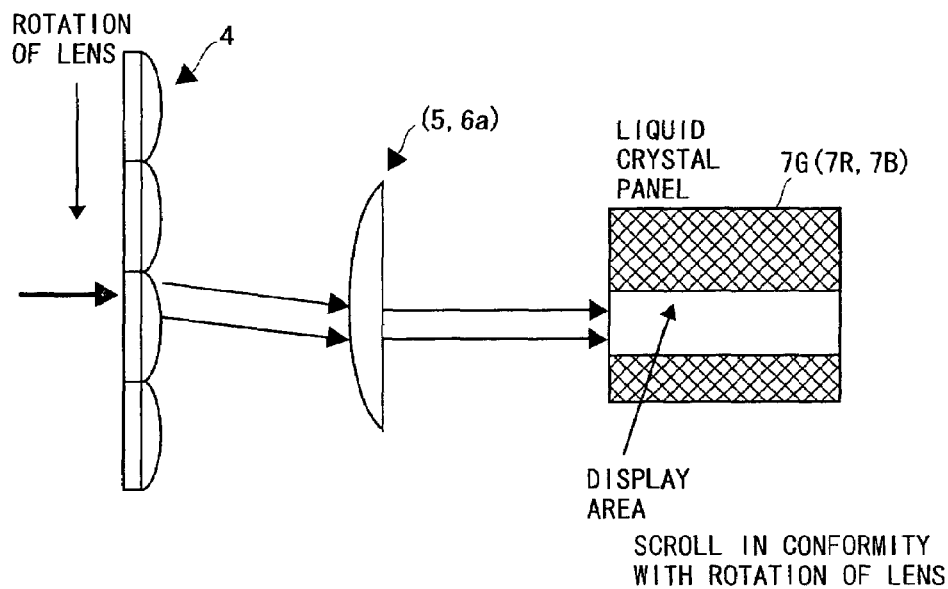
FIG. 13 is an explanatory view showing how illuminating light is scrolled onto a liquid crystal panel.
Figure 14:
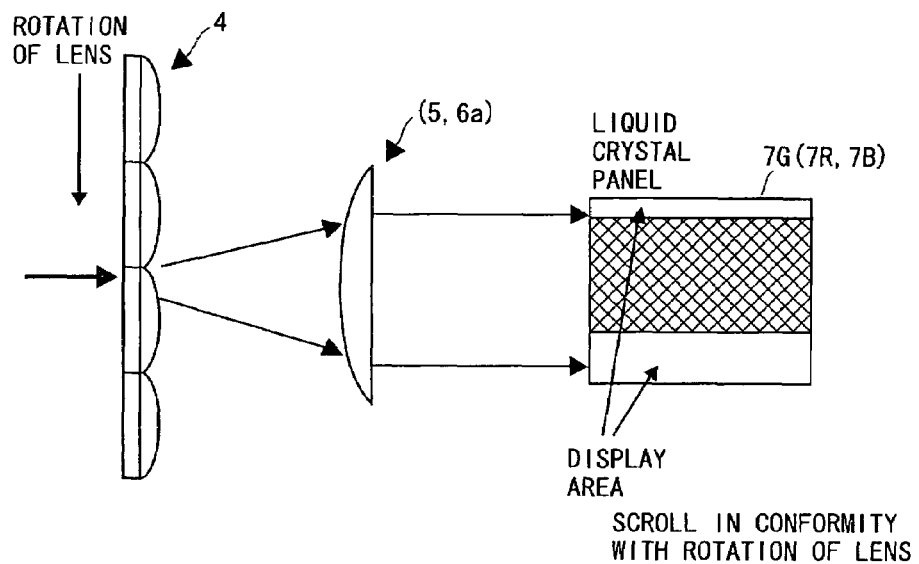
FIG. 14 is an explanatory view showing how illuminating light is scrolled onto a liquid crystal panel.
Figure 15:
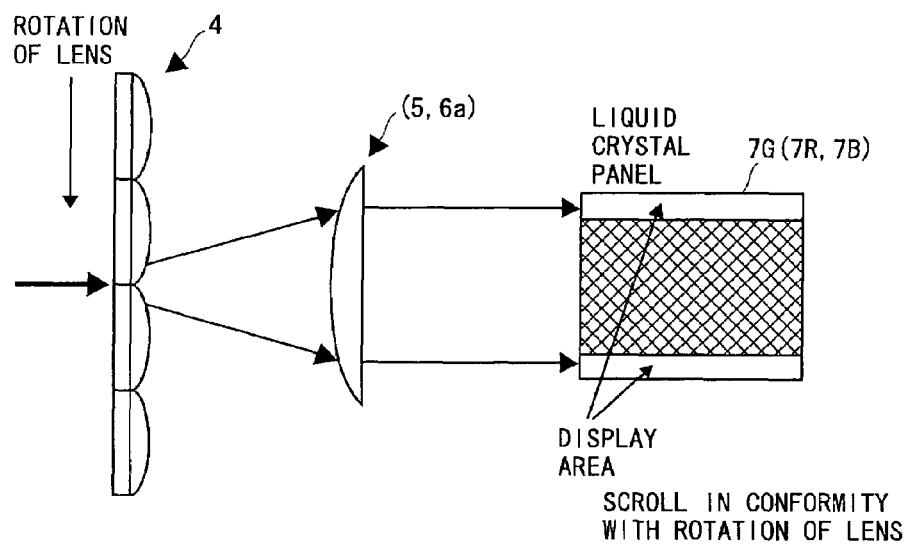
FIG. 15 is an explanatory view showing how illuminating light is scrolled onto a liquid crystal panel.
Figure 16:
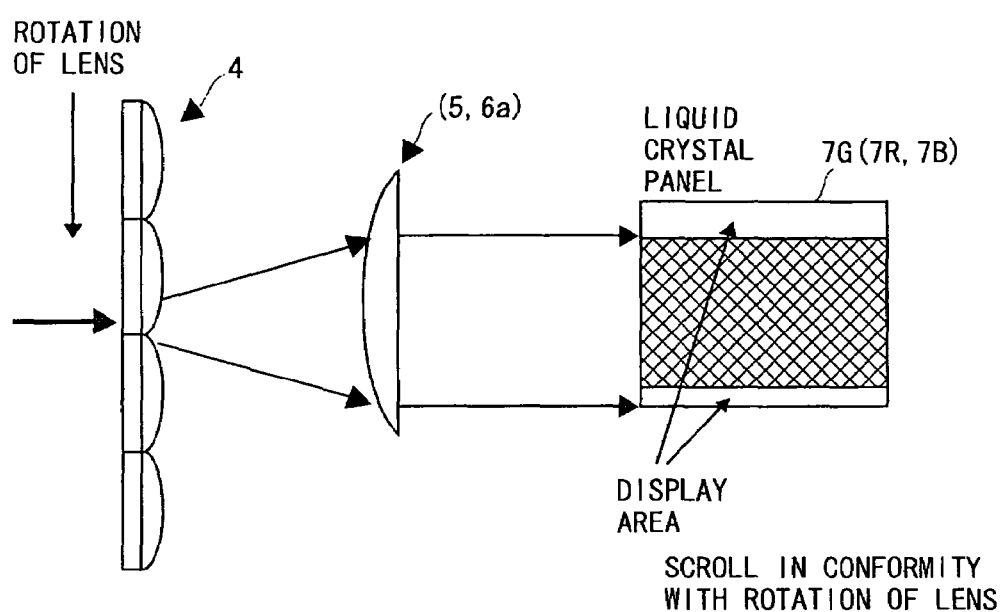
FIG. 16 is an explanatory view showing how illuminating light is scrolled onto a liquid crystal panel.

FIG. 8 is a block diagram showing a projection type video display according to the present embodiment. A light source 1 is composed of an ultra-high pressure mercury lamp, a metal halide lamp, a xenon lamp, or the like. A condenser 2 is composed of an elliptical mirror for receiving light emitted from the light source 1 and reflecting the received light, or a combination of a parabolic mirror and a condenser lens, or the like. Light condensed in the condenser 2 is incident on an integrator (a rod prism) 3, and is emitted as a uniform surface light source after a total reflecting function is repeated on its inner surface. The light thus obtained by the integration is emitted toward a lens array wheel (LAW) 4 serving as light deflecting means. As a light irradiation area (dimensions) on the lens array wheel 4, the width is approximately the same as that of a liquid crystal display panel, described later, and the length thereof is one-third that thereof. If used as the integrator 3 is one having such a tapered shape that its surface on the emitting side is larger than its surface on the light receiving side, it is possible to reduce, in the emitted light, the dispersion thereof as much as possible.

The lens array wheel 4 has a plurality of convex lens functional units in a disc shape arranged along its circumference. The convex lens functional unit has a shape obtained by cutting a normal convex lens in a fan shape. The center of the lens array wheel 4 in the shape of a disk is its rotation center (rotation axis). The lens array wheel 4 is so driven as to rotate by a motor 11, to receive light from a direction parallel to the rotation center (rotation axis). Consequently, the plurality of convex lens functional units circularly pass through the surface on the emitting side of the integrator 3. A periodic positional displacement among the convex lens functional units is produced, to periodically deflect the light.

The relay lens optical system 5 receives the deflected light incident thereon, and transfers an image to a color separation dichroic prism 6a in an image light producing system 6. The light incident on the color separation dichroic prism 6a is separated into R (red) light, G (green) light, and B (blue) light, and the lights are respectively introduced into a liquid crystal display panel for red 7R, a liquid crystal display panel for green 7G, and a liquid crystal display panel for blue 7B. The lights in the respective colors introduced into the liquid crystal display panels 7R, 7G, and 7B (the shape of irradiation is a strip shape) are respectively scroll-irradiated at the same timing onto the panels by the light deflection using the lens array wheel 4. FIGS. 10 to 16 show how the scroll irradiation is performed. In FIGS. 10 to 16, a lens-shaped member positioned between the lens array wheel 4 and the liquid crystal display panel represents the relay optical system 5, the color separation dichroic prism 6a, or the like.

Each of the lights in the respective colors incident on the liquid crystal display panels 7R, 7G, and 7B is modulated in the state of a response of a pixel (the degree of light transmission) on the panel. Image lights in the respective colors obtained by the modulation are recombined by the color recombining dichroic prism 6b to be a color image light, and the color image light is projected on a screen 9 by a projection lens 8.

Figure 17:
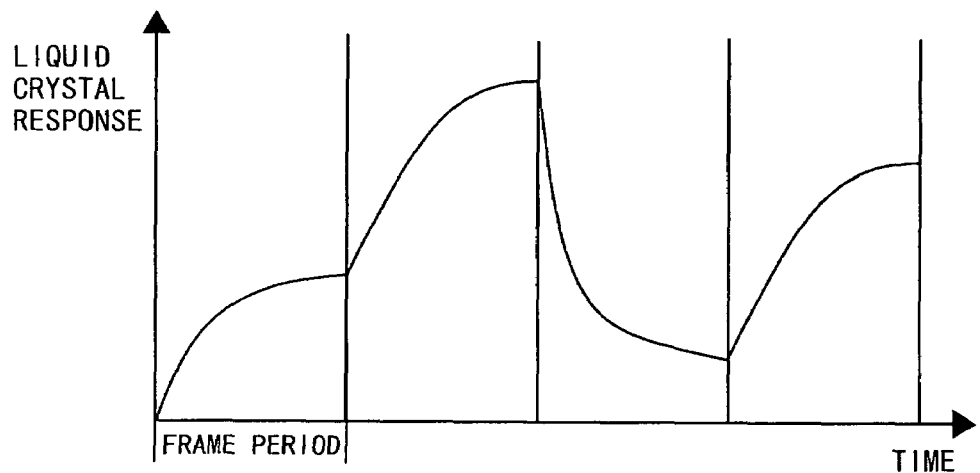
FIGS. 17(a), 17(b), and 17(c) are explanatory views showing the relationship between a liquid crystal response and the luminance of a liquid crystal in intermittent illumination by scrolling.
Figure 17:
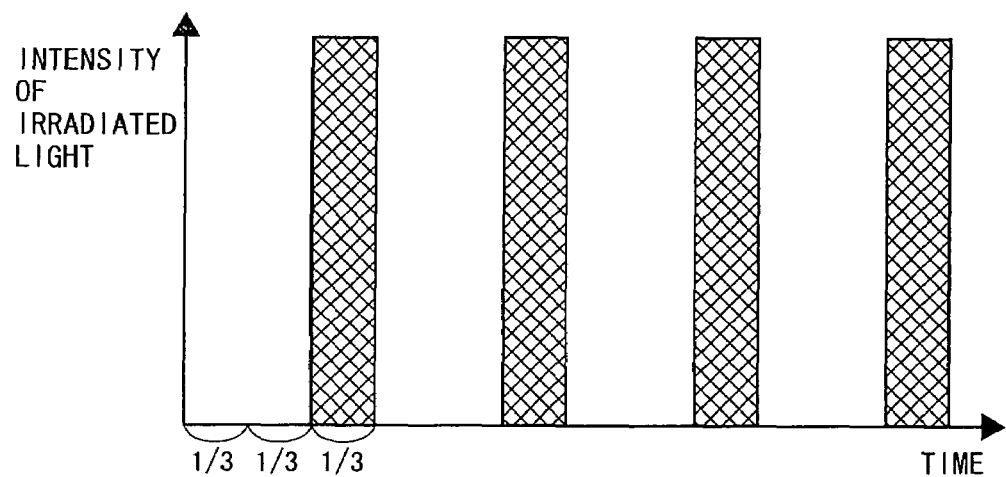
Figure 17:
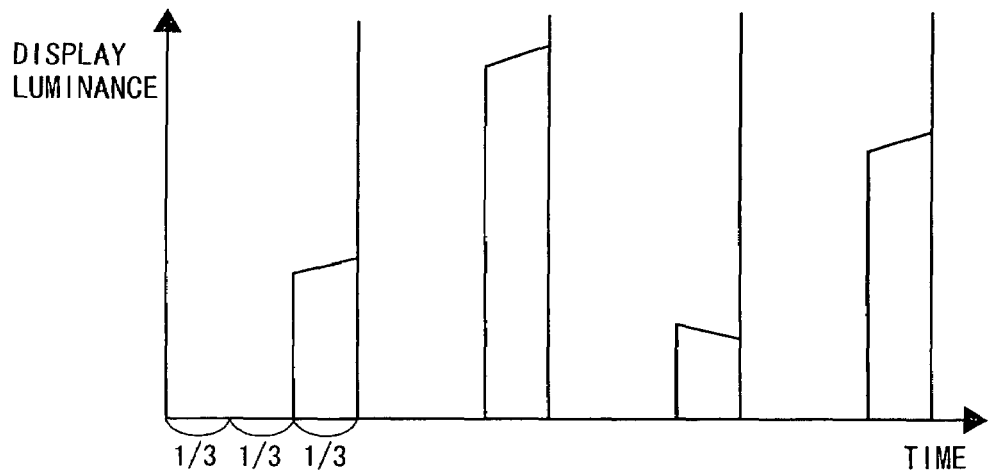

The strip-shaped illuminating light in each of the colors is thus circularly scrolled on the liquid crystal display panel 7, so that image is appeared on a pixel for only a part of a frame period and the pixel is blackened for the remaining period if one pixel on the panel is paid attention to. As a result, intermittent display is realized, thereby improving blurring in a case where a moving image is displayed. In a case where the strip-shaped illuminating area is one-third the whole of the panel (screen), the display is equivalent to intermittent display which is ⅔ period non-display after ⅓ period display, as shown in FIGS. 17(*a*), 17(*b*), and 17(*c*).

A signal processing system will be then described. A panel driver 15 drives each of the liquid crystal display panels 7R, 7G, and 7B on the basis of an inputted video signal. That is, an element driving voltage for setting the degree of light transmission of each of the pixels composing each of the liquid crystal display panels is generated on the basis of the video signal and is fed to the pixel. A synchronizing signal separating circuit 14 extracts a vertical synchronizing signal from the video signal, and feeds the extracted vertical synchronizing signal to a scroll phase detector 12. The scroll phase detector 12 detects a phase difference from a rotation period of the lens array wheel 4 and vertical synchronization. Information related to the rotation period of the lens array wheel 4 can be obtained by the configuration of a rotary encoder, for example. A rotation controller 13 for controlling the rotation of the motor 11 receives a signal representing the above-mentioned phase difference from the scroll phase detector 12, to carry out control such that the rotation period of the lens array wheel 4 is matched with the vertical synchronization. The contents of the control are shown in a flow chart of FIG. 9. A supply voltage (or the number of pulses, the pulse width, etc.) to the motor 11 is increased in order to increase the rotation speed if the rotation period is delayed from the vertical synchronization, while being reduced in order to reduce the rotation speed if the rotation period is earlier than the vertical synchronization. If both are matched with each other, the supply voltage is left unchanged.

Figure 18:
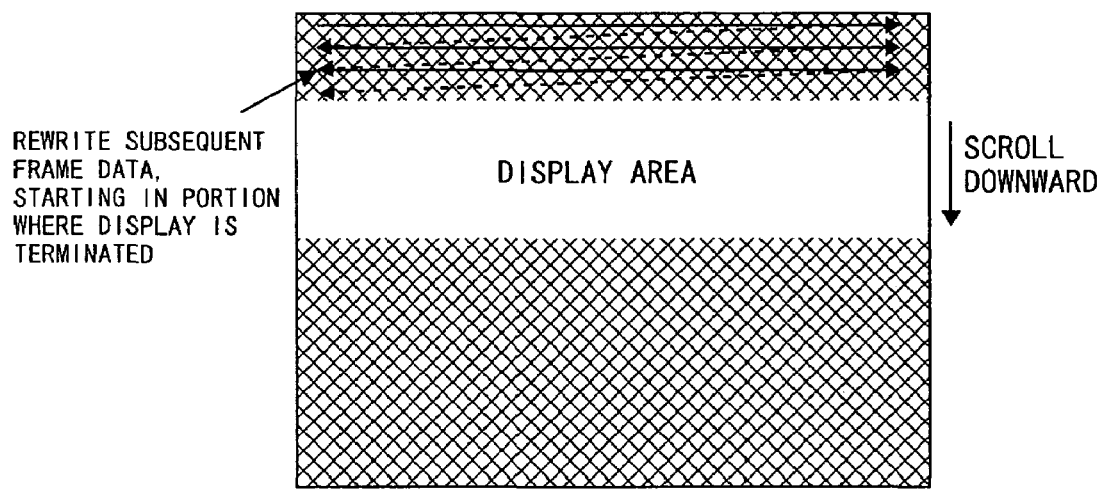
FIG. 18 is an explanatory view showing the relationship between the state of scrolling on a screen and writing of pixel data.
Figure 19:
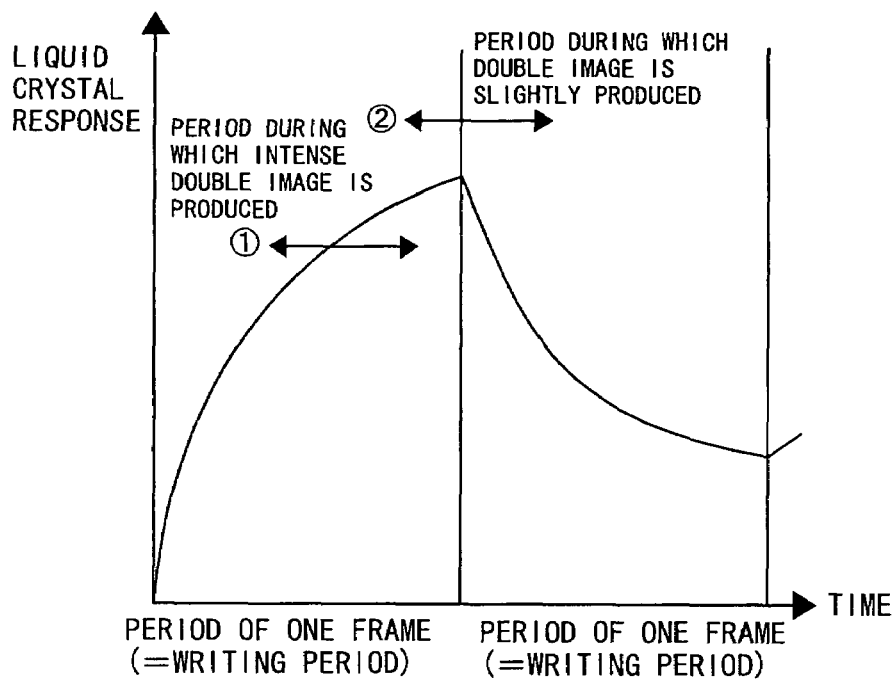
FIG. 19 is an explanatory view showing the relationship between the respective qualities of a display video by a liquid crystal response and a illumination period.
Figure 20:
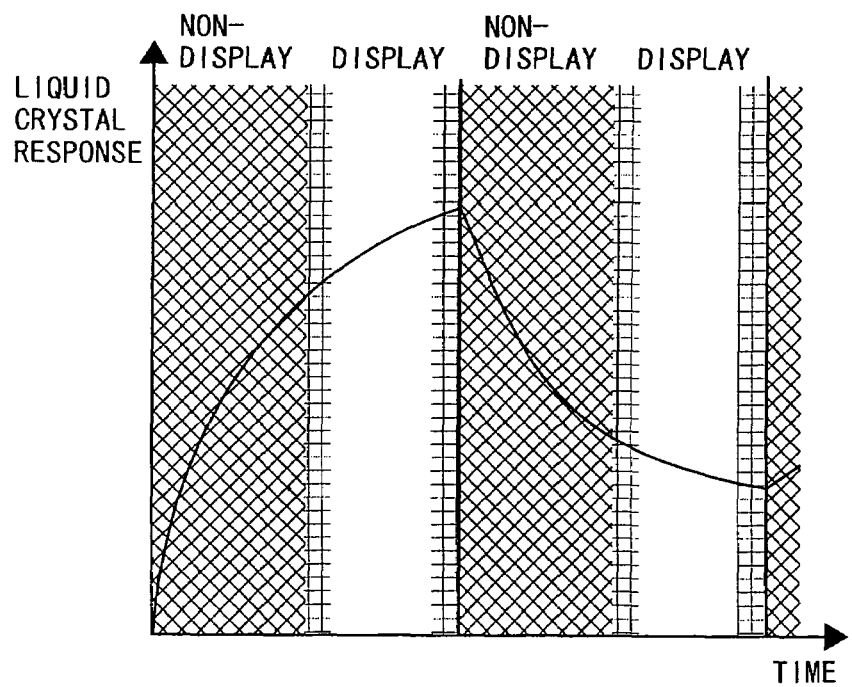
FIG. 20 is an explanatory view showing the relationship between a liquid crystal response and a illumination period.
Figure 21:
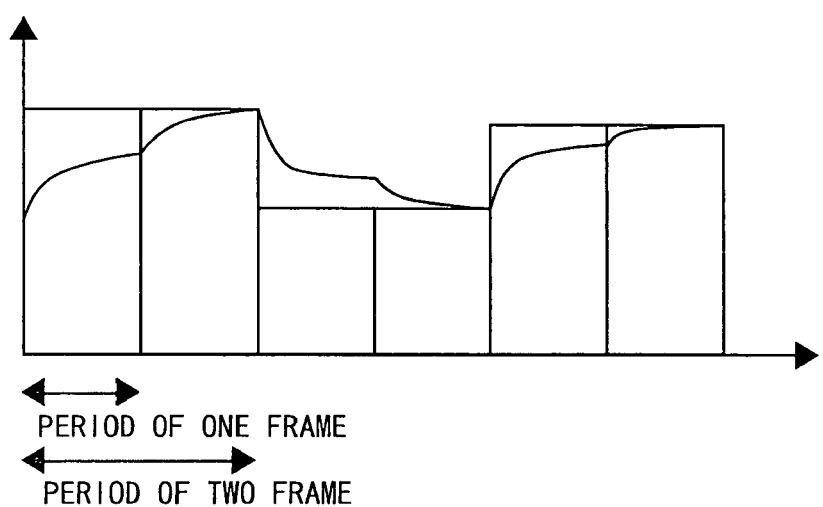
FIG. 21(a) is an explanatory view showing a liquid crystal response in a case where data is written at a speed which is two times that in synchronization.
FIG. 21(b) is an explanatory view showing a case where overdrive is performed in the first half of the writing, and data representing a target value is written in the latter half thereof (a liquid crystal response is flattened)
Figure 21:
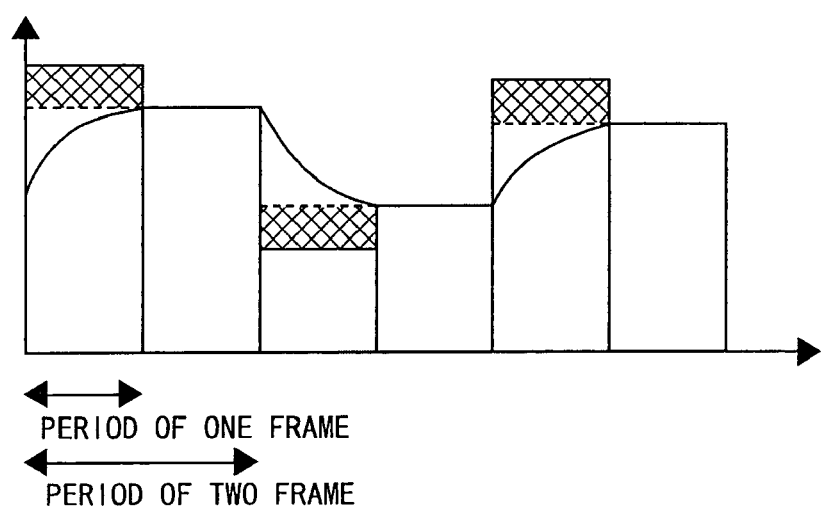

If the response speed of the liquid crystal display panel is high, there is no problem. In a normal liquid crystal display panel, however, a sufficient response speed cannot be obtained. Therefore, the final response of the pixel is not completed during an irradiation period of scrolling light. If the final response of the pixel is not thus completed, a luminance value corresponding to image data is not obtained. As shown in FIG. 18, the subsequent frame data is written into the pixel obtained immediately after irradiated light is scrolled. FIG. 19 illustrates an example of a liquid crystal response. A liquid crystal responds, as illustrated. Therefore, light is irradiated ideally in a period indicated by ②. That is, the respective timings of a liquid crystal response and display (panel illumination) are set, as shown in FIG. 20. However, a liquid crystal panel used for a normal transmission type liquid crystal projector cannot respond in a frame period, that is, in a period of 17 ms. Therefore, an image in a frame which is two frames preceding the current frame remains on the liquid crystal panel even at the timing of current frame writing, so that a double image is always displayed throughout the entire period. When intermittent display is performed by scrolling irradiated light using such a panel, the double image is emphasized. As a result, an impression that the quality of the image is improved cannot be obtained. Therefore, a response in a period of 17 ms is realized using a method called "overdrive" for writing data into the panel, thereby reducing the double image. In the transmission type liquid crystal projector, when a liquid crystal is made to respond from 100 to 200, for example, it is assumed that the liquid crystal only responds up to 180 in a writing period. If the liquid crystal responds up to 200 within the writing period when the value for obtaining 230, for example, is inputted, however, not 200 but 230 may be used as an input value in this case. FIG. 21 shows these conditions. These are examples of a panel which does not respond in a period of 17 ms. As can be seen from FIG. 21(*a*), the liquid crystal responds up to a desired value in a period of two frames. Therefore, the degree of change is emphasized, as shown in FIG. 21(*b*), to quicken a liquid crystal response. As a result, the liquid crystal responds within a period of 17 ms, thereby making it possible to improve a double image. As shown in FIG. 19, it is desirable that irradiated light is almost matched with a frame writing period. The reason for this is that the double image is produced in a period during which the liquid crystal response is changed. In this case, it is considered that a period of the irradiated light is matched with a period immediately before the writing period, as shown in FIG. 18. In this case, however, an intense double image occurs at a start point of irradiation. As a result, a relatively intense double image is recognized by the displayed image. In this case, relatively good results are obtained by slightly exceeding the writing period, as shown in ② in FIG. 19. This phenomenon is a state of a so-called faint triple image where images are seen like faint shadows on both sides of a moving portion. Such results that the subjective image quality in this state is higher are obtained. Although in the following embodiment, description is made as an example in which irradiated light is matched with a period immediately before frame writing in order to avoid obscuration. However, the present invention is not limited to an irradiation pattern. It is noted that no restrictions are imposed on the use of a method of improving the subjective image quality by almost matching the irradiated light with the frame writing period, as described above.

Embodiment 2

Figure 25:
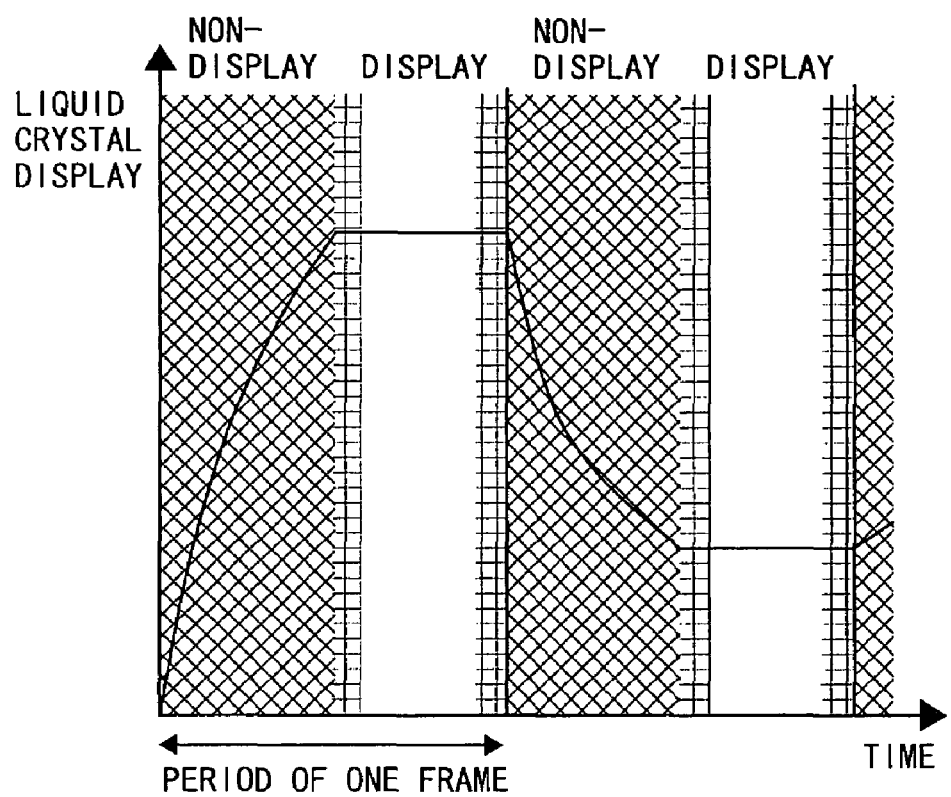
FIG. 25 is an explanatory view showing that the timing of illumination (display) is matched with the time of flattening a liquid crystal response by overdrive.
Figure 26:
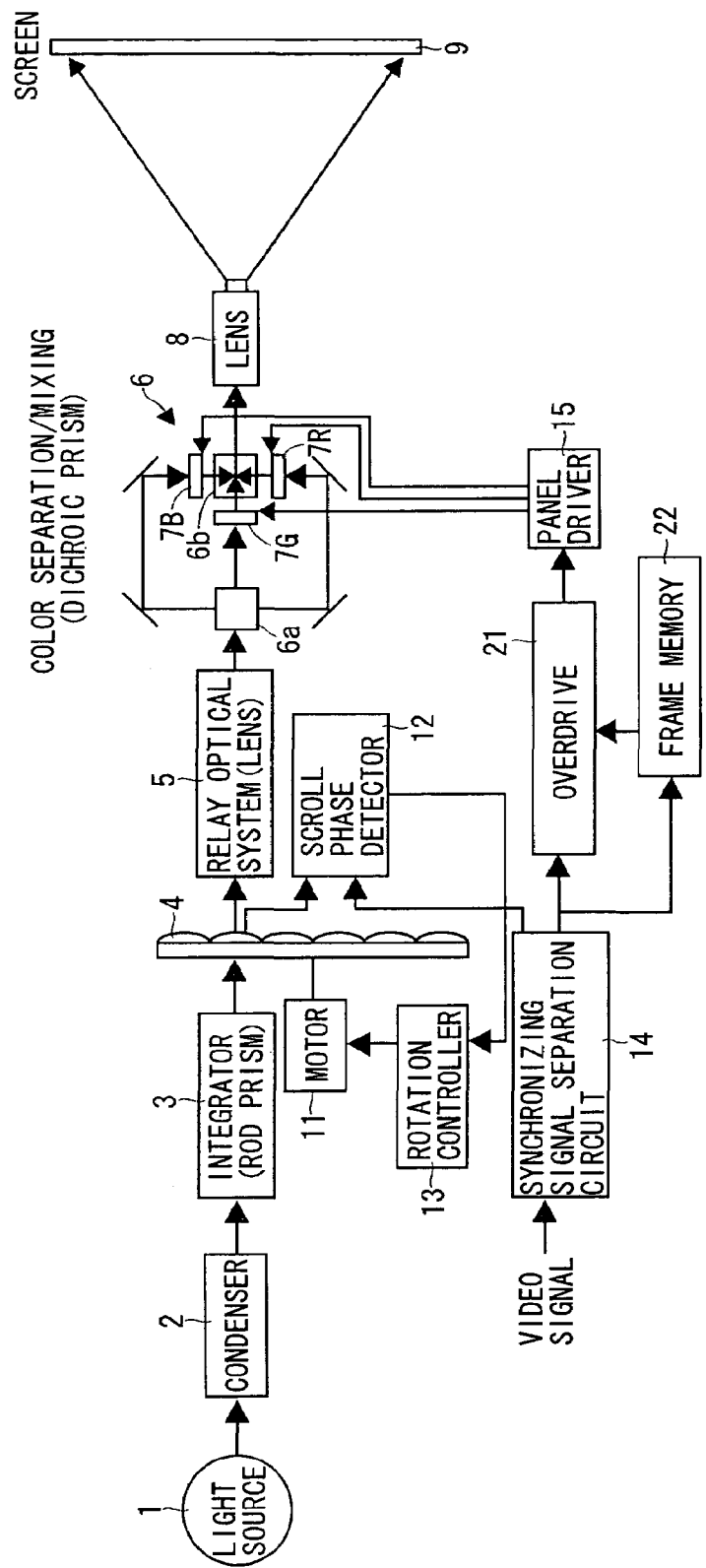
FIG. 26 is a block diagram showing a projection type video display according to a second embodiment of the present invention.

FIG. 26 illustrates the configuration of a projection type video display according to an embodiment 2. A projection type video display according to the present embodiment capable of solving problems will be described while presenting the problems using FIGS. 21 to 25 and FIG. 27.

FIG. 21(*a*) schematically shows a liquid crystal response state according to the embodiment 1, and FIG. 21(*b*) schematically shows a liquid crystal response state according to the embodiment 2.

Figure 22:
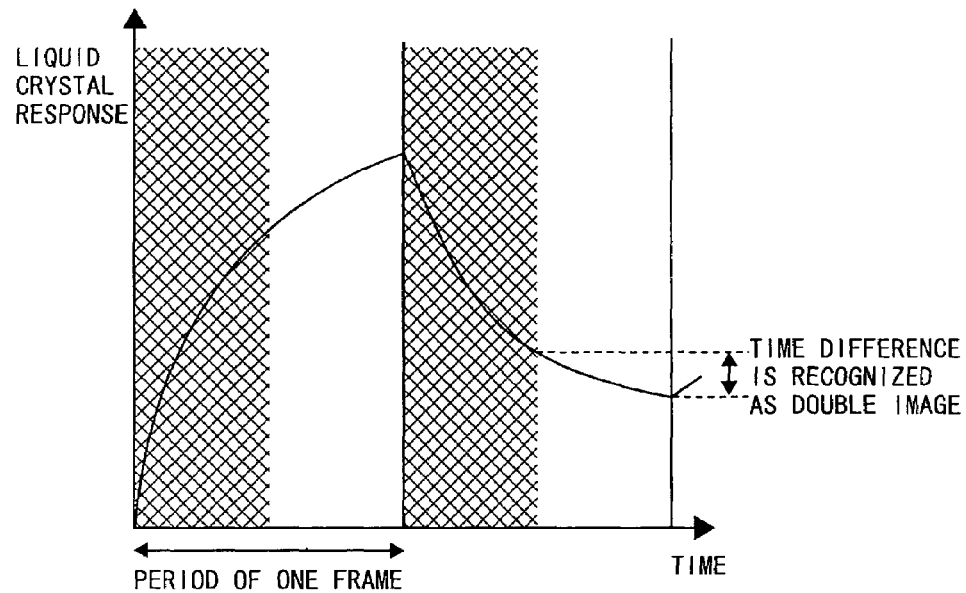
FIG. 22 is an explanatory view showing the relationship between a liquid crystal response and a illumination period.
Figure 23:
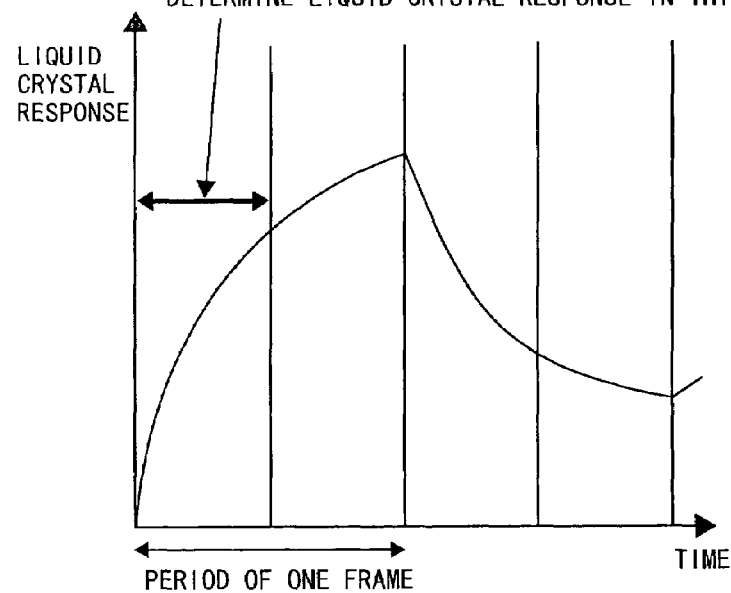
FIG. 23 is an explanatory view showing the relationship between a liquid crystal response and a illumination period.

Here, a liquid crystal response is exponentially changed. Even when ideal light irradiation is performed, therefore, there is a luminance change during a display period, as shown in FIG. 22, which is recognized as a double image. Therefore, the timing of illumination of a liquid crystal pixel and the time of flattening the response of the liquid crystal pixel are matched with each other. Specifically, writing into the liquid crystal pixel is performed at integral multiples of a frame rate, as shown in FIG. 23. For example, writing is performed at a frequency of 120 Hz in a system for driving at a frequency of 60 Hz. The liquid crystal is made to respond up to a desired value (target value) within a period of 1/120 seconds which is the first non-display period, and the liquid crystal response is made constant in a period of 1/120 seconds which is the remaining display period.

However, almost all of liquid crystals cannot respond at a frequency of 120 Hz. Overdrive control is carried out in an overdrive circuit 21 shown in FIG. 26 such that the liquid crystal responds to a desired value. The overdrive control is for compensating for delay by inputting a larger change value than the desired value to the liquid crystal. As shown in FIG. 22, the liquid crystal cannot respond within a writing period in many cases even if the desired value is inputted thereto. When the liquid crystal is made to respond from 100 to 200, for example, therefore, it is assumed that the liquid crystal only responds up to 180 within the writing period. If the liquid crystal responds up to 200 within the writing period when the value for obtaining 230, for example, is inputted, not 200 but 230 may be inputted. A value required for the liquid crystal to respond up to the desired value within the writing period is determined by the current state and the target state of the liquid crystal, that is, a value in the preceding frame and a value in a writing frame. Since the values are not linear, they are determined in not a functional manner but a tabular manner. A table may be so constructed that a pixel value in a state before writing (the value in the preceding frame) and a pixel value to be subsequently written (the value in the writing frame) are taken as inputs (read addresses). In this table, as output data, an input data value (an excessive writing value) to a panel required to be a pixel value (target value) which should be written after a period of 17 ms is obtained. For this purpose, the pixel value in the preceding frame is stored in a frame memory 22 (see FIG. 26), and the pixel data to be written (the input data value to the panel) is obtained from the table by referring to the table as to each pixel while regarding a value on the frame memory 22 and a value to be written as addresses.

Figure 24:
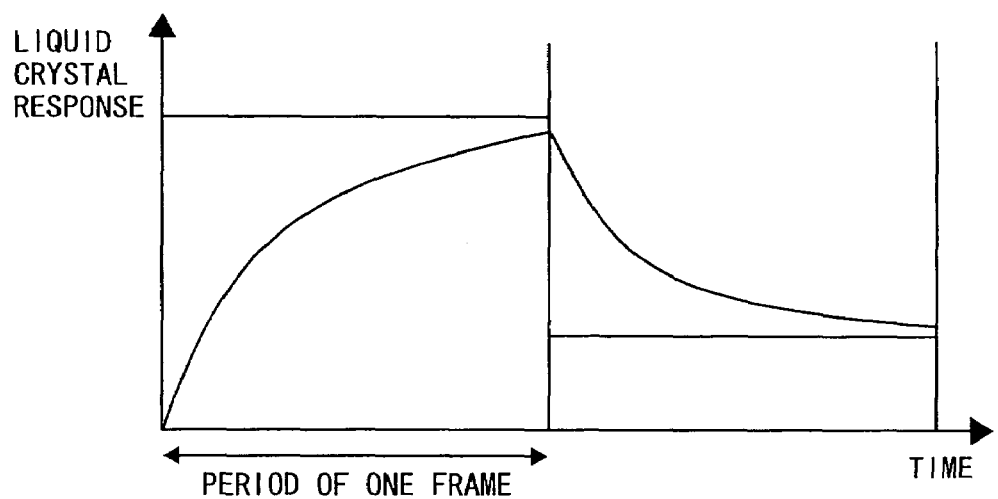
FIG. 24(a) is an explanatory view showing normal writing.
FIG. 24(b) is an explanatory view showing that a liquid crystal response is flattened by overdrive.
Figure 24:
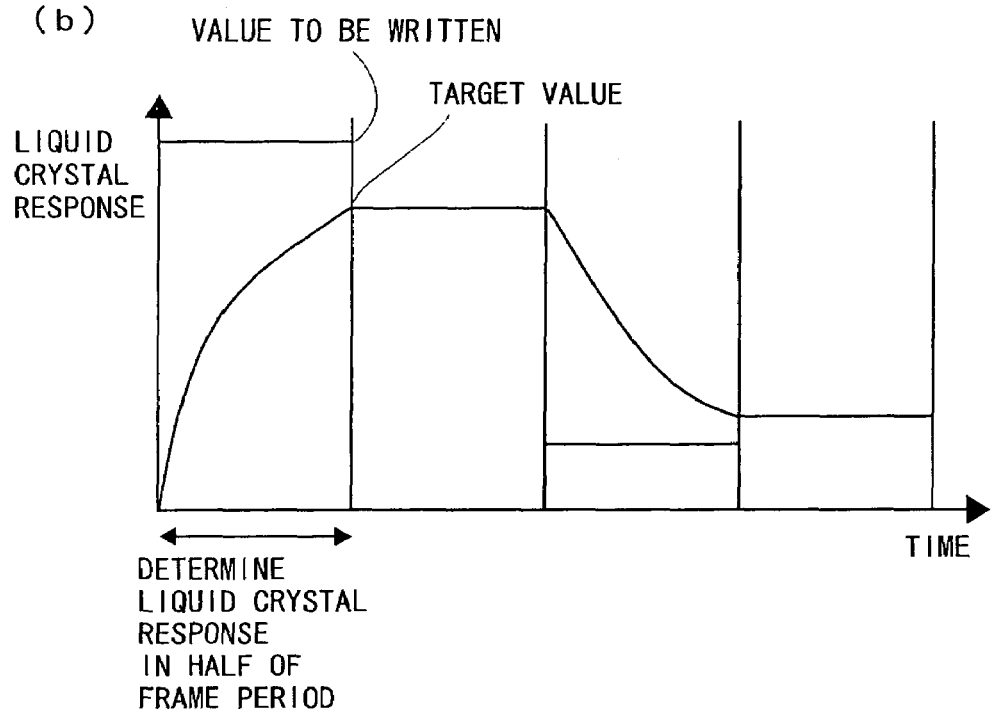

FIG. 24 illustrates comparison between normal drive and overdrive. FIG. 24(*a*) shows a liquid crystal response by the normal drive, and FIG. 24(*b*) shows a liquid crystal response by the overdrive. FIG. 25 shows the relationship between a response state shown in FIG. 24(*b*) and a panel illumination period. As apparent from FIG. 25, the panel illumination period and the time of flattening a response of a liquid crystal pixel are matched with each other. Therefore, a change in luminance within the panel illumination period is restrained, thereby preventing a double image.

Figure 27:
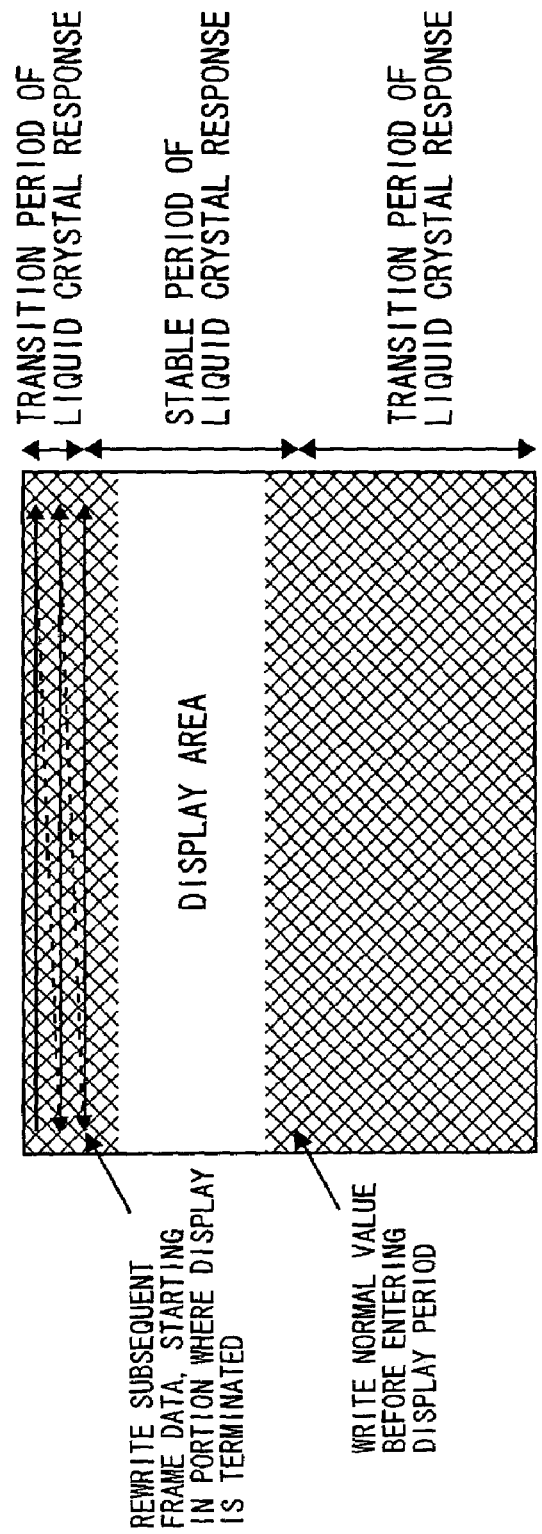
FIG. 27 is an explanatory view showing the relationship between the state of scrolling on a screen and writing of pixel data.

FIG. 27 is a diagram showing the write timing by the overdrive circuit 21 on a display element. The subsequent frame data is written from a portion where display is terminated (a portion through which an illuminating area has passed). This requires the response speed to be coped with, as described above, so that overdrive writing is performed. A normal value is written before a display period is started, thereby holding a liquid crystal response in the subsequent display period (the remainder of one frame period) in a flat state.

Embodiment 3

Figure 29:
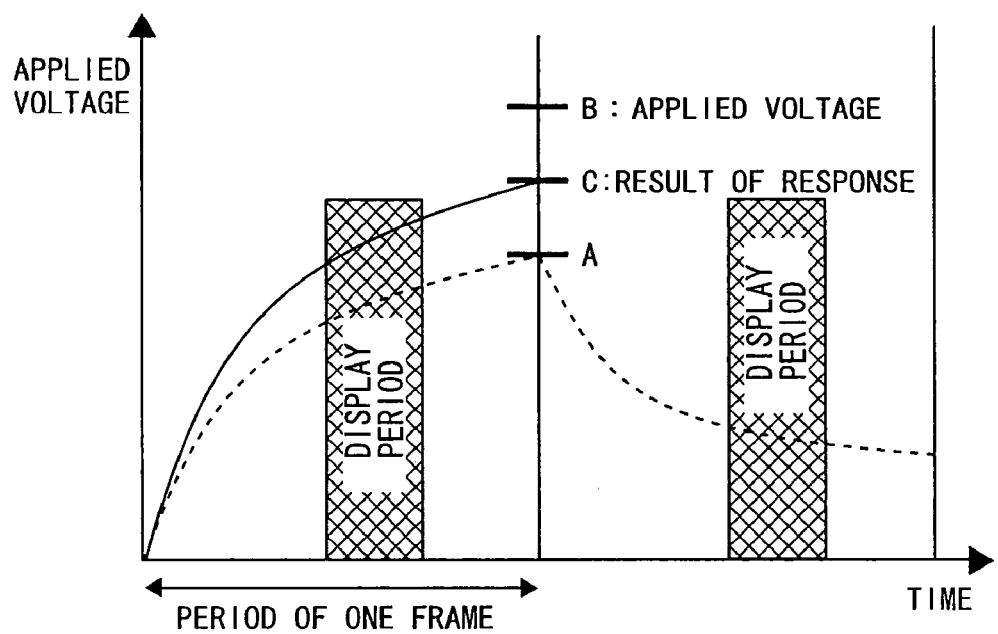
FIG. 29 is an explanatory view showing a method of solving that the luminance of a pixel is changed by a shift in an illumination period in a frame period.
Figure 30:
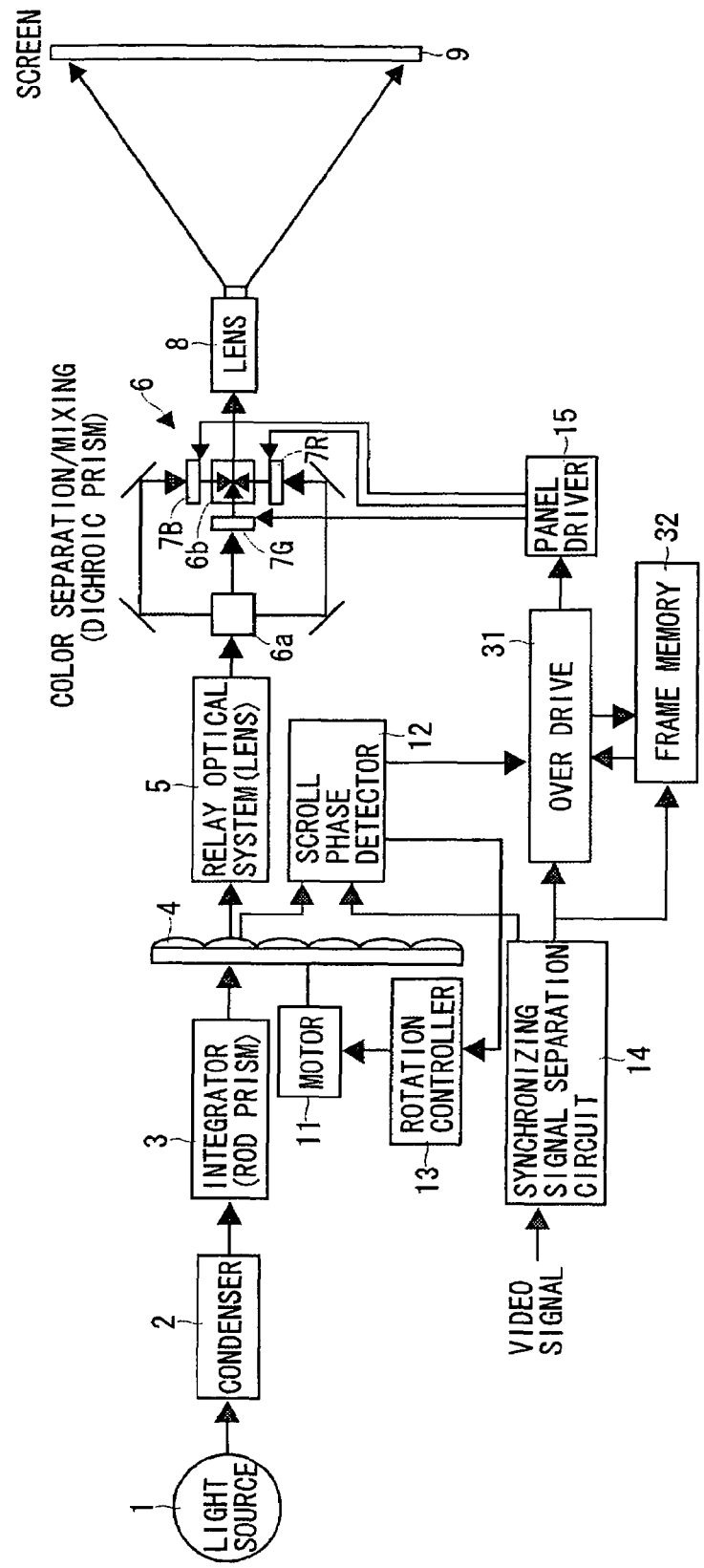
FIG. 30 is a block diagram showing a projection type video display according to a third embodiment of the present invention.

FIG. 30 illustrates the configuration of a projection type video display according to an embodiment 3. The present embodiment will be described while presenting problems in the configuration of the above-mentioned embodiment on the basis of FIG. 28 and FIG. 29.

Figure 28:
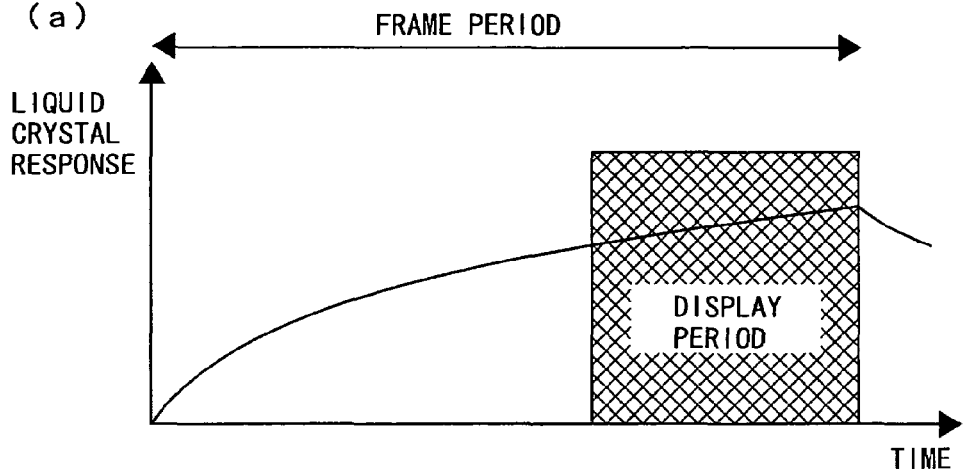
FIGS. 28(a), 28(b), and 28(c) are explanatory views showing that the luminance of a pixel is changed by a shift in an illumination period in a frame period and a solution thereto (an overdrive method)
Figure 28:
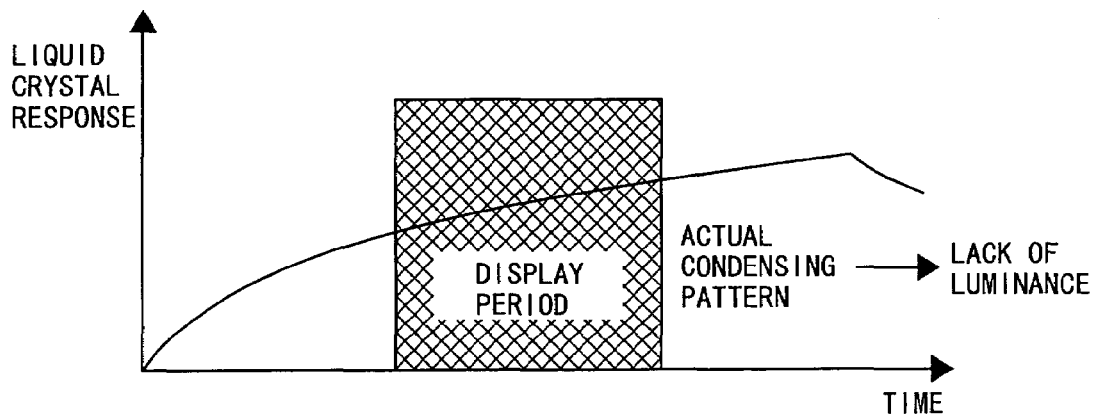
Figure 28:
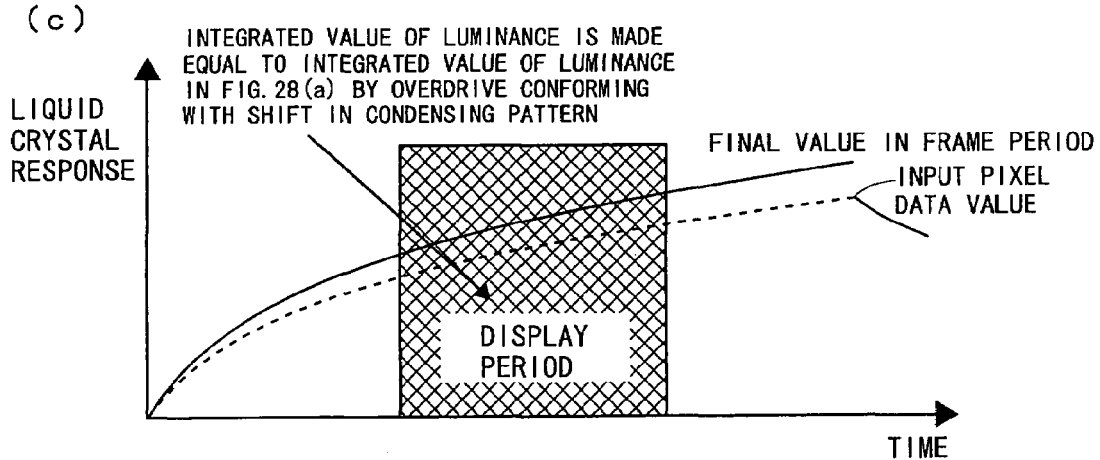

The problem is the rotation precision of a lens array wheel 4 (the rotation precision of a motor 11). If the illumination position is inevitably matched with the timing of frame writing, there is no problem. However, the rotation speed of the normal motor 11 is not completely stabilized. Therefore, a light irradiation period (a display period) moves back and forth in a frame period. This phenomenon is divided into two states (see FIG. 19). First, an ideal state is a state where the display period is almost matched with the phase of vertical synchronization, as shown in FIG. 28(*a*). On the other hand, when the display period is greatly shifted from the phase of vertical synchronization, a double image is perceived, as shown in FIG. 28(*b*). In this stage, a liquid crystal is responding, so that an image displayed on a liquid crystal panel is a double image having an image in the preceding frame and a written frame image displayed thereon. As a result, the perceived image is also a double image, which is recognized as significant degradation in image quality. FIG. 28 illustrates a case where a frame rate and a writing rate are the same. When a pixel response is quickened and flattened, as shown in FIG. 25, a deflection period by light deflecting means may be corrected and controlled such that the difference between a frame period and the deflection period occurs on the side of the advanced period of light irradiation onto a pixel with respect to the phase of the frame period.

In the present embodiment 3, a solution to the above-mentioned problem of the double image by an overdrive method as shown in FIG. 28(*c*) is disclosed. The overdrive herein disclosed is to cause the response to be in time such that the double image is improved in view of the light irradiation period (display period). That is, a value over an input pixel value is inputted (emphasized) as a pixel value such that a liquid crystal response will reach a target value within the light irradiation period (display period). For example, 130 and 30 are respectively inputted in the case of a change from 50 to 100 and the case of a change from 100 to 50. The values are determined by the speed of the liquid crystal response and the timing of irradiation. The input value is emphasized such that the double image is improved according to the timing of irradiation (the degree of a phase difference from the vertical synchronization).

In the overdrive herein described, a phase difference is further added to input of a table. A target value in this case should be determined such that an area formed in a pattern shown in FIG. 28(*c*) is the same as an area formed in a pattern shown in FIG. 28(*a*). Therefore, an actual writing value is determined by a value in the preceding frame and the value (target value) of data representing a pixel to be written, and the phase difference.

A difference between normal overdrive and overdrive in the present embodiment 3 is demanding attention in this case. In the normal overdrive, writing is performed such that an inputted pixel value becomes a final target value. Therefore, a final value in a frame period of a liquid crystal response is the same as input pixel data. When writing in the succeeding frame is performed, therefore, a writing value may be determined by comparing the input pixel data and input pixel data in the succeeding frame. On the other hand, the degree of overdrive considering the phase difference in the present embodiment 3 is changed in correspondence with the degree of the phase difference from the vertical synchronization, so that the final value in the frame period is also changed. Consequently, the final value in the frame period is not the same as the input pixel data. Therefore, when writing in the succeeding frame is performed, therefore, a writing value may be determined by previously writing data corresponding to the final value in the frame period into the frame memory 32 from the overdrive circuit 31 and comparing data corresponding to the final value in the frame period and the input pixel data in the succeeding frame.

Although repeatedly described, the difference between the normal overdrive and the overdrive considering the phase difference will be further described. In FIG. 29, a dotted line indicates a liquid crystal response in a case where normal overdrive is used. A indicates a pixel value (input pixel data in a frame). A liquid crystal exhibits a response as indicated by a solid line by inputting a larger value than the pixel value A into a liquid crystal display panel. The liquid crystal responds up to a pixel value, that is, a target level at the timing of frame switching. In the normal overdrive, therefore, overdrive in the succeeding frame may be performed on the basis of the pixel value A. In the overdrive considering the phase difference, however, an area in a period during which light is actually irradiated is inputted as a target value, so that a final value in a frame period becomes C. Therefore, overdrive in the succeeding frame is performed on the basis of the value C. The overdrive circuit 31 has a table which the final value (C) in the frame period is outputted by the input pixel data (A) in the frame and an actual writing value (an applied voltage B) by the overdrive considering the phase difference, carried therein, and gives the final value (C) in the frame period to a frame memory 32. In the succeeding frame, overdrive is performed by input pixel data in the frame, the final value (C) in the frame period which has been received from the frame memory 32, and phase difference information received from a scroll phase detector 12.

Embodiment 4

Figure 32:
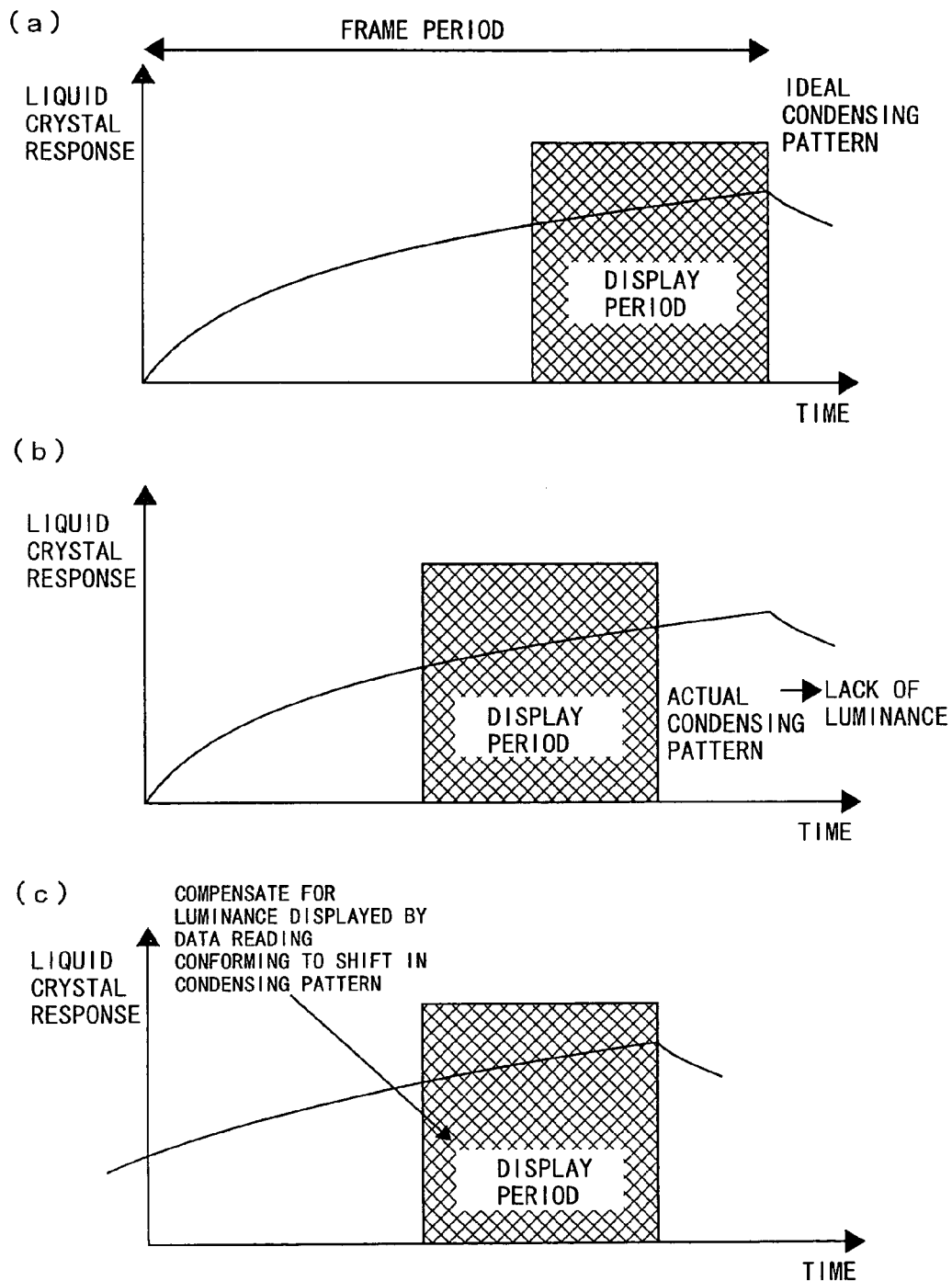
FIGS. 32(a), 32(b), and 32(c) are explanatory views showing that the luminance of a pixel is changed by a shift in an illumination period in a frame period and a solution thereto (frame read control)
Figure 33:
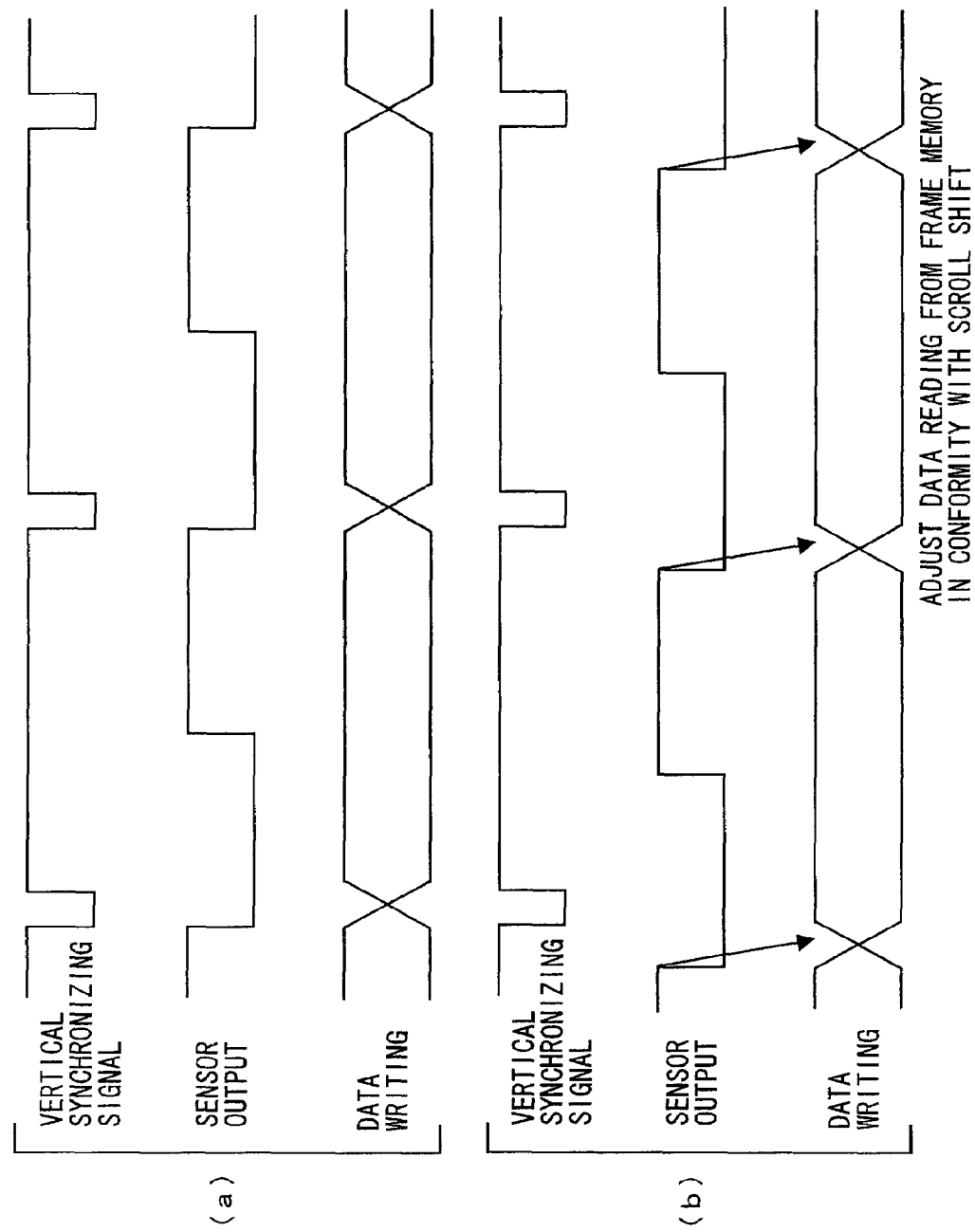
FIG. 33(a) is an explanatory view showing normal frame read control.
FIG. 33(b) is an explanatory view showing frame read control which is the above-mentioned solution.

A projection type video display according to an embodiment 4 will be described on the basis of FIGS. 31 to 33. Although in the present embodiment, the problem of a double image is solved, as in the embodiment 3, a method different from that in the embodiment 3 is proposed.

Figure 31:
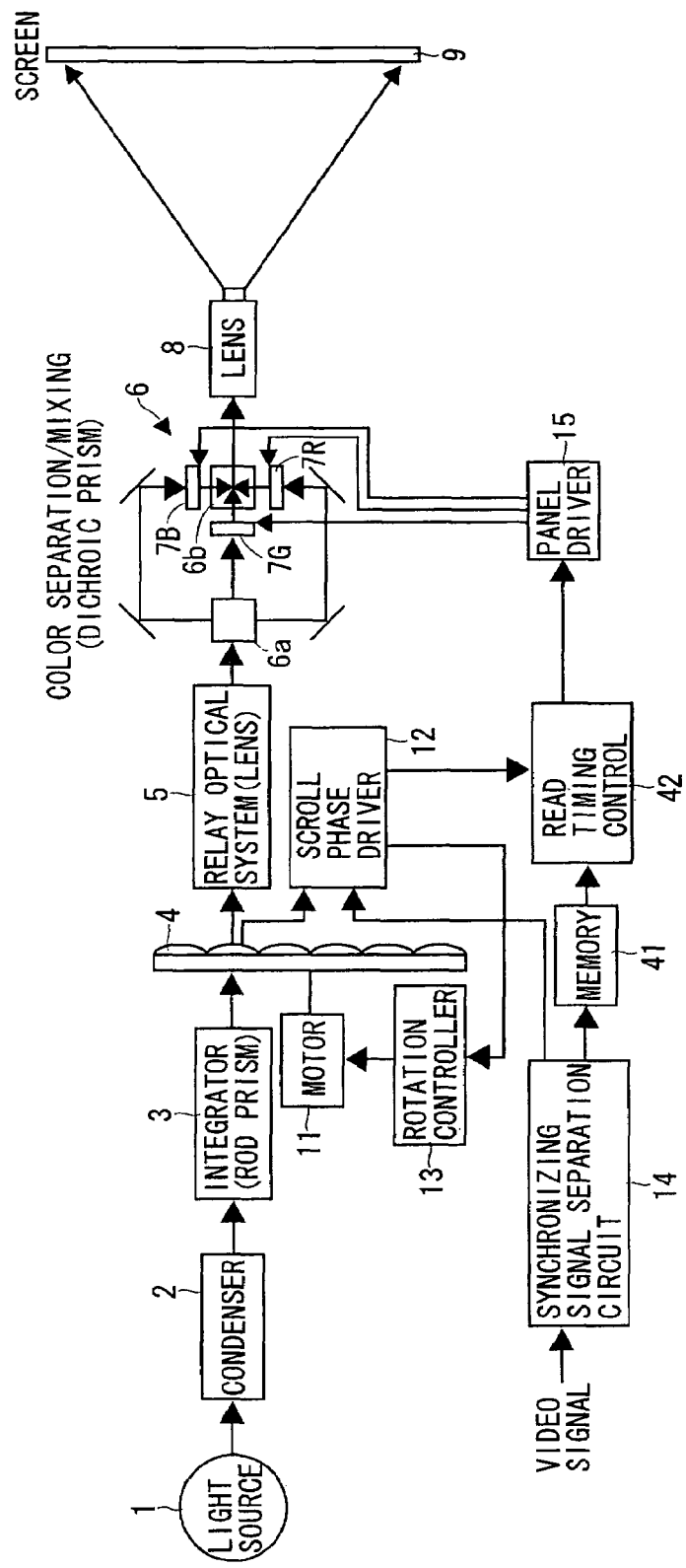
FIG. 31 is a block diagram showing a projection type video display according to a fourth embodiment of the present invention.

The projection type video display according to the present embodiment comprises a memory 41 storing image data and a read timing control circuit 42, as shown in FIG. 31. Image data (a frame) is stored in the memory 41, and image data in a frame preceding a frame actually fed is fed to the read timing control circuit 42. Although the read timing control circuit 42 successively reads out pixel data from the memory 41 and feeds the read pixel data to a panel driver 15, information related to a phase difference is received from a scroll phase detector 12, and adjusts the timing of feeding of the pixel data in response to the phase information (a scroll shift). When a phase shift as shown in FIG. 33(b) occurs from a state where there is no phase shift, as shown in FIG. 33(a) this appears as an output (phase information) of a sensor (the scroll phase detector 12). A data writing position (the timing of feeding into a panel) is shifted in an early period by control of the read timing control circuit 42. Consequently, the timing of reading out data and the timing of writing data into a liquid crystal panel are adjusted in conformity with vertical synchronization and a shift in an illumination pattern, as shown in FIG. 32. (c) so that a display luminance is ensured.

Figure 34:
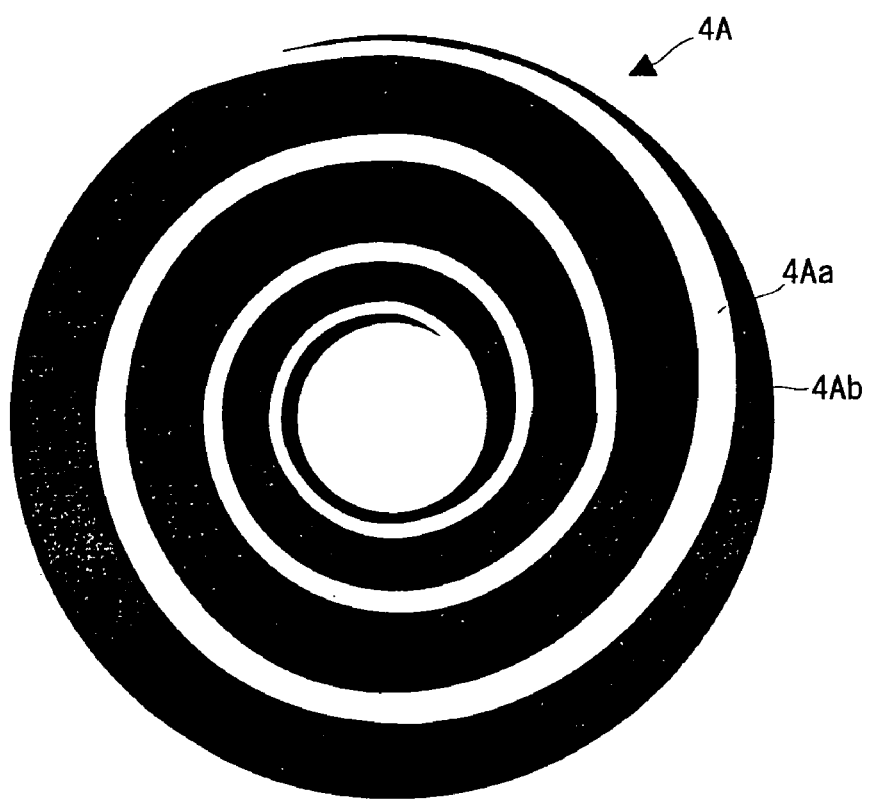
FIG. 34 is an explanatory view showing another example of light deflecting means.
Figure 35:
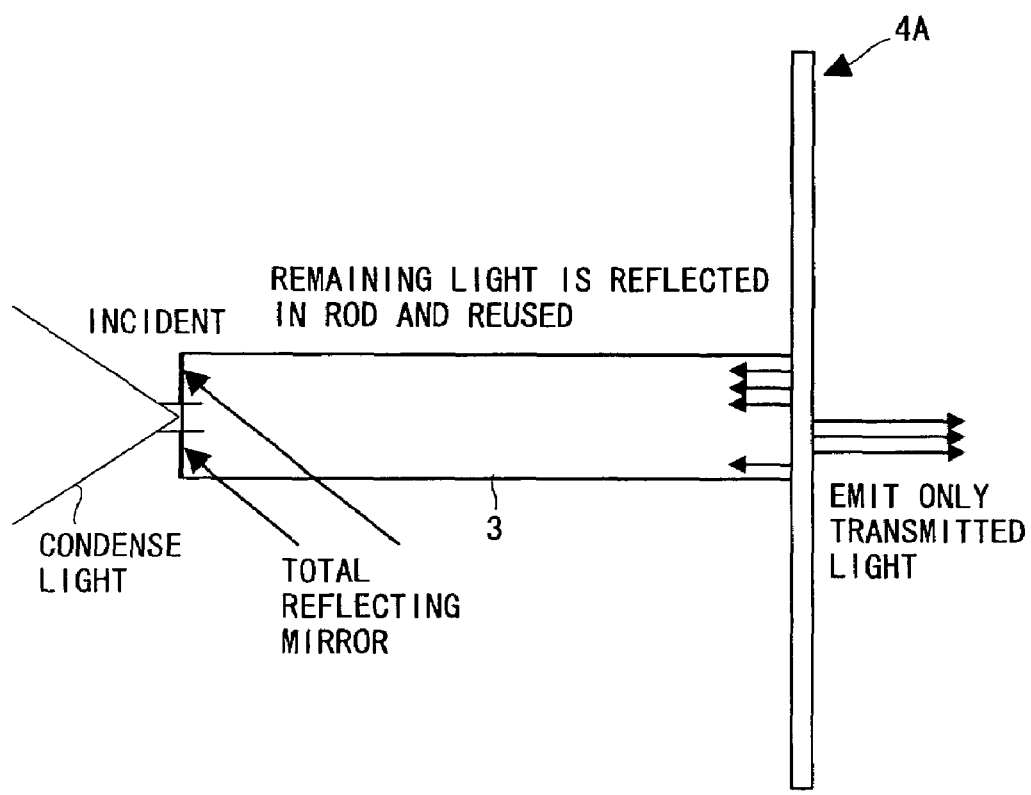
FIG. 35 is an explanatory view showing an example of a configuration using light deflecting means shown in FIG. 34.

The lens array wheel (LAW) can be replaced with a scroll disc 4A. The scroll disc 4A corresponds to one, a part of which is provided with a transparent portion and the remainder of which is a mirror. FIG. 34 illustrates the scroll disc 4A. In FIG. 34, 4Aa represents the transparent portion, and 4Ab represents the mirror. Consequently, white light is projected onto the liquid crystal display panel only in a period of a transmission portion of the scroll disc, for example, and the remainder is returned to the rod integrator 3, is reflected, and is reused, as shown in FIG. 35.

Figure 36:
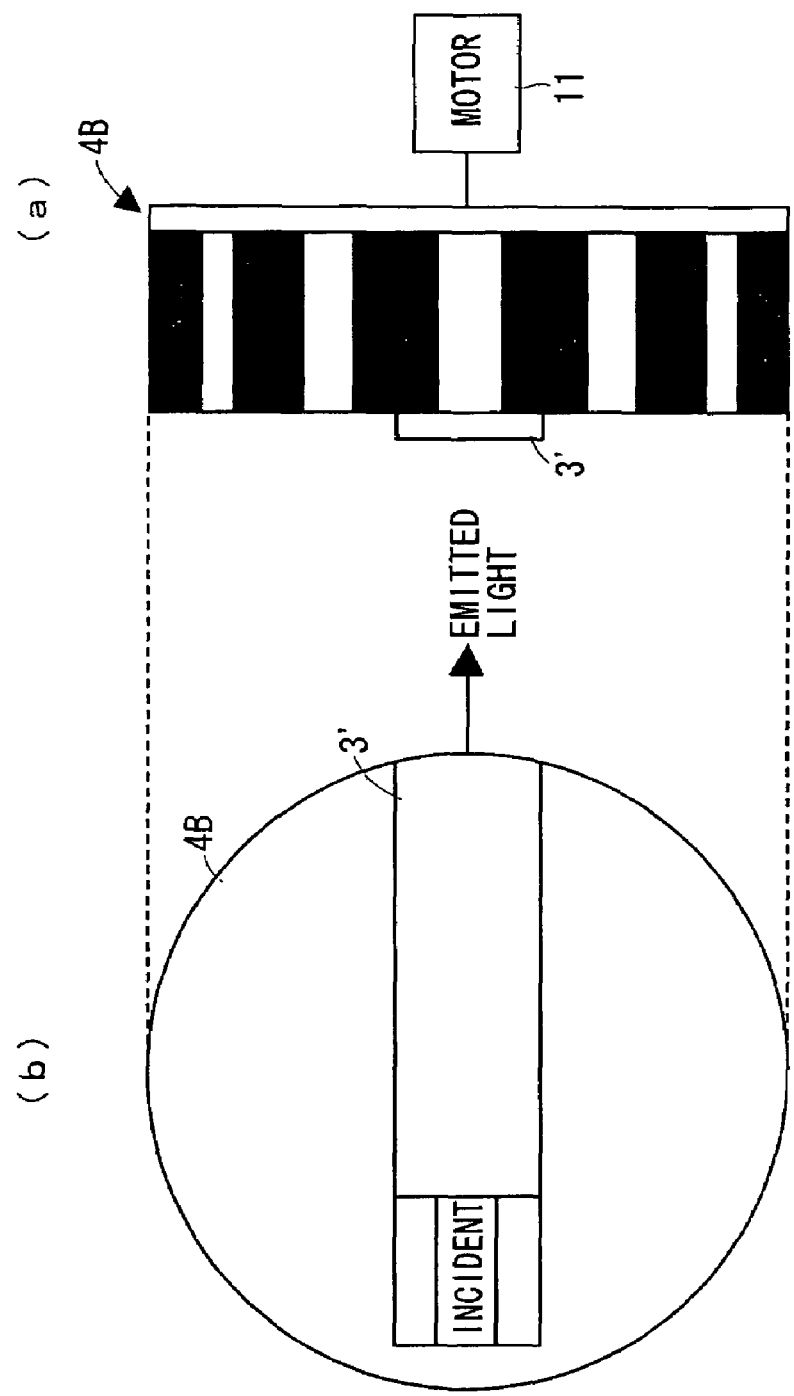
FIG. 36 is an explanatory view showing another example of light deflecting means, where

FIG. 36 illustrates a black-and-white wheel 4B serving as light deflecting means. An integrator 3 with an angle provided in its portion on which light is incident is constructed, and the black-and-white wheel 4B in a cylindrical shape is formed around the integrator 3'. The wheel 4B has such a rotational configuration that a part of light emitted from the integrator 3' is transmitted and the remainder is reflected for each frame period. The wheel 4B is rotated, thereby obtaining scrolling light on the liquid crystal panel.

Although the normal rod integrator 3 is in a linear shape, light cannot be irradiated toward a surface of the wheel inside the black-and-white wheel 4B if the shape is left unchanged. Therefore, light is guided to the surface using the rod integrator 3' folded halfway. A black portion of the wheel indicates a reflecting surface to its inner part, and a white portion thereof indicates a transparent transmission surface. The light irradiated onto the reflecting surface which is indicated in black is returned to the inner part, and is reused. Since the transmission surface corresponds to an area which is a part of a screen (approximately one-third in the drawing), light condensed in the area is irradiated onto the liquid crystal panel, and the black-and-white wheel 4B is rotated so that the irradiated light is scrolled.

Figure 37:
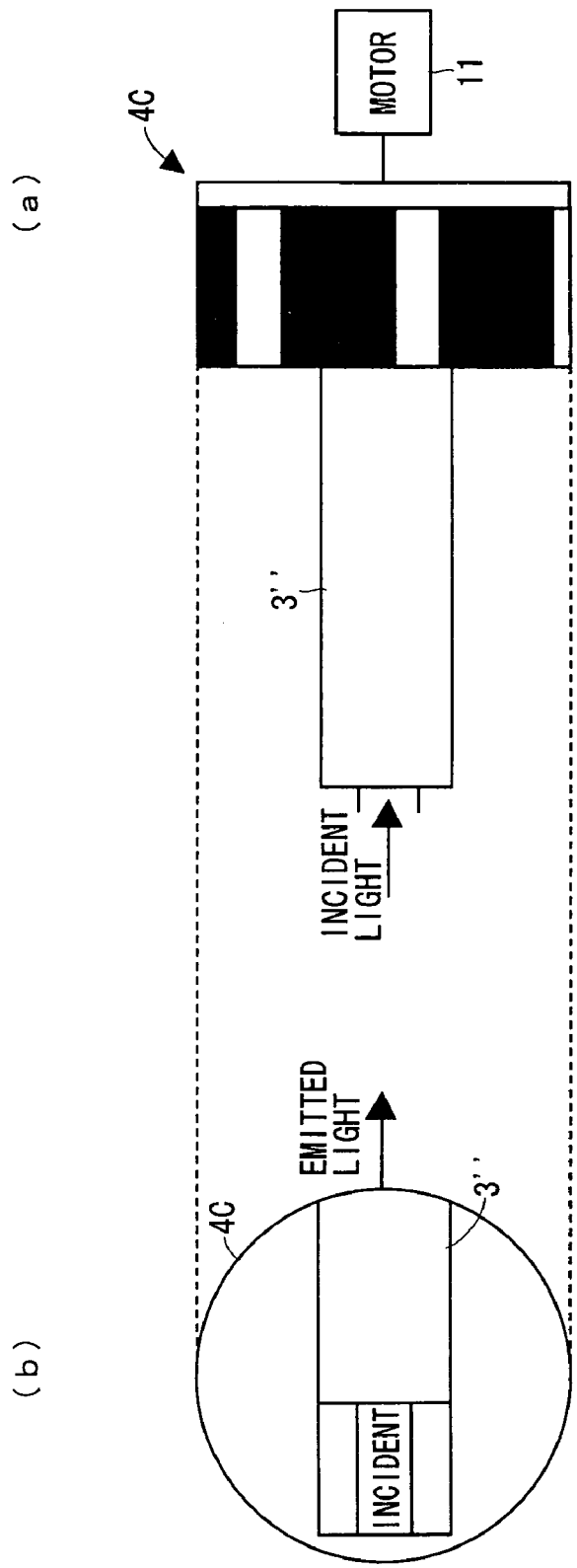
FIG. 37 is an explanatory view showing another example of light deflecting means, where

Although a portion on the incident side of the rod integrator 3' is folded in the configuration shown in FIG. 36, it is also possible to use a rod integrator 3" folded on the emitting side, and to use a small-diameter black-and-white wheel 4C, as shown in FIG. 37. Although a configuration is long in a transverse direction in this case, the small-diameter black-and-white wheel 4C can be used. Therefore, a motor rotated at high speed can be employed. Generally, the motor is more easily controlled when it is rotated at high speed, so that the effect is high from the viewpoint of prevention of production of a double image.

Figure 38:
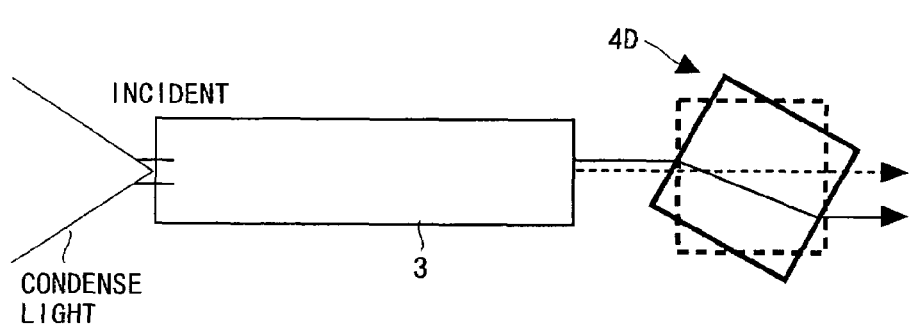
FIG. 38 is an explanatory view showing another example of light deflecting means.

A scrolling prism 4D can be used, as shown in FIG. 38. The scrolling prism 4D has the shape of a cube, and is so constructed that its rotation axis is set in the vertical direction in the drawing, its four surfaces oppositely face one another by periodically changing an angle to a light exit surface of the rod integrator 3, and emitted light is scrolled by the refraction function of light.

Although in the above-mentioned embodiment, the transmission type liquid crystal display panel is used, the present invention is not limited to the same. For example, a reflection type liquid crystal display panel, a device for driving each of micro mirrors arranged in a matrix shape on the basis of pixel data can be also used.

Figure 39:
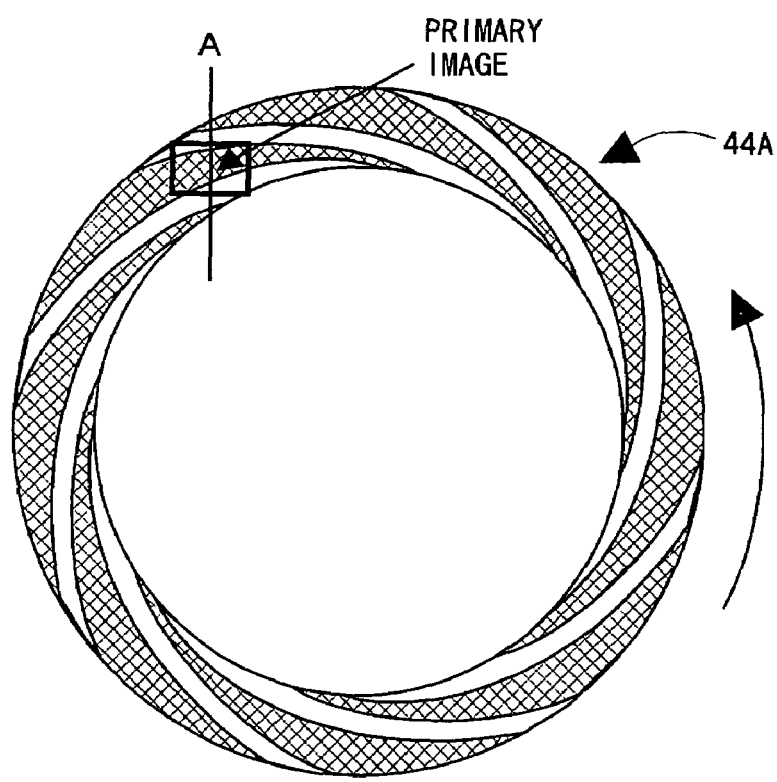
FIG. 39 is an explanatory view showing a scroll disc which is another example of light deflecting means.
Figure 40:
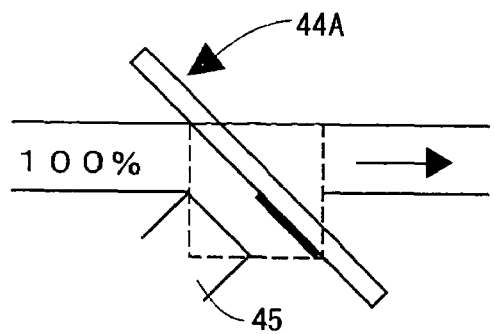
FIG. 40 is a diagram showing a cross section taken along a line A-A in the scroll disc shown in FIG. 39, where FIGS. 40(a), 40(b), and 40(c) respectively show how a light transmitted state is changed by the rotation of the scroll disc.
Figure 40:
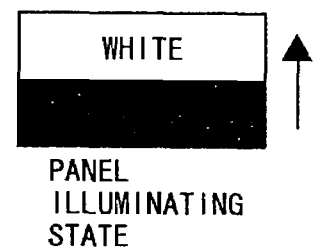
Figure 40:
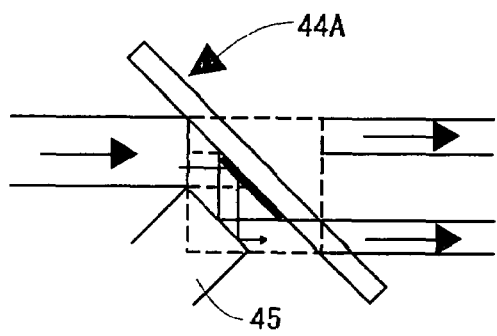
Figure 40:
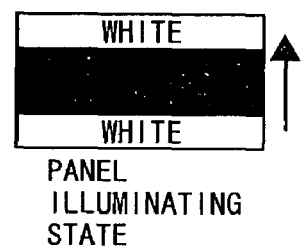
Figure 40:
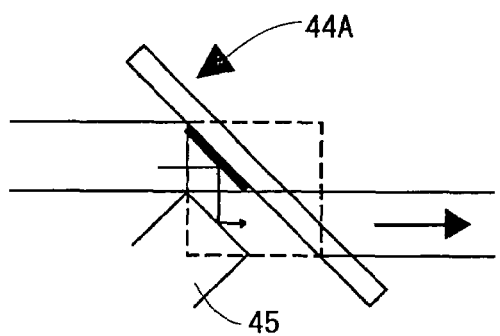
Figure 40:
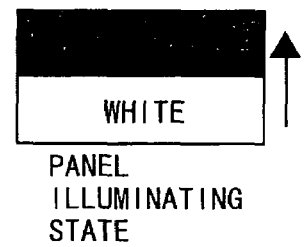

FIG. 39 illustrates a scroll disc 44A. A square frame indicated by a solid line in the drawing indicates a primary image formation area into which light from the light source is introduced. In FIG. 39, a light reflection area of the scroll disc 44A is indicated by hatching. FIG. 40 illustrates a cross section taken along a line A-A in the scroll disc 44A. FIGS. 40(a), 40(b), and 40(c) show how a light transmitted state is changed by rotating the scroll disc 44A. The scroll disc 44A is arranged so as to be inclined at an angle of 45 degrees to optical axis. An auxiliary mirror 45 is provided so as to oppositely face the scroll disc 44A at a position where light introduced from the light source is not obstructed. Light reflected on a light reflection area of the scroll disc 44A is introduced into the auxiliary mirror 45, and the light reflected on the auxiliary mirror 45 passes through a light transmission area of the scroll disc 44A. The light from the light source introduced into the primary image formation area of the scroll disc 44A by the transmission function of the light transmission area of the scroll disc 44A and the above-mentioned reflection function is introduced into the liquid crystal display panel without being uselessly used, thereby improving the luminance of a display video.

Figure 44:
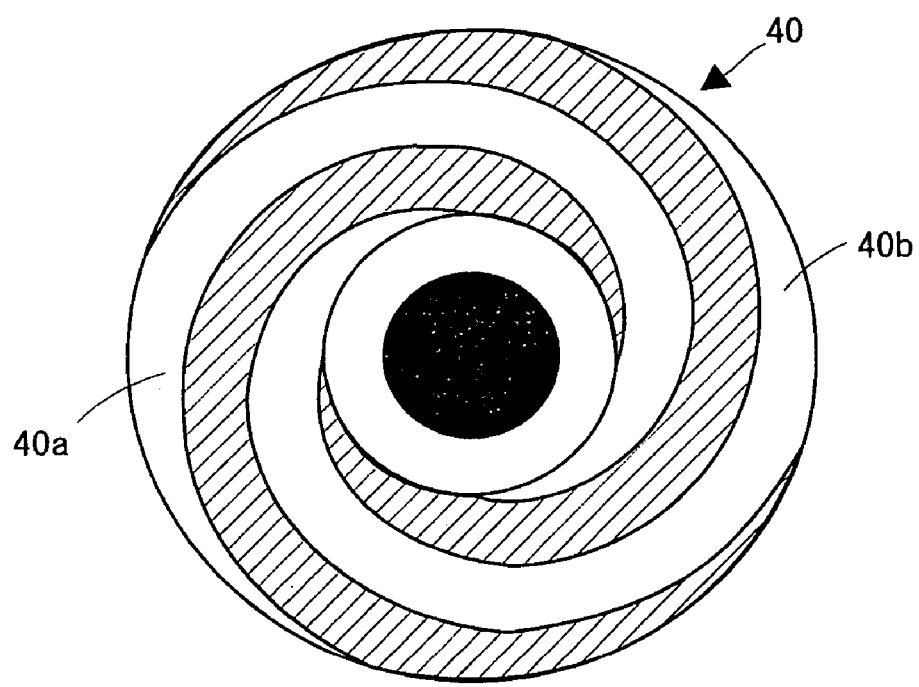
FIG. 44 is an explanatory view showing an example of a disc composing a scroll optical system.

Although the scroll disc 44A shown in FIGS. 39 and 40 has a light reflection area formed on one surface of its transparent disc, light reflection areas may be formed on both surfaces of the transparent disc. Both the surfaces of the transparent disc are used for light reflection, resulting in release from restrictions in a case where only one surface of the transparent disc is a light reflection surface and making it easy to design the scroll disc, for example. Also usable as the scroll disc is a scroll disc 40 formed by shifting the phases of two spiral apertures 40a and 40b by 180 degrees, as shown in FIG. 44, for example.

As described in the foregoing, light is scrolled onto a hold type display element by an optical system which can be miniaturized, thereby making it possible to improve degradation in image quality in a case where a moving image is displayed, which is referred to as hold blurring. Further, the quality of the display video can be improved by also flattening a pixel response to reduce a change in luminance (prevent a double image) and eliminating malfunction due to rotation irregularity of light deflecting means.

Figure 41:
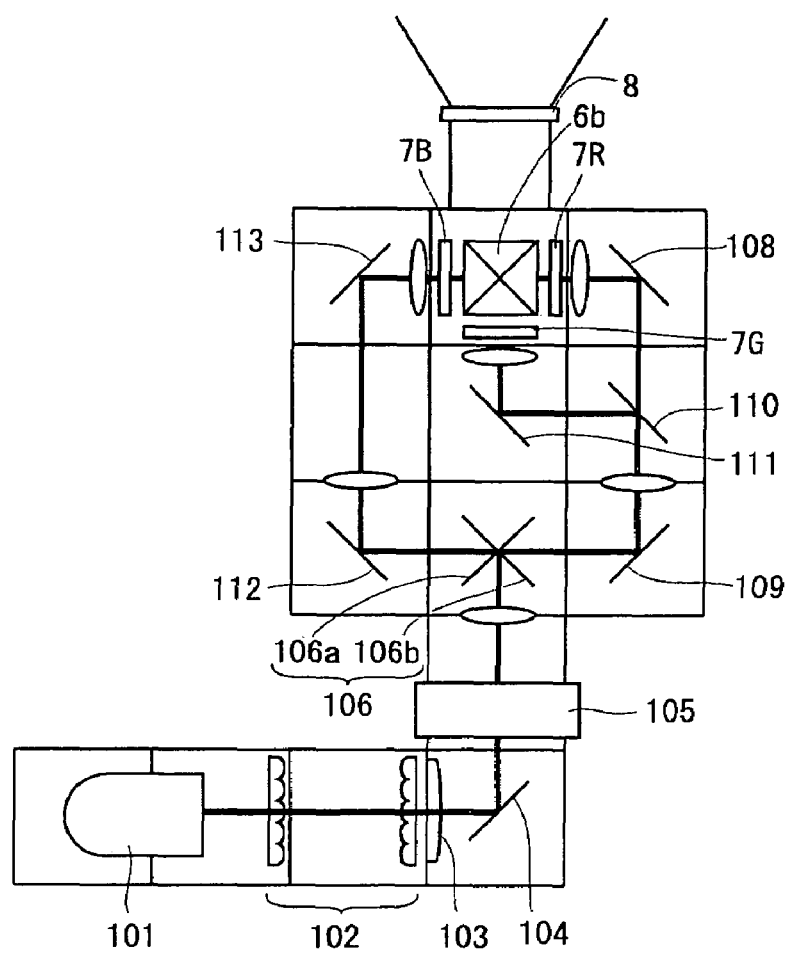
FIG. 41 is an explanatory view showing an illuminating optical system.

FIG. 41 illustrates an irradiation optical system 100. A light source 101 is composed of a metal halide lamp, a xenon lamp, or the like, and its irradiated light is emitted after being changed into parallel lights by a parabolic reflector, and is introduced into an integrator lens 102.

The integrator lens 102 is composed of a pair of groups of lenses, and each of the pairs of lenses introduces the light emitted from the light source 101 into a light incident area of a scroll optical system 105. The above-mentioned primary image formation area (a scrolling irradiation area) is made shorter in the vertical direction than the size of a liquid crystal display panel, and each of the lenses composing the integrator lens 102 is correspondingly made short in the vertical direction. The scroll optical system 105 can be constructed using members shown in FIGS. 34 to 40, that is, the lens array wheel 4 and the scroll discs 4A and 44A, described above, for example. Light passing through the integrator lens 102 is introduced into dichroic mirrors 106a and 106b arranged in a cross shape after passing through a condenser lens 103, a mirror 104, the scroll optical system 105, and so on.

The dichroic mirror 106a reflects a red light component and a green light component, while transmitting a blue light component. The dichroic mirror 106b reflects a blue light component, while transmitting a red light component and a green light component. The dichroic mirrors 106a and 106b are arranged on an optical axis of lights which have not been separated yet (lights on a primary image formation area). Further, a color recombining dichroic prism 6b is arranged on the same optical axis. An optical path of two lights (red light and green light) and an optical path of one light (blue light) are symmetrical about the optical axis, and the green light of the lights is separated by a dichroic mirror 110 at a halfway portion on the optical path of the two lights and is introduced onto the optical axis by a mirror 111. Consequently, an optical path length from the dichroic mirror 106a to a liquid crystal display panel for red 7R through a mirror 109 and a mirror 108, an optical path length from the dichroic mirror 106a to a liquid crystal display panel for green 7G through the dichroic mirror 110 and the mirror 111, and an optical path length from the dichroic mirror 106b to a liquid crystal display panel for blue 7B through a mirror 112 and a mirror 113 are equal to one another.

Figure 65:
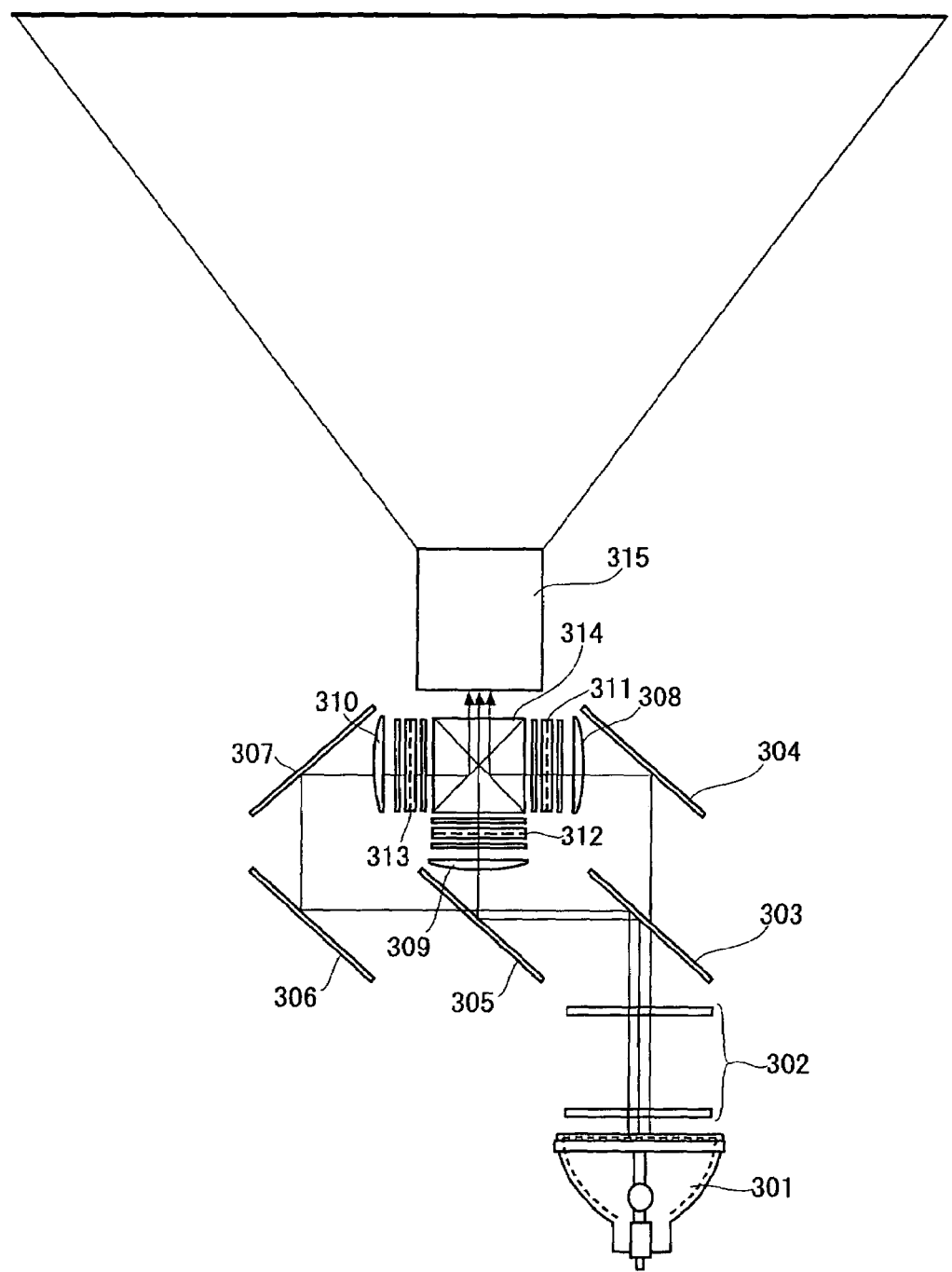
FIG. 65 is a diagram showing the configuration of a general projection type video display using a color recombining optical system by a dichroic prism.

In a general configuration using a color recombining optical system by a dichroic prism, a relay optical system is arranged on the optical path of blue light, for example. FIG. 65 illustrates such a configuration.

In FIG. 65, a light emitter in a light source 301 is composed of a ultra-high pressure mercury lamp, a metal halide lamp, a xenon lamp, or the like, and its irradiated light is emitted after being changed into parallel lights by a parabolic reflector, and is introduced into an integrator lens 302.

The integrator lens 302 is composed of a pair of groups of lenses, and each of the pairs of lenses introduces the light emitted from the light source 301 into the whole surfaces of liquid crystal light valves 311, 312, and 313. The light which has passed through the integrator lens 302 is introduced into a first dichroic mirror 303.

The first dichroic mirror 303 transmits light in a red wavelength band and reflects light in a cyan (green+blue) wavelength band. The light in the red wavelength band which has passed through the first dichroic mirror 303 is reflected on a total reflecting mirror 304 so that its optical path is changed. The red light which has been reflected on the total reflecting mirror 304 is optically modulated by passing through the transmission type liquid crystal light valve for red 311 through a condenser lens 308. On the other hand, the light in the cyan wavelength band which has been reflected on the first dichroic mirror. 303 is introduced into a second dichroic mirror 305.

The second dichroic mirror 305 transmits light in a blue wavelength band and reflects light in a green wavelength band. The light in the green wavelength band which has been reflected on the second dichroic mirror 305 is introduced into a transmission type liquid crystal light valve for green 312 through a condenser lens 309, and is optically modulated by passing through the liquid crystal light valve 312. The light in the blue wavelength band which has passed through the second dichroic mirror 305 is introduced into the transmission type liquid crystal light valve for blue 313 through total reflecting mirrors 306 and 307 and a condenser lens 310, and is optically modulated by passing through the liquid crystal light valve 313.

Each of the liquid crystal light valves 311, 312, and 313 comprises an incident-side light polarizer, a panel constructed by sealing a liquid crystal between a pair of glass boards (having a pixel electrode and an alignment film formed therein), and an emitting-side light polarizer. Modulated lights (image lights in respective colors) modulated by respectively passing through the liquid crystal light valves 311, 312, and 313 are recombined by a dichroic prism 314, to be a color image light. The color image light is enlarged and projected by a projection lens unit 315, and is projected and displayed on a screen.

When an optical system as shown in FIG. 65 is applied as it is, the scroll direction of irradiated blue light may be opposite to the scroll direction of light in the other color by a relay optical system. In the above-mentioned configuration shown in FIG. 41, the optical path lengths to the liquid crystal display panels in the respective colors after the color separation are made equal to one another, thereby making it possible to eliminate the necessity of the relay optical system while using the general configuration of the color recombining optical system by the dichroic prism, to obtain the superior effect of reducing the number of optical members at the same time that consistency in the scroll direction is ensured.

The red light and the cyan light are separated, the green light is separated on the optical path of the cyan light, thereby making it possible to also make the optical path lengths of the lights in the respective colors equal to one another, as in the foregoing.

In the optical system shown in FIG. 41, described above, however, a vertically line appears on the image on the screen by the effects of the dichroic mirrors 106a and 106b arranged in a cross shape.

Description is now made of a projection type video display capable of making the optical path lengths of the lights in the three primary colors equal to one another, for example, without arranging the dichroic mirrors in a cross shape.

Figure 42:
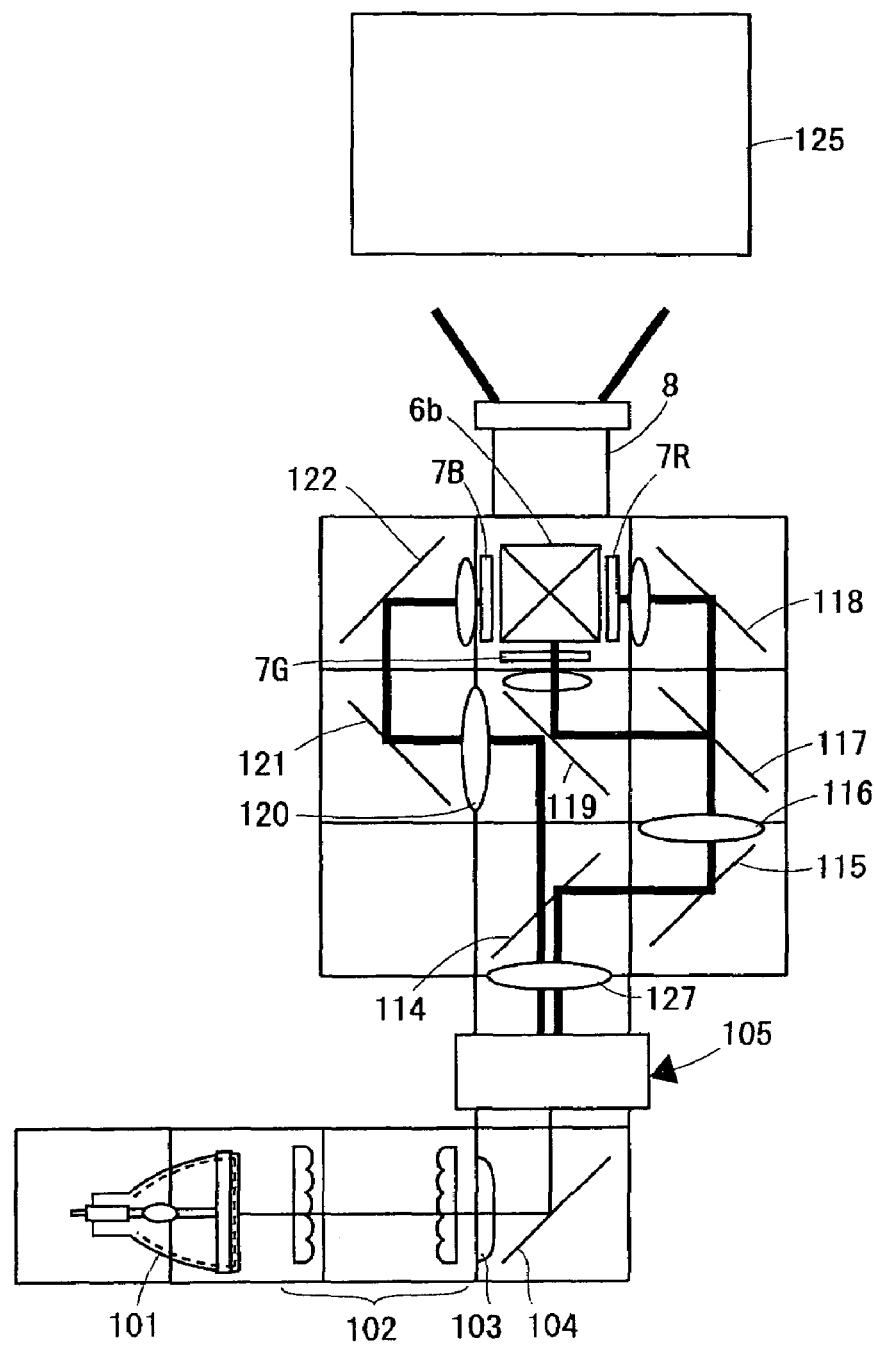
FIG. 42 is an explanatory view showing another example of an illuminating optical system.

FIG. 42 is a diagram illustrating an optical system for a color liquid crystal projector using a three-panel scroll system. Liquid crystal light valves 7R, 7G, and 7B are arranged so as to respectively oppositely face three light entrance surfaces of a dichroic prism 6b in a rectangular parallelepiped shape. Modulated light from the liquid crystal light valve for red 7R arranged on the right side in the drawing is incident on the dichroic prism 6b, is then reflected, and is emitted from a light exit surface of the dichroic prism 6b, and modulated light from the liquid crystal light valve for blue 7B arranged on the left side in the drawing is incident on the dichroic prism 6b, is then reflected, and is emitted from a light exit surface of the dichroic prism 6b. Modulated light from the liquid crystal light valve for green 7G arranged at the center in the drawing is incident on the dichroic prism 6b, is then transmitted, and is emitted from the light exit surface of the dichroic prism 6b.

A double-face mirror 119 is arranged on the incident side of the transmission type liquid crystal light valve for green 7G in a state where it is inclined at 45 degrees to its light incident optical axis. The dichroic prism 6b, a liquid crystal light valve for green 7G, the double-face mirror 119, and a first dichroic mirror 114 are arranged so as to be arranged on one straight line. The double-face mirror 119 is arranged on the incident side of the transmission type liquid crystal light valve for green 7G in a state where it is inclined at 45 degrees to its light incident optical axis.

A light emitter in a light source 101 is composed of a ultra-high pressure mercury lamp, a metal halide lamp, a xenon lamp, or the like, and its irradiated light is emitted after being changed into parallel lights by a parabolic reflector, and is introduced into an integrator lens 102.

The integrator lens 102 is composed of a pair of groups of lenses (a pair of fly eye lenses), and each of the pairs of lenses introduces the light emitted from the light source 101 into the liquid crystal light valves 7R, 7G, and 7B. Light emitted from the light source 101 is introduced into a scroll optical system 105 through the integrator lens 102, a lens 103, and a reflecting mirror 104 arranged so as to be inclined at 45 degrees to an optical axis of the light source, and the light which has passed through the scroll optical system 105 leads to a lens 127. The scroll optical system 105 circularly deflects, when it receives the light irradiated from the light source 101 and transmits the received light, the light, and circularly scrolls each of band-shaped lights in the respective colors condensed on the liquid crystal light valves 7R, 7G, and 7B in a smaller area than that of the light valve. As to the scroll optical system 105, the configuration shown in FIGS. 34 to 40 can be employed.

The light emitted from the scroll optical system 105 is introduced into the first dichroic mirror 114 through the lens 127.

The first dichroic mirror 114 reflects red light and green light, while transmitting blue light. The red light and the green light which have been reflected by the first dichroic mirror 114 are reflected by a reflecting mirror 115 so that the optical path thereof is changed. The red light reflected by the reflecting mirror 115 is introduced into a second dichroic mirror 117 through a condenser lens 116.

The second dichroic mirror 117 transmits the red light, while reflecting the green light. The red light is reflected on a total reflecting mirror 118, and is optically modulated by passing through the transmission type liquid crystal light valve for red 7R. On the other hand, the green light which has been reflected on the second dichroic mirror 117 is introduced into the double-face mirror 119.

An optical axis of the green light which has been reflected on the second dichroic mirror 117 and an optical axis of the blue light which has passed through the first dichroic mirror 114 are so set as to cross each other. The double-face mirror 119 is so constructed as to be positioned at the above-mentioned position where the optical axes cross each other. The green light which has been reflected on the double-face mirror 119 is introduced into the transmission type liquid crystal light valve for green 7G, and is optically modulated by passing through the liquid crystal light valve 7G. The blue light which has been reflected on the double-face mirror 119 is reflected on Ereflecting mirrors 121 and 122 through a condenser lens 120, is introduced into the transmission type liquid crystal light valve for blue 7B, and is optically modulated by passing through the liquid crystal light valve for blue 7B.

The modulated lights (image lights in the respective colors) which have been respectively modulated by passing through the liquid crystal light valves 7R, 7G, and 7B are recombined by the dichroic prism 6b, to form a color image light. The color image light is emitted from a light exit surface of the dichroic prism 6b, is enlarged and projected by a projection lens unit 8, and is projected on a screen 125.

An optical axis of the blue light which has passed through the first dichroic mirror 114 and an optical axis of the green light which has been reflected on the second dichroic mirror 117 cross each other on the double-face mirror 119 so that the lights in the respective colors are reflected on the double-face mirror 119, and the optical path lengths of optical paths for respectively introducing the lights in the respective colors into the liquid crystal light valves for the three primary colors can be made equal to one another. No dichroic mirrors arranged in a cross shape are used, thereby making it possible to also prevent a vertically line from appearing on an image on the screen.

Figure 43:
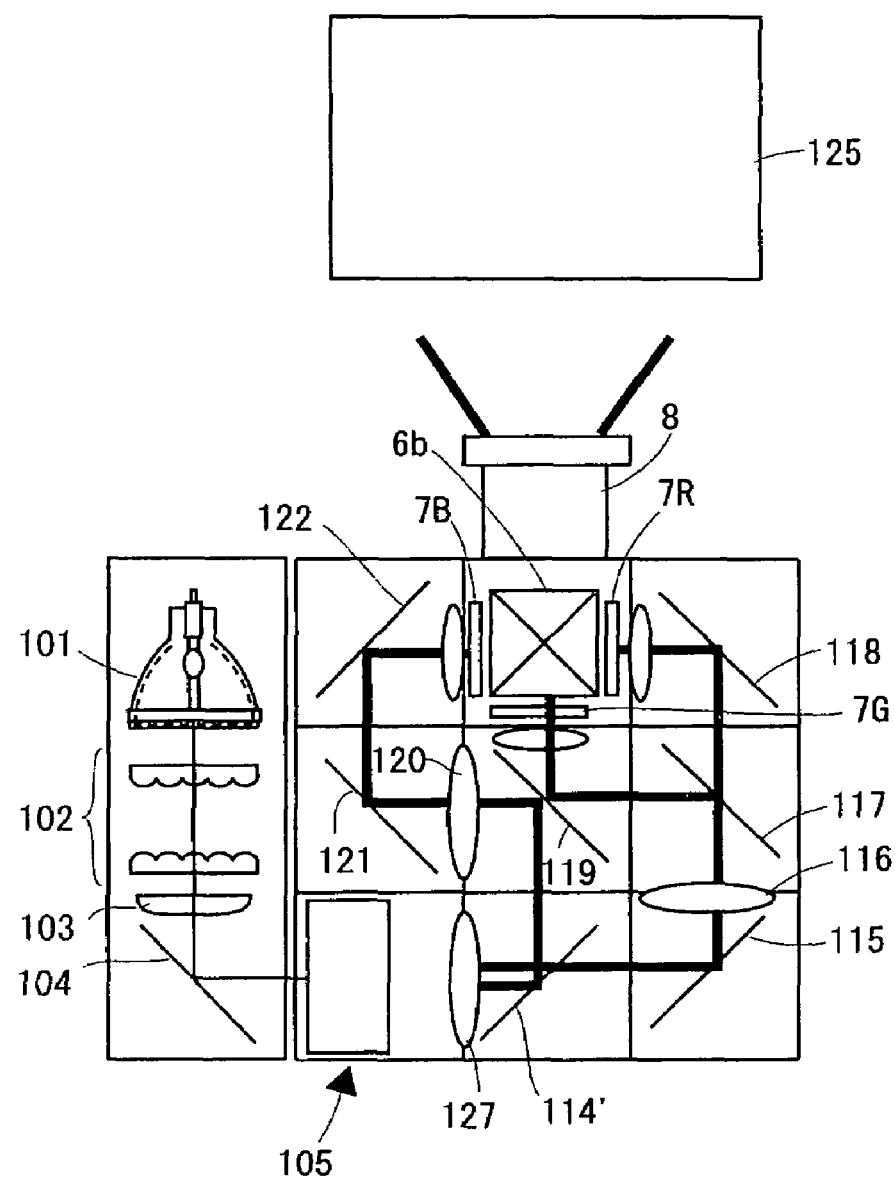
FIG. 43 is an explanatory view showing still another example of an illuminating optical system.

FIG. 43 is a diagram showing another example of an optical system for a color liquid crystal projector using a three-panel scroll system. The same members as the constituent elements shown in FIG. 42 are assigned the same reference numerals. In the liquid crystal projector shown in FIG. 42, the scroll optical system 105 is arranged on a straight line on which the dichroic prism 6b, the liquid crystal light valve for green 7G, the double-face mirror 119, and the first dichroic mirror 114 are arranged such that its optical axis is matched with the straight line. On the other hand, in the liquid crystal projector shown in FIG. 43, a scroll optical system 105 is provided such that its optical axis cross the above-mentioned straight line at right angles. White light which has passed through the scroll optical system 105 is introduced into a first dichroic mirror 114'. The first dichroic mirror 114' reflects blue light and changes its optical path by 90 degrees, to transmit red light and green light. In such a configuration, a space on the left side of the first dichroic mirror 114' in the drawing (a space opposite to a space where the reflecting mirror 115 is arranged) can be made effective use, thereby allowing the liquid crystal projector to be made compact.

In the respective configurations shown in FIGS. 42 and 43, no dichroic mirrors arranged in a cross shape are used, thereby making it possible to prevent a vertically line from appearing on an image on a screen.

Although in the above-mentioned embodiment, the first dichroic mirror 114 (114') is arranged on the one straight line on which the dichroic prism 6b, the liquid crystal light valve for green 7G, and the double-face mirror 119 are arranged, the present invention is not limited to such a configuration.

As described in the foregoing, according to the present invention, in the configuration in which the light is scrolled onto the display element, the optical path lengths of the lights in the three primary colors can be made equal to one another without arranging the dichroic mirrors in a cross shape, thereby making it possible to remove the relay lens system to reduce cost and prevent the scroll direction from being reversed. Also in a configuration in which the light deflecting means is arranged on the optical path in each of the colors, the effect of preventing the scroll direction from being reversed is produced.

Description is made of an embodiment in which the width of a spiral aperture of a scroll disc can be adjusted.

Figure 45:
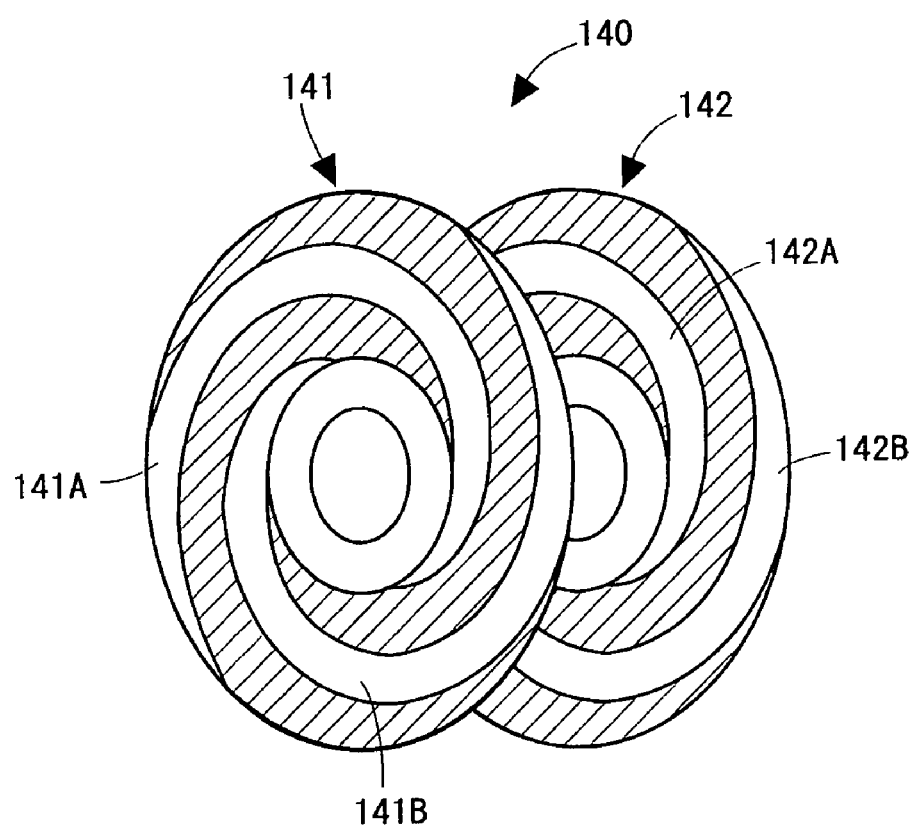
FIG. 45 is an explanatory view showing a scroll disc constructed by putting two rotating discs close together.
Figure 46:
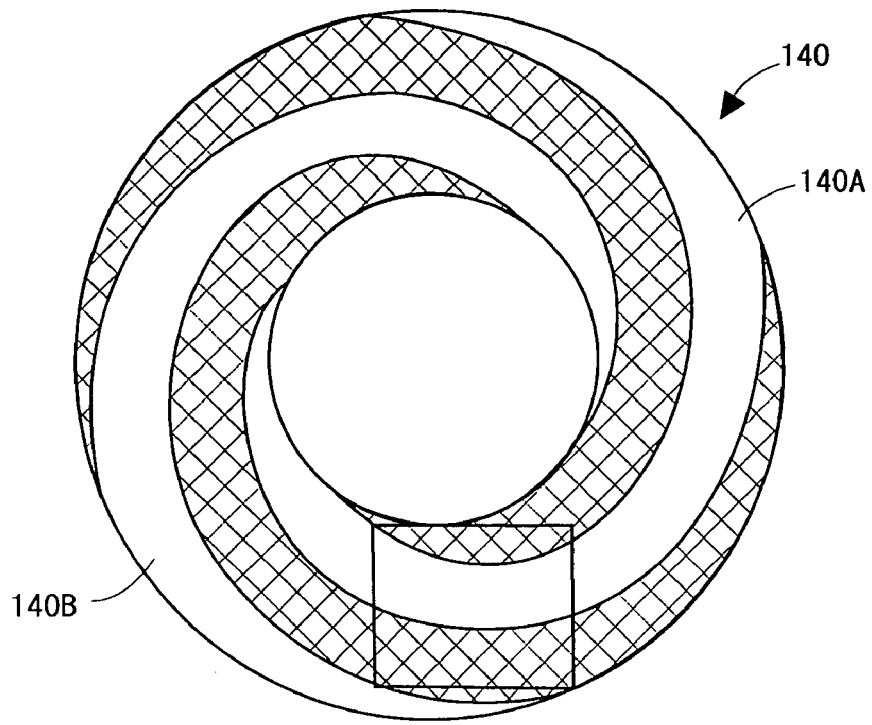
FIG. 46(a) is an explanatory view showing a scroll disc in a state where two rotating discs are overlapped with each other in the same phase.
FIG. 46(b) is an explanatory view showing a scroll disc in a state where a phase of two rotating discs are slightly shifted.
Figure 46:
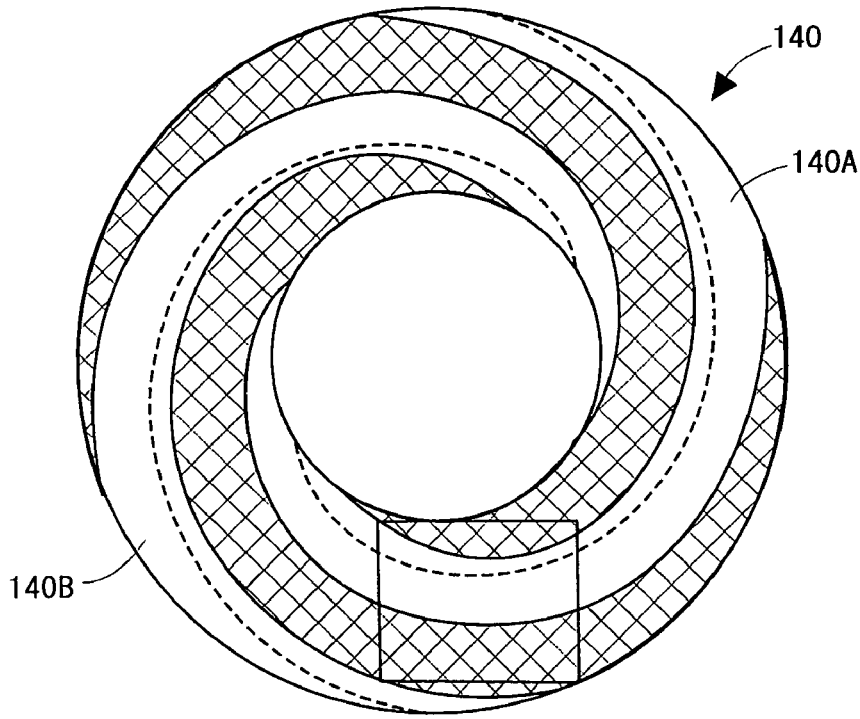

A scroll disc 140 is constructed by putting a first rotating disc 141 and a second rotating disc 142 close together, as shown in FIG. 45 and FIGS. 46(*a*) and 46(*b*) In FIG. 45, the first rotating disc 141 and the second rotating disc 142 are illustrated, spaced apart from each other for convenience of illustration. The first rotating disc 141 has a first transmitter 141A and a second transmitter 141B in the same spiral shape with their phases shifted by 180 degrees. The second rotating disc 142 has a first transmitter 142A and a second transmitter 142B in the same spiral shape with their phases shifted by 180 degrees. In the present embodiment, the first transmitter 141A and the first transmitter 142A have the same shape, and the second transmitter 141B and the second transmitter 142B have the same shape. However, the first rotating disc 141 and the second rotating disc 142 need not thus have the same configuration. That is, the width of a first transmitter 140A formed by putting the first transmitter 141A and the first transmitter 142A close together and the width of a second transmitter 140B formed by putting the second transmitter 141B and the second transmitter 142B close together may be changeable due to a change in relative rotation position (a phase shift) between both the discs (see a dotted line in FIG. 46(*b*)).

Description is now made of a width adjusting mechanism for adjusting the widths of the first transmitter 140A and the second transmitter 140B by changing and setting a relative rotation angle between the first rotating disc 141 and the second rotating disc 142 around a rotation axis.

Figure 47:
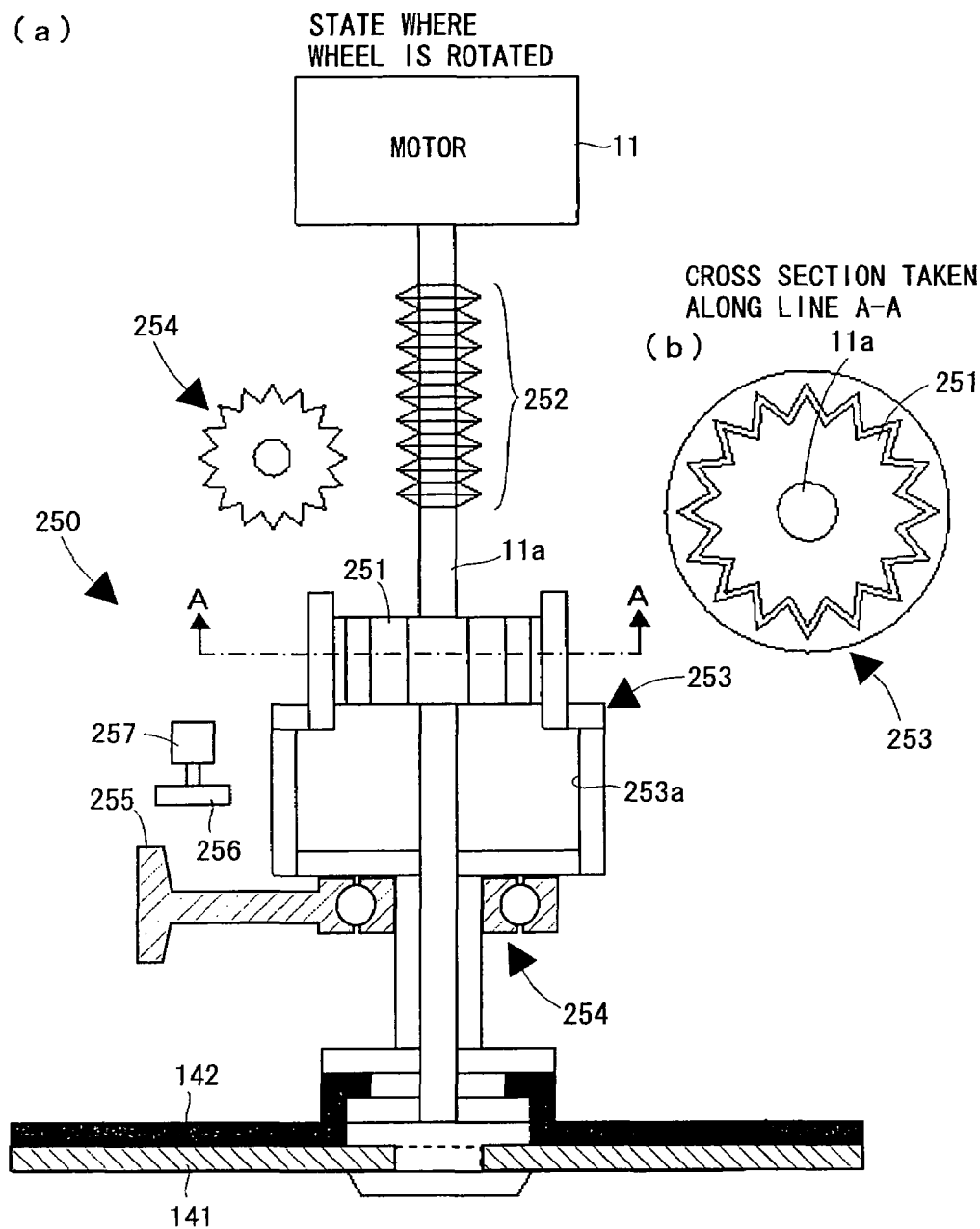
FIG. 47 is a diagram showing the configuration of a width adjusting mechanism.
Figure 48:
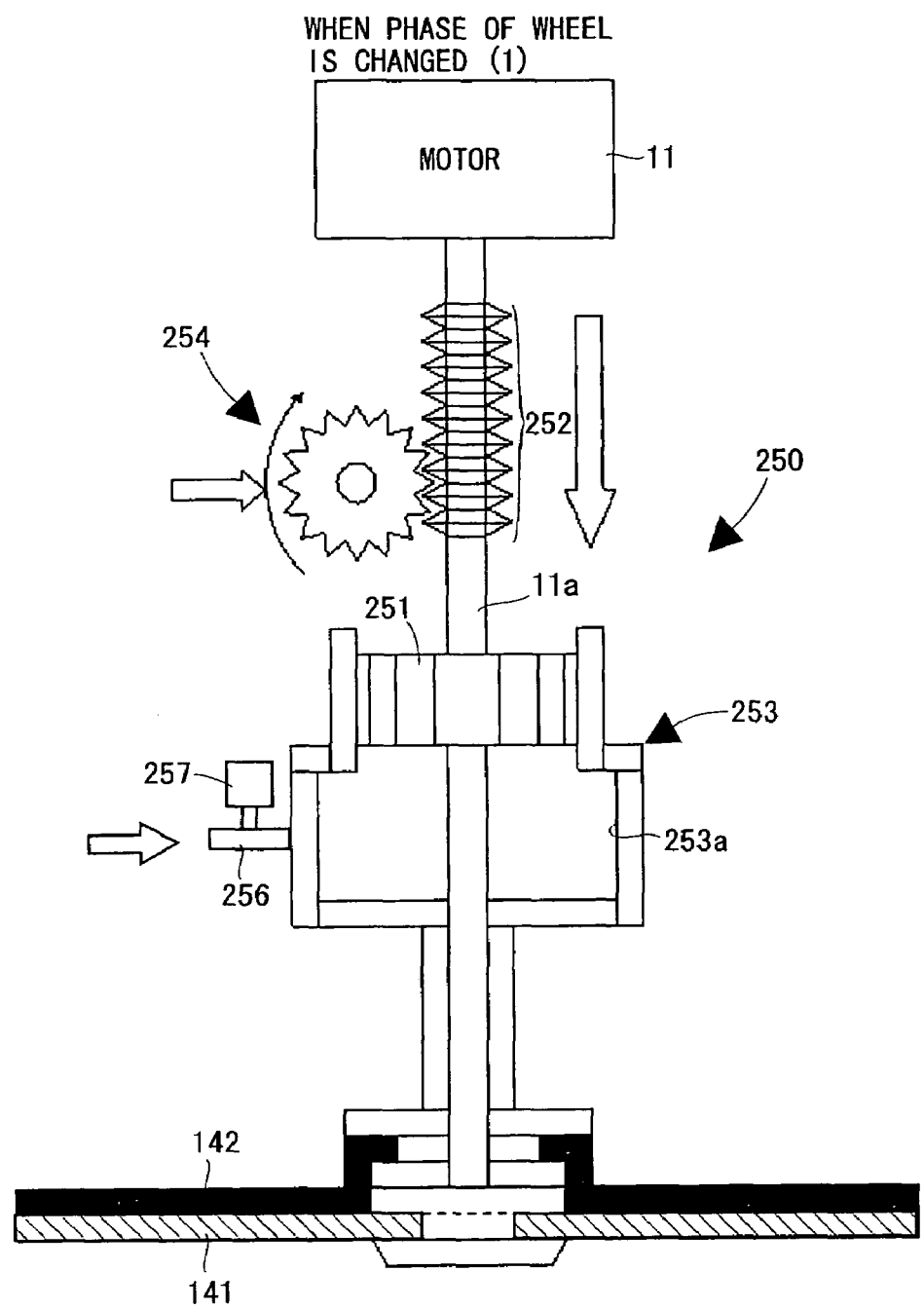
FIG. 48 is an explanatory view showing the operation of the width adjusting mechanism.
Figure 49:
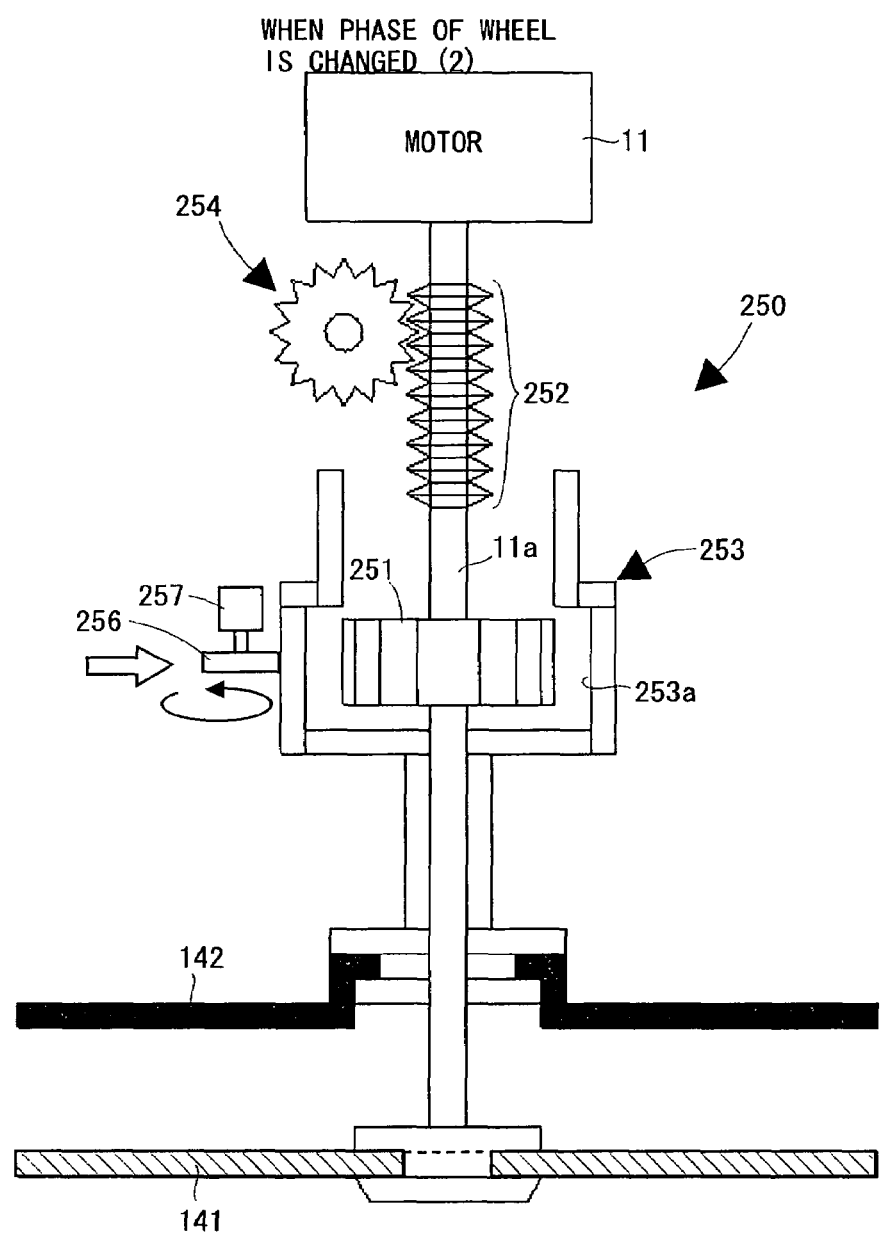
FIG. 49 is an explanatory view showing the operation of the width adjusting mechanism.
Figure 50:
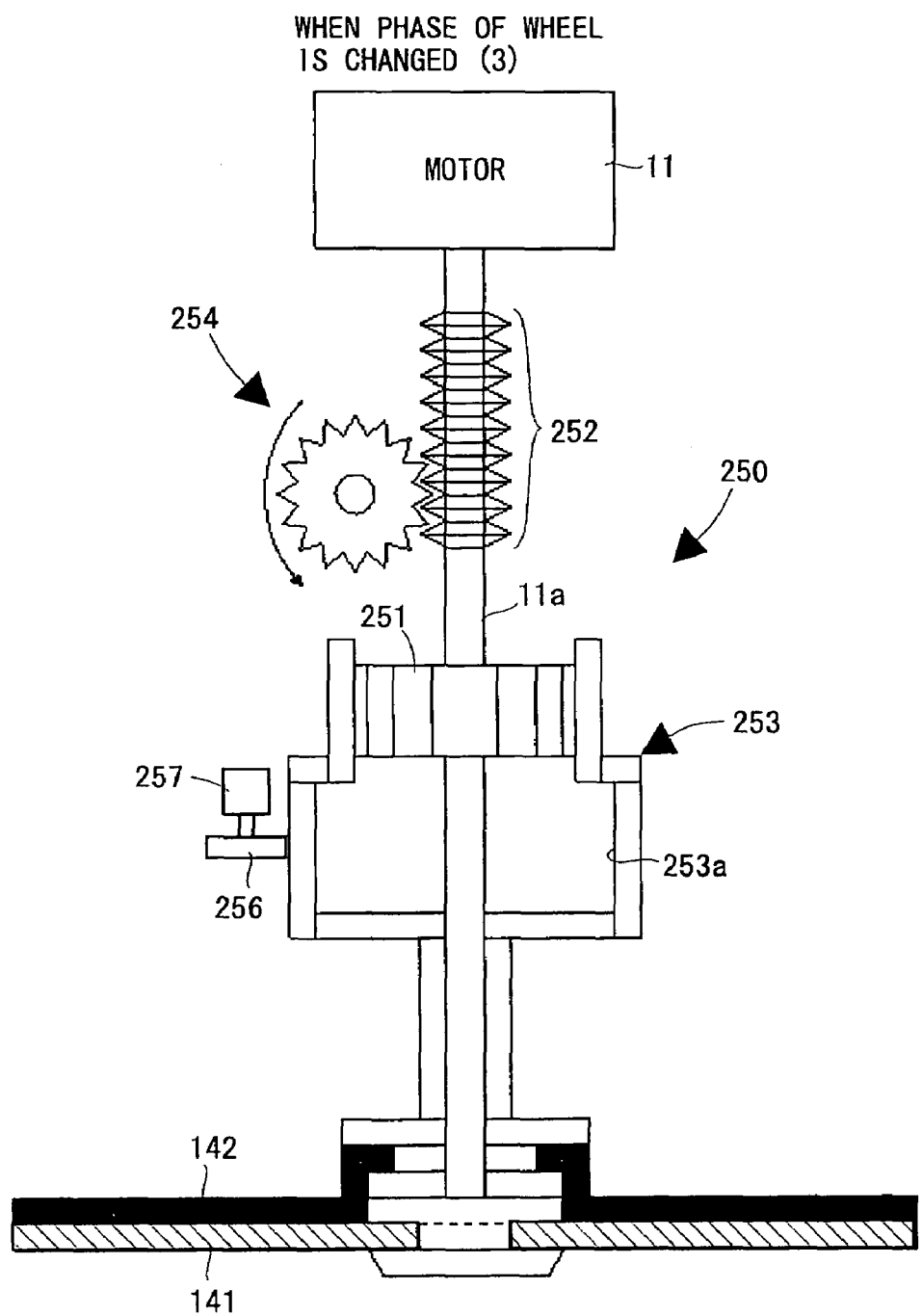
FIG. 50 is an explanatory view showing the operation of the width adjusting mechanism.

FIGS. 47 to 51 illustrate a width adjusting mechanism 250. As shown in FIG. 47(*a*), for example, a first rotating disc 141 is fixed to a front end of a rotation axis 11a of a motor 11, a rotation transmitter 251 is fixed to an intermediate part of the rotation axis 11a, and a movement force receiver 252 receiving a movement force in an axial direction is formed at a base end of the rotation axis 11a. The rotation transmitter 251 has a shape having concave and convex areas along its peripheral edge (a so-called gear shape), as shown in FIG. 47(*b*), and is inserted into a drum 253 having concave and convex areas in the same shape in its inner circumference. A second rotating disc 142 is fixed to a front end of the drum 253. Consequently, a rotation force of the rotation axis 11a is transmitted to the drum 253 through the rotation transmitter 251. The drum 253 is rotated, so that the second rotating disc 142 and the first rotating disc 141 are together rotated.

Furthermore, the movement force receiver 252 is constructed by fitting and fixing a plurality of beads-shaped members in and to the rotation axis 11a with a predetermined pitch, so that a rack shape can be ensured even at any rotation position. A driving gear 254 driven by a motor (not shown) is provided in the vicinity of the movement force receiver 252. The motor is provided so as to be movable by an actuator (not shown) such that it can realize a state where the driving gear 254 is meshed with the movement force receiver 252 and a state where it is spaced apart therefrom. When the driving gear 254 is rotated in the above-mentioned meshed state, the motor (including the rotation axis 11a) 11 is moved in the axial direction. The motor 11 is provided so as to be slidable in the axial direction by a guide (not shown).

The axial movement of the rotation transmitter 251 relative to the drum 253 is allowed, and the first rotating disc 141 is spaced apart from the second rotating disc 142 by the axial movement of the motor (including the rotation axis 11a) 11. A container space 253a is formed space in the drum 253, and the rotation transmitter 251 is contained in the container space 253a at the time of the above-mentioned axial movement (at the time when the discs are spaced apart from each other). Consequently, the drum 253 enters a state where it is disengaged from the rotation transmitter 251, thereby allowing the single rotation of the drum 253. Further, the drum 253 is supported so as to be rotatable by a bearing 254, and the position thereof is fixed by a supporting member 255.

Furthermore, a roller 256 driven by a stepping motor 257 is provided in the vicinity of the drum 253. The stepping motor 257 is provided so as to be movable by an actuator (not shown) such that it can realize a state where the roller 256 is touched to a surface of the drum 253 and a state where it is spaced apart therefrom. In the touched state, when the roller 256 is rotated through a predetermined angle by the stepping motor 257, the drum 253 is rotated through a predetermined angle. The angle of rotation is set to positive number multiples of a pitch of concave and convex areas in the rotation transmitter 251. When the drum 253 is thus rotated through a predetermined angle, the second rotating disc 142 is rotated through a predetermined angle, and relative rotation is produced between the first rotating disc 141 and the second rotating disc 142 so that the respective widths of the first transmitter 140A and the second transmitter 140B are changed.

Figure 51:
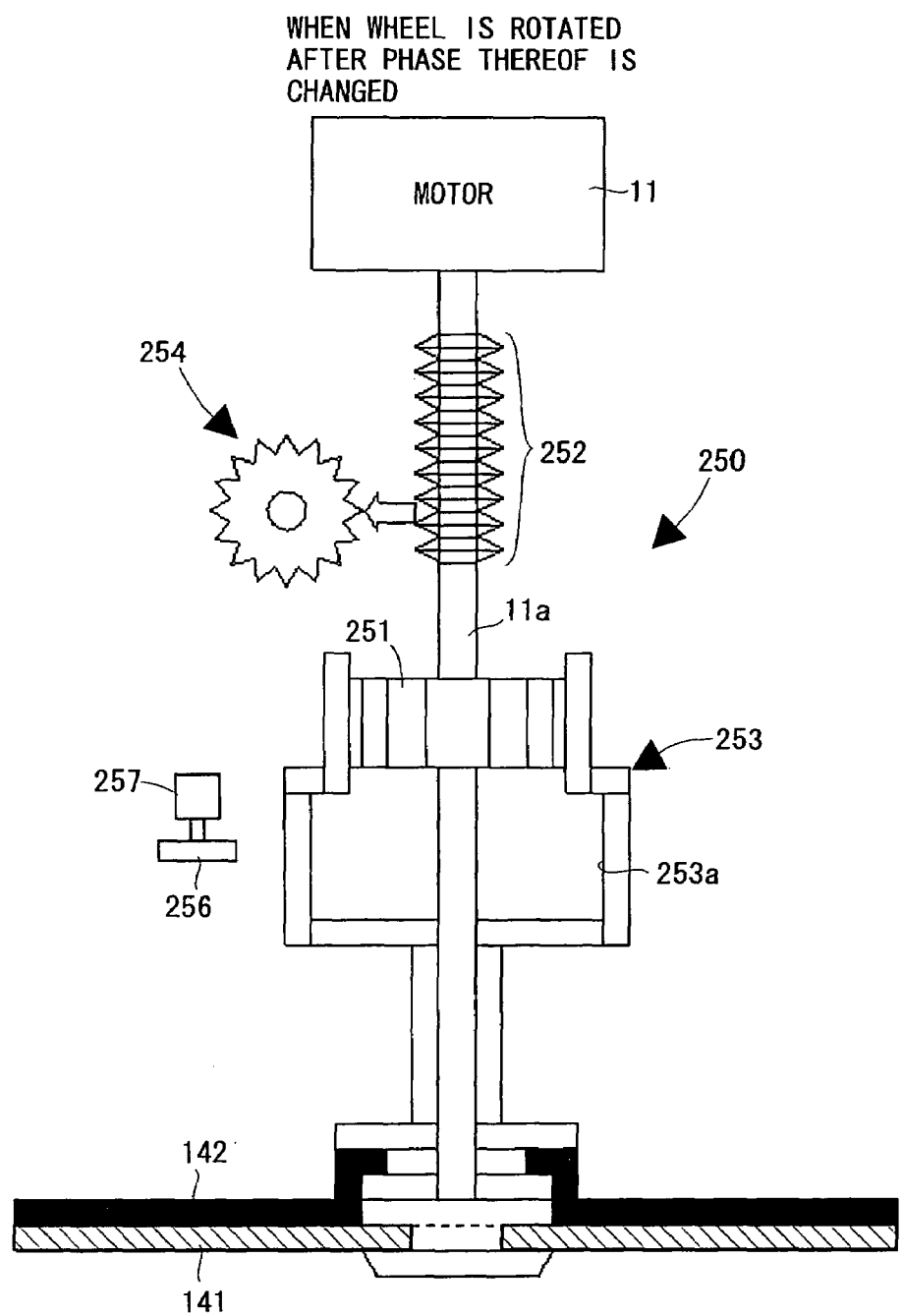
FIG. 51 is an explanatory view showing the operation of the width adjusting mechanism.

Description is made of the above-mentioned operations in a time series manner. ① The rotation of the motor 11 is stopped. ② The driving gear 254 is meshed with the movement force receiver 252, and the roller 256 is positioned in the container space 253a in the drum 253 (see FIG. 48). ④ The driving gear 254 is driven, to disengage the rotation transmitter 251 from the drum 253, thereby allowing the single rotation of the drum 253 (see FIG. 49). ⑤ The drum 253 is rotated through a predetermined angle by the roller 256 (see FIG. 49). ⑥ The driving gear 254 is inversely driven, to engage the rotation transmitter 251 with the drum 253 (see FIG. 50). ⑦ The driving gear 254 is spaced apart from the movement force receiver 252, and the roller 256 is spaced apart from the drum 253 (see FIG. 51).

In a liquid crystal projector having the above-mentioned width adjusting mechanism 250, a still picture mode button and a moving picture mode button, for example, are prepared. When the still picture mode button is operated, the rotation of the motor 11 is stopped, to perform the above-mentioned series of operations ② to ⑦ to increase the widths of the first transmitter 140A and the second transmitter 140B. On the other hand, when the moving picture mode button is operated, the rotation of the motor 11 is stopped, to perform the above-mentioned series of operations ② to ⑦ to reduce the widths of the first transmitter 140A and the second transmitter 140B.

Figure 52:
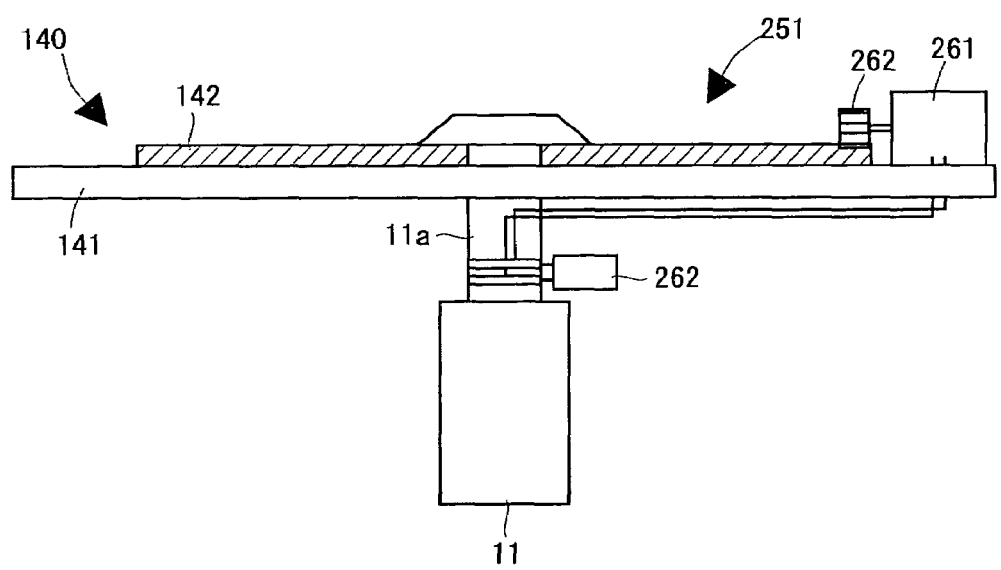
FIG. 52 is a diagram showing another example of a width adjusting mechanism.
Figure 53:
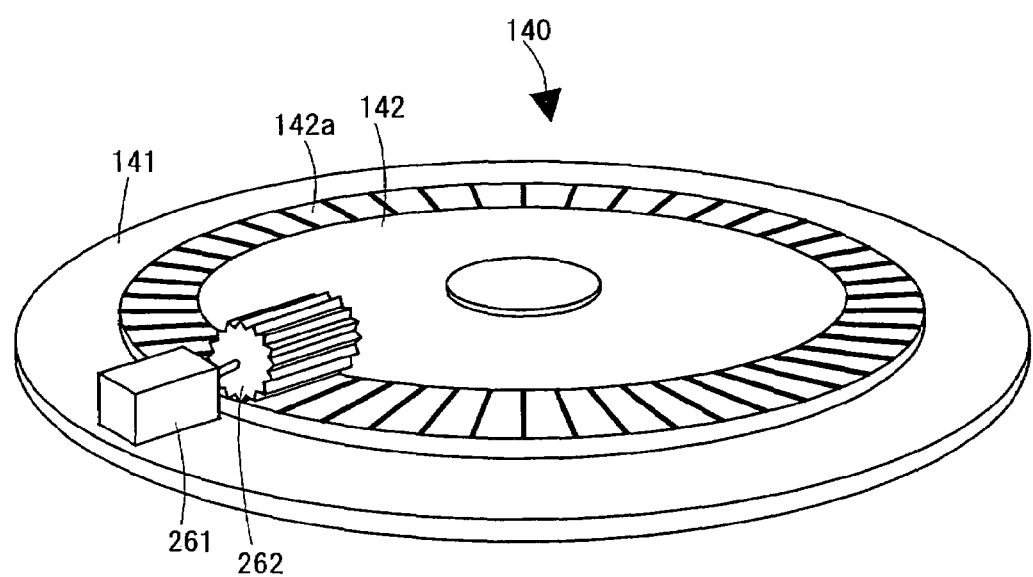
FIG. 53 is a perspective view showing the width adjusting mechanism shown in FIG. 52.

FIGS. 52 and 53 illustrate the width adjusting mechanism 251. The width adjusting mechanism 251 can change the widths of the first transmitter 140A and the second transmitter 140B without stopping the rotation of the motor 11. The first rotating disc 141 fixed to the rotation axis 11a of the motor 11 is so formed that its diameter is longer than that of the second rotating disc 142, and a motor 261 is fixed to an edge of the first rotating disc 141. A counter weight may be provided on the opposite side of the motor 261 to enhance the stability of the rotation. A rack 142a is formed in a circumferential shape at a peripheral edge of the second rotating disc 142. The first rotating disc 141 and the second rotating disc 142 are overlapped with each other so as to allow free rotation therebetween (the second rotating disc 142 is not fixed to the rotation axis 11). Since a gear 262 attached to a rotation axis of the motor 261 is meshed with the rack 142a in the rotating disc 142, however, the first rotating disc 141 and the second rotating disc 142 are together rotated. When the gear 262 is rotated by the motor 261, relative rotation is produced between the first rotating disc 141 and the second rotating disc 142 so that the respective widths of the first transmitter 140A and the second transmitter 140B are changed.

The motor 261 is rotated in a forward direction when a forward voltage is applied to its electric power line, while being rotated in a backward direction when a backward voltage is applied thereto. The electric power line is printed along a non-transmitter on a reverse surface of the first rotating disc 141. Further, ends of the electric power line are respectively connected to ring-shaped conductors formed on a surface of the rotation axis 11a. Electric power lines of the motor driving controller 262 are respectively brought into brush contact with the ring-shaped conductors, thereby transmitting driving power to the electric power lines.

In a liquid crystal projector having the above-mentioned width adjusting mechanism 251, an aperture width up/down key, for example, is prepared. When the aperture width up/down key is operated, power is supplied so that the motor 261 is rotated in a forward direction or a backward direction, the respective aperture widths of the first transmitter 140A and the second transmitter 140B are increased or decreased. When the operation of the key is stopped, the supply of the power is stopped, and the aperture widths at this time are maintained.

As a width adjusting mechanism, the concept of a linear stepping motor can be further applied. The linear stepping motor comprises a stator and a mover (coil mounting). The mover formed in a circular arc shape is attached to a peripheral edge of a rotating disc fixed to a rotation axis of the motor 11, to allow a coil of the mover to be energized by the same wiring as that shown in FIG. 52. The stator formed in a circular arc shape is provided at a peripheral edge of a rotating disc which is not fixed to the rotation axis of the motor 11. In such a configuration, a control pulse is also generated by operating the aperture width up/down key to produce relative rotation between the first rotating disc 141 and the second rotating disc 142 in a state where the rotating discs are rotated, thereby making it possible to arbitrarily set the respective aperture widths of the first transmitter 140A and the second transmitter 140B.

Of course, the configuration of the width adjusting mechanism is not limited to the above-mentioned configuration. Any configuration may be used, provided that the width of the spiral light transmitter can be adjusted by changing and setting a relative rotation angle between the first rotating disc and the second rotating disc around the rotation axis.

As described in the foregoing, according to the present invention, in the configuration in which light is scrolled onto the display element, the effect of adjusting the width of the scrolling light on the display element is produced.

The amounts of light reaching the display element in an odd field and an even field differ, as shown in FIGS. 62(b) and FIGS. 63(a) and 63(b), on the ground that the respective shapes of the first transmitter 40a and the second transmitter 40b cannot be mainly strictly matched with each other, for example in the scroll disc 40 or the like shown in FIG. 44. As shown in FIG. 64(a), the light source is pulse-driven, so that there occurs an instantaneous increase in light amount corresponding to a pulse period. Even if respective controls of light amounts in the first transmitter 40a and the second transmitter 40b can be strictly matched with each other, therefore, an overlap of portions where light amount is increased instantaneously varies at the timing of illumination in each of the fields, as shown in FIG. 42(b). This causes the amounts of lights reaching the display element to differ in the respective fields. When the brightness of a projected image on a screen is changed in one field period, this causes a viewer to feel flicker.

Figure 54:
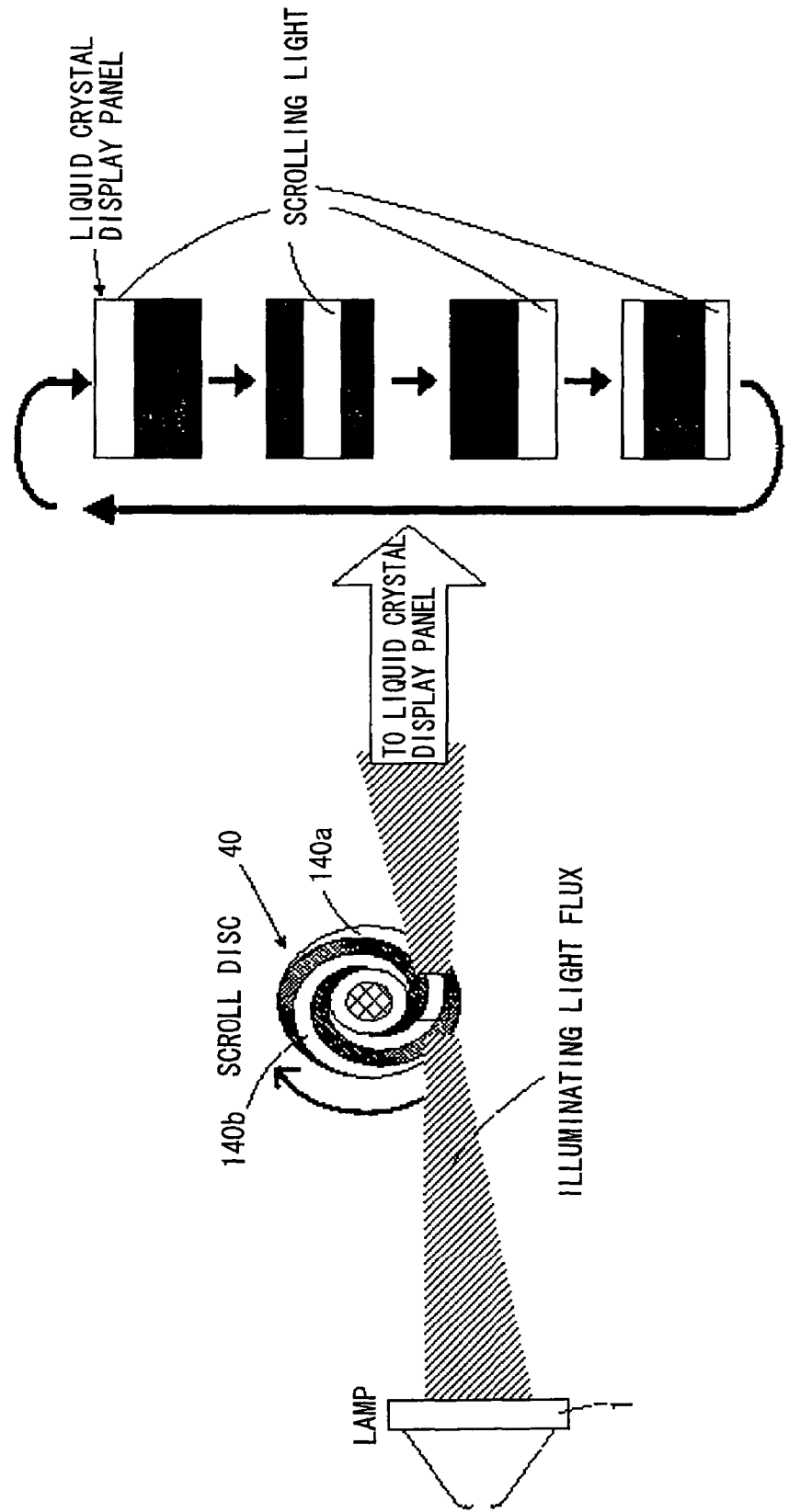
FIG. 54 is an explanatory view schematically showing how scrolling light is produced by a scroll disc.

As described in the foregoing, description is made of a projection type video display capable of restraining flicker in such a configuration that light is scrolled onto a display element. FIG. 54 schematically shows how strip-shaped illuminating light is introduced into a liquid crystal display panel.

In the control system shown in FIG. 8, the panel driver 15 drives each of the liquid crystal display panels 7R, 7G, and 7B on the basis of an inputted video signal. That is, an element driving voltage for setting the degree of light transmission of each of pixels composing each of the liquid crystal display panels is generated on the basis of the video signal and is fed to the pixel. The synchronizing signal separating circuit 14 extracts a vertical synchronizing signal from the video signal, and feeds the extracted vertical synchronizing signal to the scroll phase detector 12. The scroll phase detector 12 detects a phase difference from a rotation period of the scroll disc 4 and a vertical synchronizing signal. Information related to the rotation period of the scroll disc 4 can be obtained by the configuration of a rotary encoder, for example. The rotation controller 13 for controlling the rotation of the motor 11 receives a signal representing the above-mentioned phase difference from the scroll phase detector 12, to carry out control such that the rotation period of the scroll disc 4 is matched with the vertical synchronizing signal. That is, a supply voltage (or the number of pulses, the pulse width, etc.) to the motor 11 is increased in order to increase the rotation speed if the rotation period is delayed from the vertical synchronizing signal, while being reduced in order to reduce the rotation speed if it is earlier than the vertical synchronizing signal. If both are matched with each other, the supply voltage is left unchanged.

Although the control of the rotation of the motor 11 can be also carried out in the above-mentioned control, the rotation of the scroll disc 40 (4) rotated by the motor 11 should be controlled in synchronization of a video signal. Therefore, the driving of the motor 11 can be also directly controlled by a synchronizing signal of the video signal. In the following configuration in which the driving of the motor 11 is directly controlled by the synchronizing signal of the video signal, a circuit configuration for restraining flicker will be described.

Figure 55:
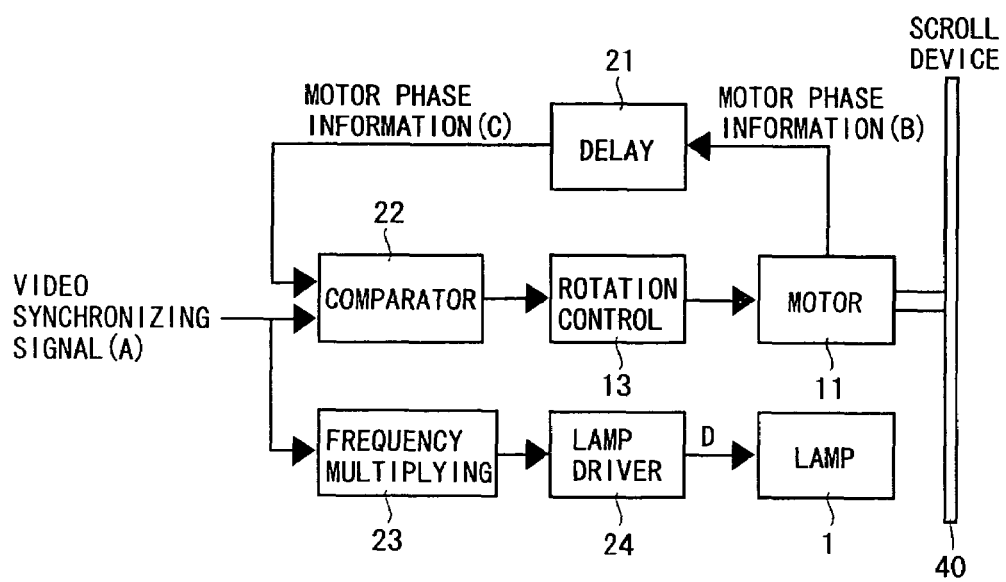
FIG. 55(a) is a block diagram showing a configuration in which flicker is restrained by a measure to prevent an instantaneous increase in amount of light from a light source.
FIG. 55(b) is an explanatory view showing how synchronization between an instantaneous increase in light amount and scrolling light is established.
Figure 55:
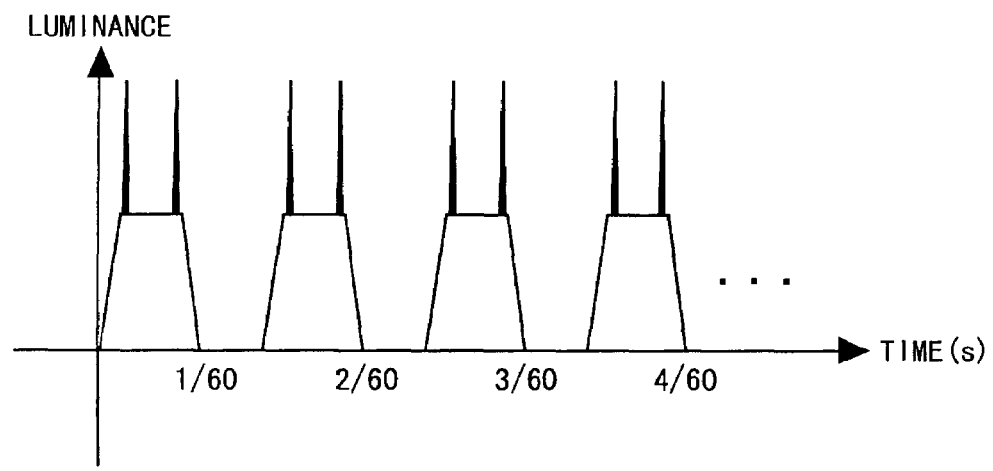

As shown in FIG. 55(a), motor phase information (B) is extracted from the motor 11. It is possible to use as an example of the motor phase information (B) a signal generated in a magnetic detecting element provided on a stator of the motor when a magnetic member on a member provided on a rotor of the motor passes through the vicinity of the magnetic detecting element. The motor phase information (B) is supplied to a delay circuit 21. The delay circuit 21 outputs motor phase information (C) constructed by delaying the motor phase information (B) by a predetermined time period.

A comparison circuit 22 inputs the motor phase information (C) and the vertical synchronizing signal of the video signal to detect a phase difference therebetween, and feeds a phase difference signal to the rotation controller 13. The rotation controller 13 receives the phase difference signal, to carry out control such that the rotation period of the scroll disc 40 is matched with vertical synchronization. Further, a frequency multiplying circuit 23 outputs a signal which is the vertical synchronizing signal multiplied by a positive number such as two or three. If a light source (lamp) 1 is driven at a frequency of approximately 100 Hz to 200 Hz, for example, the vertical synchronizing signal (60 Hz) may be multiplied by two or three in the frequency multiplying circuit 23. A lamp driver 24 receives a signal obtained by multiplying the vertical synchronizing signal by a positive number, to pulse-drive the light source 1.

Figure 56:
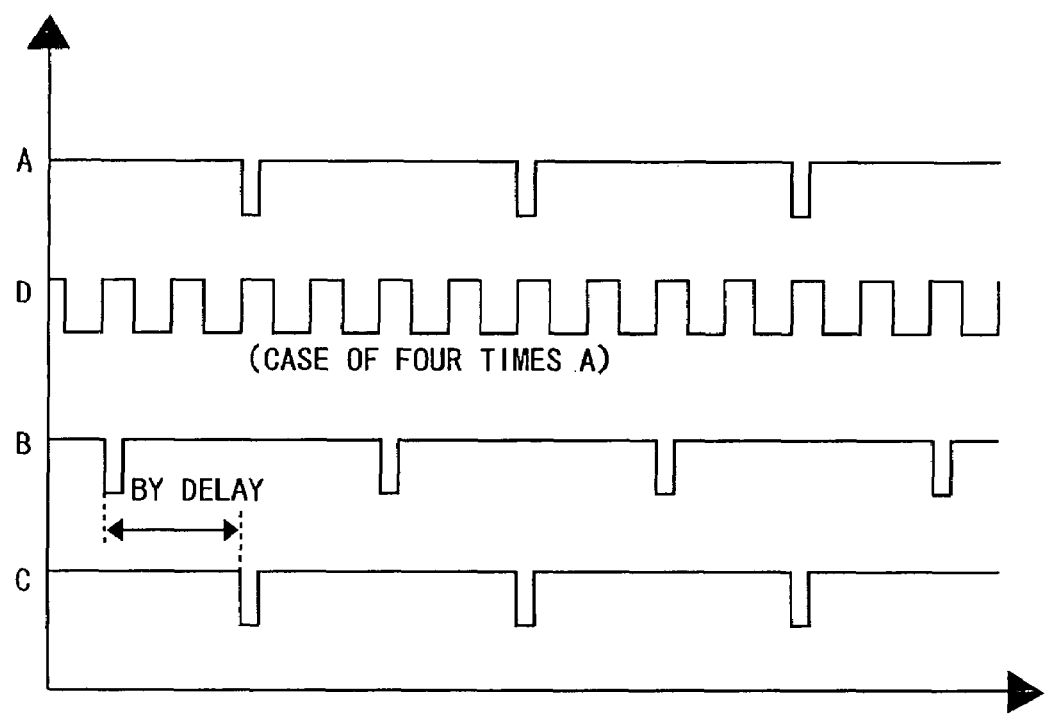
FIG. 56 is an explanatory view showing signals generated by the circuit shown in FIG. 55(a)

FIG. 56 is a timing chart showing the relationship among a vertical synchronizing signal (A), motor phase information (B), motor phase information (C), and a positive number multiple signal (D). As apparent from the timing chart shown in FIG. 56 and the circuit configuration shown in FIG. 55(a), a feedback control is carried out so that the vertical synchronizing signal (A) and the motor phase information (C) have the same phase, and the motor 11 is synchronously driven such that the motor phase information (B) and the vertical synchronizing signal (A) respectively have predetermined phases. Since the vertical synchronizing signal (A) and the positive number multiple signal (D) are synchronized with each other, the motor phase information (B) (that is, the rotation of the scroll disc 40) and the positive number multiple signal (D) (that is, the period of instantaneous increases in light amounts in the light source 1) are synchronized with each other.

Even if the light source 1 is pulse-driven so that there occur instantaneous increases in light amount corresponding to a pulse period, as shown in FIG. 55(b) an overlap of portions where light amounts is increased instantaneously at the timing of illumination in fields is made uniform, thereby making it possible to prevent the brightness of a projected image on a screen from being changed in one field period.

An embodiment in which flicker is eliminated by correcting the luminance of a video signal will be then described on the basis of FIGS. 57 to 61. In order to avoid redundancy of description, the same constituent elements as the constituent elements shown in FIG. 55(a) are assigned the same reference numerals and hence, the description thereof is not repeated.

A counter 25 measures time (perform counting processing) using a horizontal synchronizing signal in a video signal as a trigger. Information related to the time measurement is information related to a display position from a position at a right end on an image on each horizontal line. The counter 25 counts the number of horizontal lines in each field. The count value is information related to a display position from a position at an upper end on the image. The counter 25 feeds to a conversion table 27 the information related to a display position generated by such counting processing.

A signal input unit 26 receives a video signal to carry out analog-to-digital (A/D) conversion, thereby generating digital image data and feeding the generated digital image data to the conversion table 27.

The conversion table 27 has luminance correction data set for each pixel or for each area. As the luminance correction data, two sets of luminance correction data (hereinafter referred to as a first table and a second table) corresponding to a first transmitter 40a and a second transmitter 40b in a spiral shape in a scroll disc 40 are prepared. Which of the first table and the second table should be used is determined by the phase information from the motor 11. For example, the first table is selected at the timing of irradiation by the first transmitter 40a, while the second table is selected at the timing of irradiation by the second transmitter 40b. The conversion table 27 makes judgment of a pixel position or judgment of an area on an image (that is, generates a read address) on the basis of the above-mentioned display position information, to read out correction data from the above-mentioned determined table and correct the digital image data by the correction data (for example, to subtract a correction value from the value of the digital image data).

Figure 62:
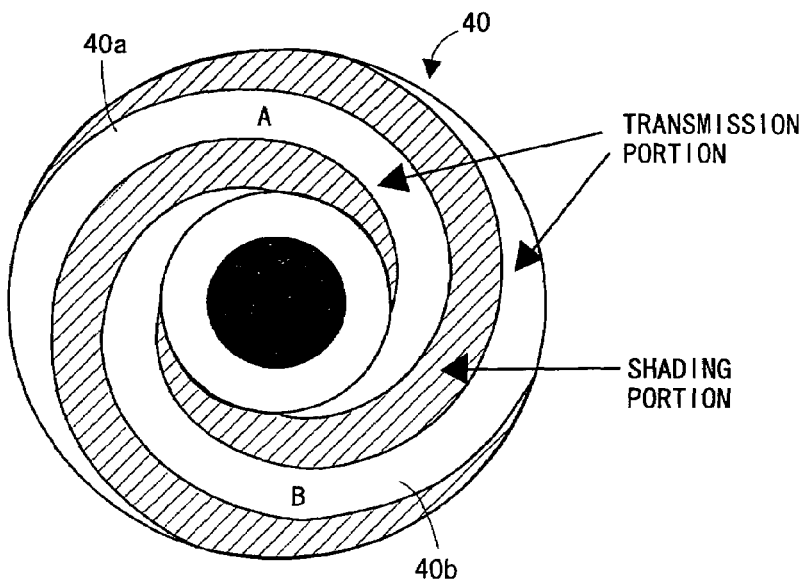
FIG. 62(a) is an explanatory view showing a scroll disc having two spiral apertures.
FIG. 62(b) is an explanatory view showing a periodic change in amount of scrolling light.
Figure 62:
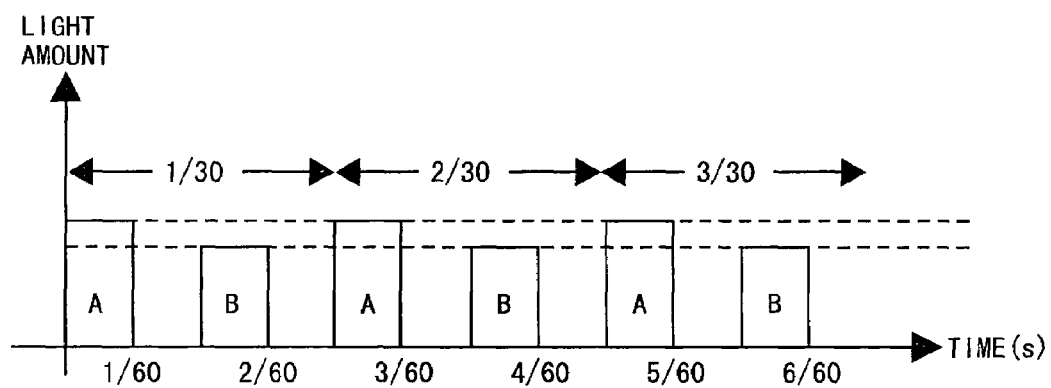
Figure 63:
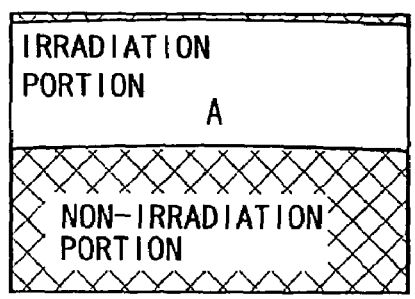
FIGS. 63(a) and 63(b) are explanatory views showing an illuminating state by a scroll disc having two spiral apertures which differ in aperture widths.
Figure 63:
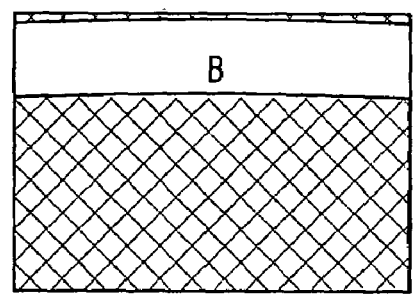
Figure 64:
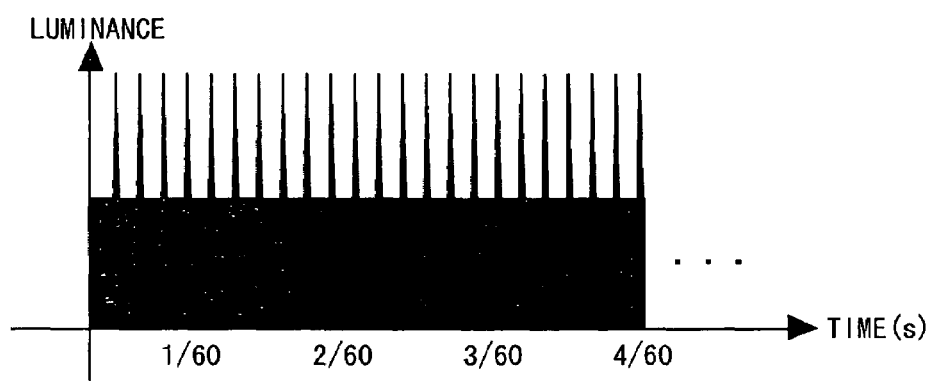
FIG. 64(a) is an explanatory view showing an instantaneous increase in light amount by pulse driving from a light source.
Figure 64:
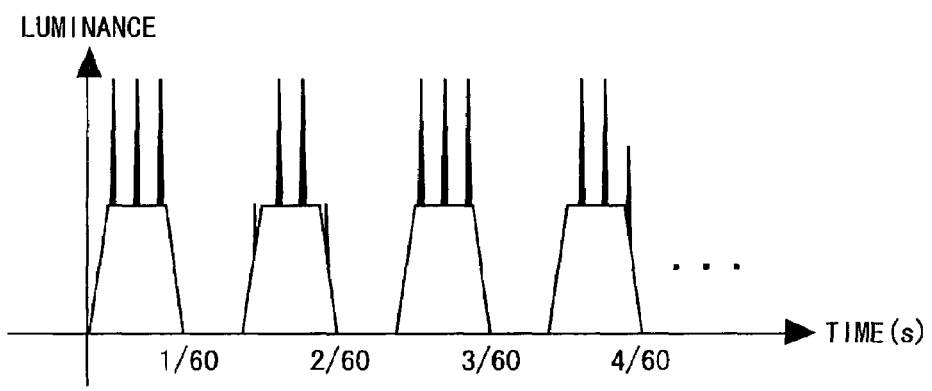

Here, when the above-mentioned correction is not adopted, the amount of light introduced into the liquid crystal display panel 7 (the brightness on the screen) periodically differs depending on the difference between the shapes of the first transmitter 40a and the second transmitter 40b in the scroll disc 40, for example, as shown in FIG. 61(a) (further, see FIGS. 62 and 63). However, the above-mentioned luminance correction is adopted, thereby making it possible to eliminate the periodic change in luminance to restrain flicker, as shown in FIG. 61(b).

The correction values of the first table and the second table in the conversion table 27 are produced in the following manner. At the time of shipping inspection of liquid crystal projectors, for example, a white image, for example, is projected with respect to each of the liquid crystal projectors, the projected image is photographed by image photographing means (a CCD camera, etc.), and a correction value for each pixel or for each area is produced on the basis of luminance information related to the image photographed. However, it is also considered that the degree of variation in luminance is changed by a change with time or the like. The liquid crystal projector itself may comprise the correction value generating function of the conversion table 27.

Figure 57:
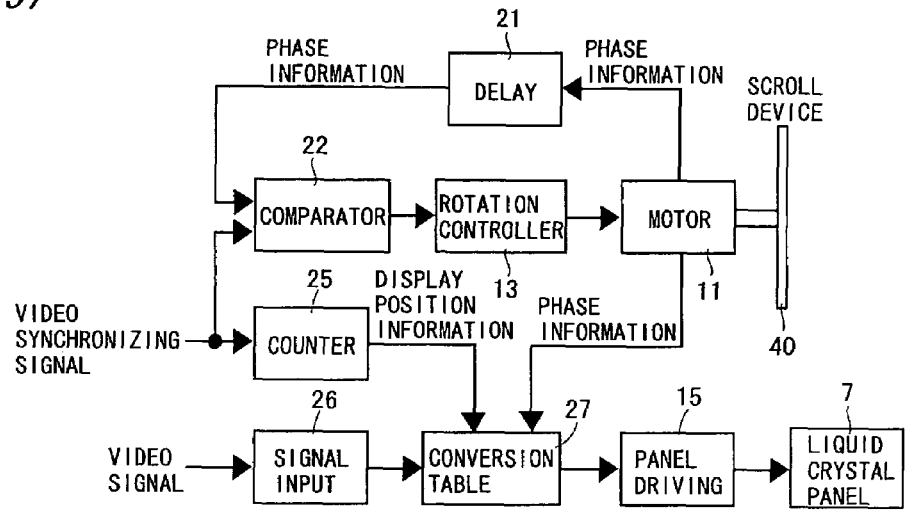
FIG. 57 is a block diagram showing a configuration in which flicker is restrained by correcting a video signal.
Figure 58:
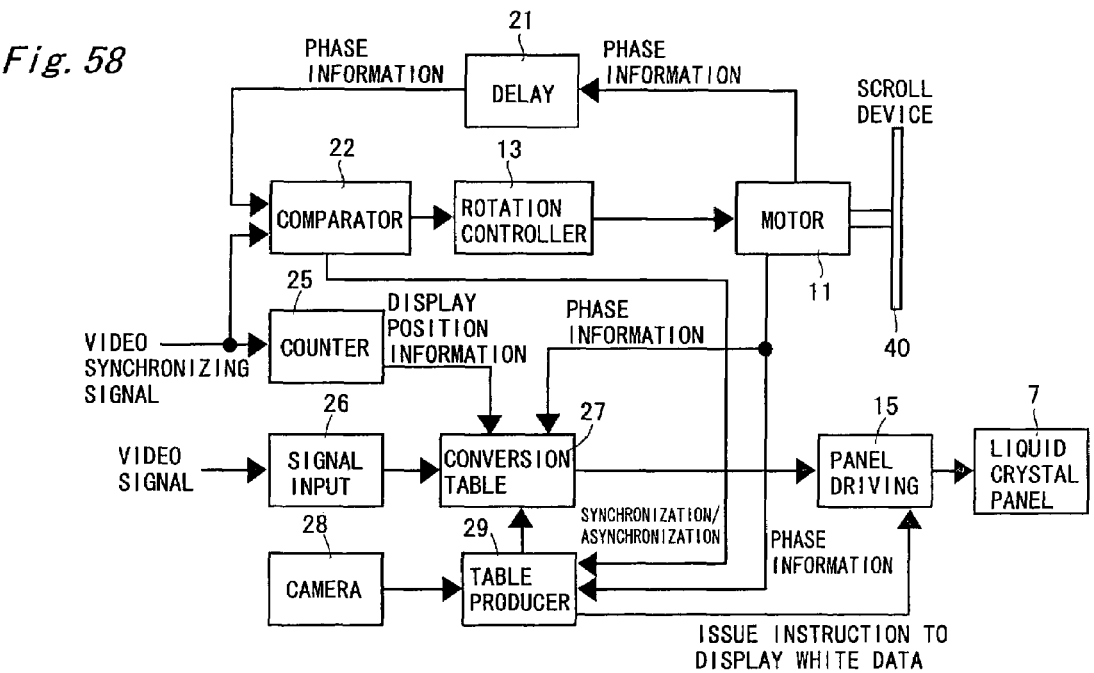
FIG. 58 is a block diagram showing a configuration comprising the function of producing a correction table for correcting a video signal.

FIG. 58 illustrates a liquid crystal projector comprising the correction value generating function. The same constituent elements as the constituent elements in the liquid crystal projector shown in FIG. 57 are assigned the same reference numerals and hence, the description thereof is not repeated. At the time of generating a correction value (for example, when a correction value production mode setting button is operated by a user), the liquid crystal projector projects a white image, for example. The white image on a screen is photographed by a camera 28. A table producer 29 inputs an image photographed (digital image data), and inputs a synchronization/asynchronization judgment signal from a comparator 22 and phase information from a motor 11. A synchronous state occurs if there is no phase difference between phase information which has passed through a delay circuit 21 and a video synchronizing signal, while an asynchronous state occurs in the other case. Here, although the comparator 22 may provide a synchronization/asynchronization judgment signal by a High/Low signal, the table producer 29 may input information related to the phase difference outputted by the comparator 22 and output the synchronization/asynchronization judgment signal.

The table producer 29 performs table production processing after synchronization is established. The table producer 29 judges whether the present time is the timing of irradiation by the first transmitter 40a or the timing of irradiation by the second transmitter 40b on the basis of the phase information from the motor 11. For example, a correction value of the first table is produced at the timing of irradiation by the first transmitter 40a, while a correction value of the second table is produced at the timing of irradiation by the second transmitter 40b.

It is herein assumed that a luminance value in each area of the image photographed (white image) by the camera 28 is as shown in FIG. 60(a) at the timing of irradiation by the first transmitter 40a, while a luminance value in each area of the image photographed (white image) by the camera 28 is as shown in FIG. 60(b) at the timing of irradiation by the second transmitter 40b. In the present embodiment, it is assumed that a correction value is set such that luminance values in all areas are meshed with the lowest luminance value. A correction value is set at "−1" in an area at a left end in the uppermost stage shown in FIG. 60(a), while a correction value is set at "−9" in an area at a left end in the uppermost stage shown in FIG. 60(b).

By producing such a correction table, correction data can be simultaneously acquired with respect to color nonuniformity by variations in amounts of light transmission in the liquid crystal display panels 7R, 7G, and 7B. Therefore, the first table and the second table in the table producer 29 also function as a color nonuniformity correction table.

Figure 59:
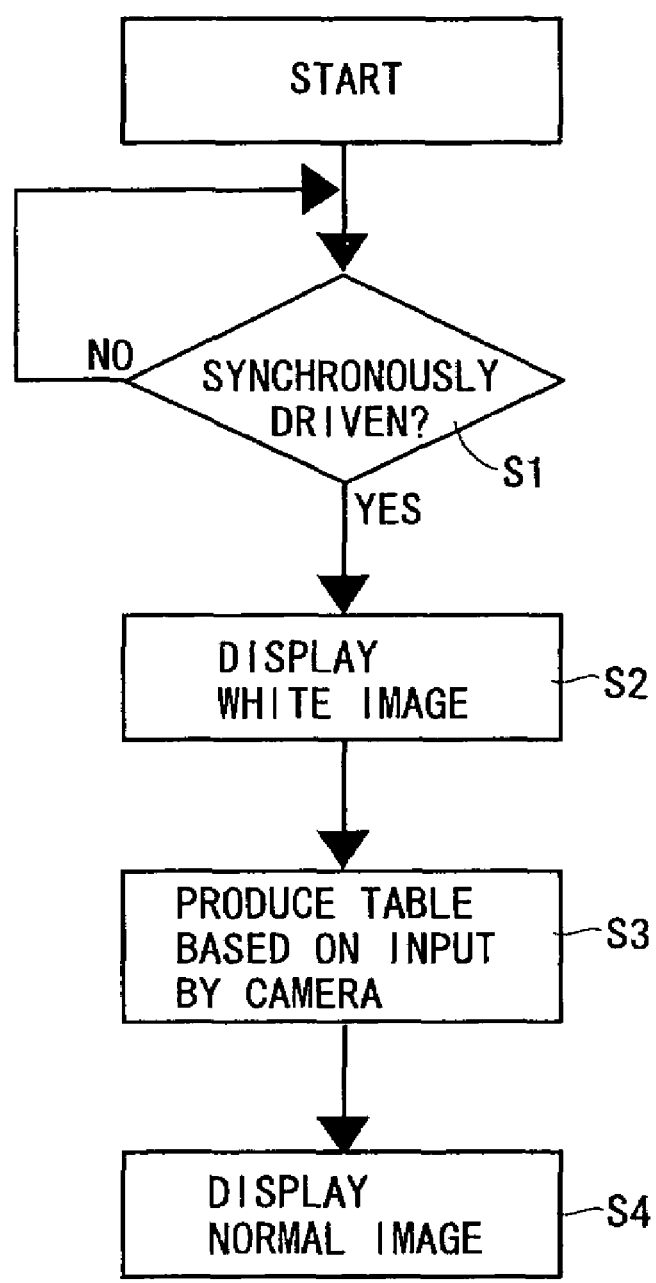
FIG. 59 is a flow chart showing the process of producing a correction table for correcting a video signal.
Figure 60:
FIGS. 60(a) and 60(b) are explanatory views showing a luminance value for each area of an image photographed by a camera.
Figure 61:
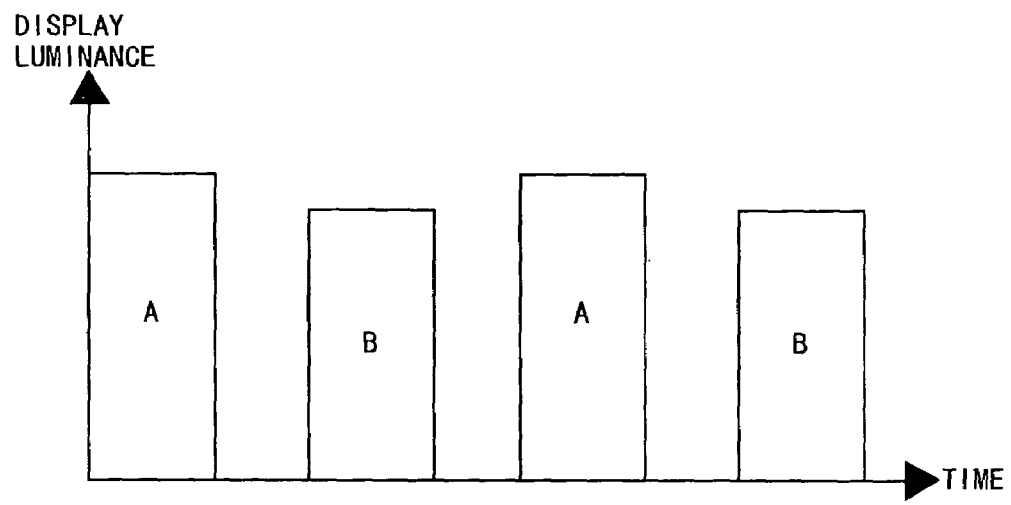
FIG. 61(a) is an explanatory view showing a periodic change in amount of scrolling light at the time when luminance has not been corrected yet.
FIG. 61(b) is an explanatory view showing how a periodic change in amount of scrolling light is solved by correcting luminance.
Figure 61:
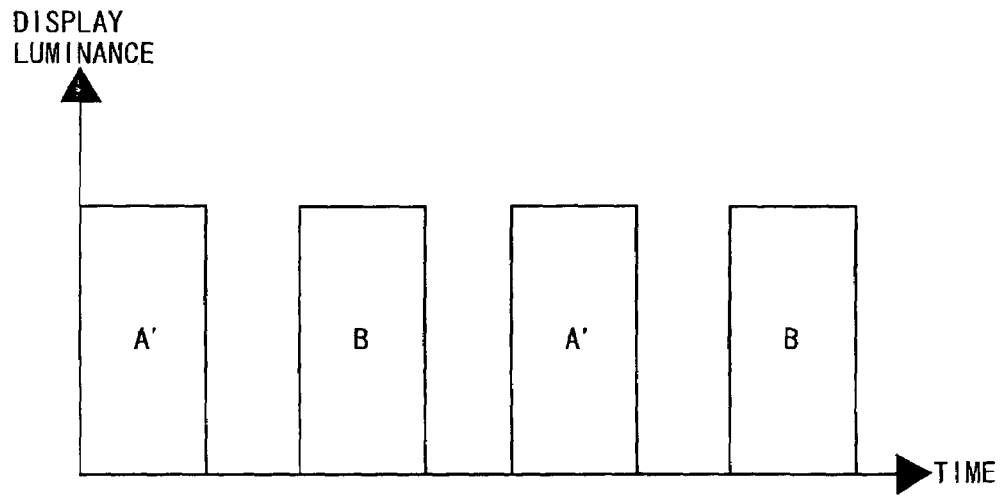

FIG. 59 is a flow chart showing the process of generating a correction value by the table producer 29. It is first judged that the scroll disc 40 is synchronously rotated by a synchronization/asynchronization judgment signal output from the comparator 22 (step S1). When the scroll disc 40 is synchronously rotated, a white image is displayed in the liquid crystal display panels 7R, 7G, and 7B (step S2), and luminance values in each area of an image (white image) photographed by the camera 28 at the timing of irradiation by the first transmitter 40a and at the timing of irradiation by the second transmitter 40b are acquired, to produce a correction table (step S3) Thereafter, a normal image is displayed (step S4).

An input video signal is thus subjected to luminance value correction, for periods of irradiation of two different scrolling lights, corresponding to each of the scrolling lights. Therefore, the luminances of images by the two different scrolling lights are equal to each other, as shown in FIG. 61(b), thereby restraining flicker.

Although in the above-mentioned example, description was made of an example in which the first transmitter and the second transmitter are formed in the scroll disc 40 serving as a scroll device, another scroll device can be also used. The other scroll device can comprise two or more light deflecting elements, to periodically produce two or more different scrolling lights.

Figure 66:
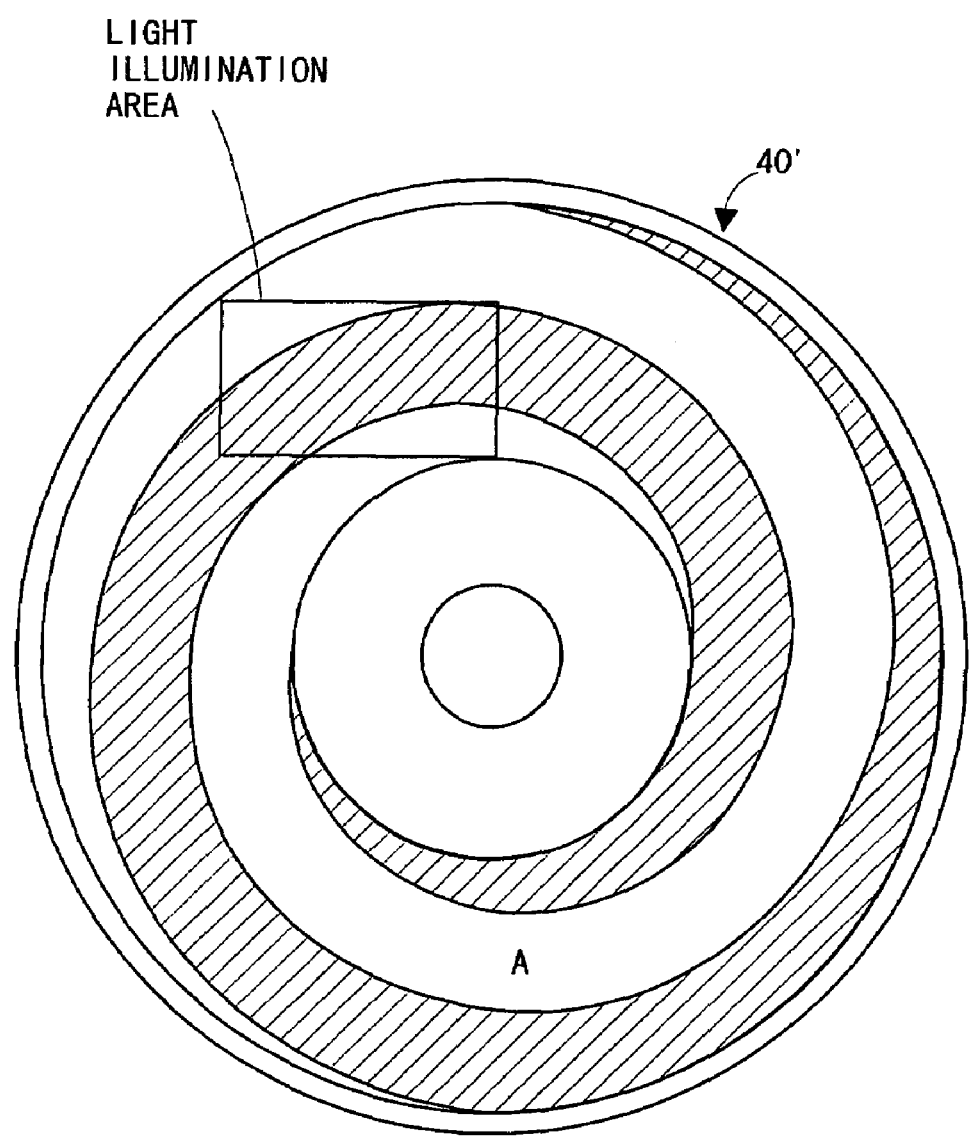
FIG. 66 is an explanatory view showing a scroll disc constructed by forming one spiral light transmitter.

The scroll disc 40 has a first transmitter and a second transmitter. Since the scroll disc 40 thus has two transmitters, scrolling lights which differ in light amounts are periodically produced. Consequently, a scroll disc 40' having one spiral light transmitter formed therein is used, to produce a single scrolling light per rotation of the disc, as shown in FIG. 66, thereby making it possible to prevent a periodic change in light amount based on a difference between light deflecting elements. Of course, in such a configuration, the circuit configuration shown in FIG. 55 which is a measure to prevent an amount of light from a light source from being instantaneously increased is effective.

As described in the foregoing, according to the above-mentioned configuration, the effect of restraining flicker in the configuration in which light is scrolled onto the display element is produced.

Although the transmission type liquid crystal display panel is used, the present invention is not limited to the same. A reflection type liquid crystal display panel, a device for driving each of micro mirrors arranged in a matrix shape on the basis of pixel data (DMD: Digital Micro Mirror Device), and so on can be also used. Although the rotation driving type light deflecting means is illustrated, the present invention is not limited to the same. For example, it is also possible to control the inclination of a group of micro mirrors in a striped area of a DMD (Digital Micro Mirror Device) such that light is introduced into an optical system in the succeeding stage to shift the striped area, thereby deflecting band-shaped light.

Although in the above-mentioned embodiment, the light deflecting means is arranged before (on the light source side of) the color separation optical system, it may be installed at any position from the light source to the liquid crystal display panel. For example, light deflecting means may be respectively provided on a reflecting optical path of a mirror 304, a reflecting optical path of a mirror 305, a reflecting optical path of a mirror 307, and so on in FIG. 65. In such configurations, even if the optical path lengths of the three primary colors are not equal to one another, for example, it is possible to avoid such disadvantage that the scroll direction is reversed. Of course, in such a configuration that the optical path lengths of the lights in the respective colors are equal to one another, as shown in FIG. 42 or the like, light deflecting means may be provided on each of the optical paths. As the light deflecting means, it is possible to use the configuration shown in FIG. 34, the configuration shown in FIG. 35, the configuration shown in FIG. 36, the configuration shown in FIG. 37, the configuration shown in FIG. 38, the configuration shown in FIGS. 39 and 40, the configuration shown in FIG. 47, the configuration shown in FIG. 52, a configuration utilizing the above-mentioned DMD, and so on.

The invention claimed is:

1. A projection type video display comprising:
   light deflecting means for circularly deflecting, in receiving irradiated light and transmitting the received light, the light;
   color separating means for separating the light into lights in the three primary colors and respectively introducing the lights into three hold type display elements;
   projecting means for recombining image lights in the respective colors obtained through the hold type display elements and projecting the recombined image lights; and
   element driving means for feeding a pixel-driving signal to each of the hold type display elements, and in that
   the amount of light which will be wasted in producing said circular deflection is reduced by utilizing at least one of the functions including condensing, more than twice reflecting, and refracting, and in that the lights in the respective colors condensed in smaller areas than those of the element are circularly scrolled on the hold type display elements.

2. The projection type video display according to claim 1, wherein
   the element driving means starts to feed pixel-driving signals for the succeeding frame to pixels which are located at a position, through which an illuminating area passes, on each of the hold type display elements.

3. The projection type video display according to claim 2, wherein
the pixel-driving signal is fed at N times (N is an integer of 2 or more) of a frame rate, and the timing of illumination of a pixel is matched with the time when a response of the pixel is flattened out.

4. The projection type video display according to claim 3, wherein
a pixel-driving signal whose change is more greatly emphasized than a pixel-driving signal allowing a necessary response value of the pixel to be obtained is fed to the pixel, to compensate for delay.

5. The projection type video display according to claim 4, comprising
a table allowing data representing the pixel-driving signal whose change is emphasized by the final pixel value in the preceding frame and the current pixel value to be obtained.

6. The projection type video display according to claim 1, comprising
control means for detecting a difference between a frame period and a deflection period by the light deflecting means and carrying out correction control of the deflection period such that the difference is eliminated or occurs in a constant manner.

7. The projection type video display according to claim 6, wherein
such control that the luminance value of the pixel determined by a response of the pixel and a period of light irradiation onto the pixel in a case where the difference occurs is matched with a predetermined luminance value in a case where no difference occurs is carried out.

8. The projection type video display according to claim 7, wherein
a value whose change is more greatly emphasized than the target value of the response of the pixel is set depending on the difference, to feed the pixel-driving signal.

9. The projection type video display according to claim 7, wherein
the timing of feeding of the pixel-driving signal is controlled depending on the difference.

10. The projection type video display according to claim 1, further comprising
a rod prism for introducing light emitted from a light source with a reflector and condensed into the light deflecting means.

11. The projection type video display according to claim 10, wherein
the rod prism has a tapered shape so as to reduce the dispersion of the light.

12. The projection type video display according to claim 1, wherein
the light deflecting means is constructed by rotatably providing a lens array wheel having a plurality of functional units each composed of a convex lens arranged in a disc shape along its circumference.

13. The projection type video display according to claim 1, wherein
the light deflecting means is constructed by rotatably providing a prism.

14. The projection type video display according to claim 1, wherein
the light deflecting means is constructed by rotatably providing a disc member having a light transmitter formed in a spiral shape and having a reflecting surface in an area other than the light transmitter.

15. The projection type video display according to claim 1, wherein
the light deflecting means is constructed by rotatably providing a cylindrical member having light transmitters and reflectors alternately formed repeatedly on its surface.

16. The projection type video display according to claim 10, wherein
the rod prism is folded such that the light entrance direction and the light exit direction differ,
the light deflecting means is composed of a rotatable cylindrical member having light transmitters and reflectors alternately formed repeatedly on its surface, and
the whole or a part of the rod prism is positioned inside the cylindrical member.

17. The projection type video display according to claim 14, wherein
the disc member is inclined to the direction of light irradiation,
an auxiliary mirror is provided at a position where light from the reflecting surface of the disc member is received, and
the light reflected from the auxiliary mirror is introduced into the light transmitter in the disc member.

18. The projection type video display according to claim 17, wherein
the disc member is composed of a transparent member, and reflecting surfaces are respectively formed on both surfaces of the transparent member.

19. The projection type video display according to claim 14, wherein
the light deflecting means comprises a single spiral light transmitter, and produces a single scrolling light per rotation driving.

20. The projection type video display according to claim 14, wherein
the light deflecting means comprises at least two spiral light transmitters, and produces at least two scrolling lights per rotation driving.

21. The projection type video display according to claim 19, wherein
the light deflecting means is constructed by putting a first rotating disc having one spiral light transmitter and a second rotating disc having a spiral light transmitter for adjustment corresponding to the spiral light transmitter close together, and
there is further provided a width adjusting mechanism for changing and setting a relative rotation angle between the first rotating disc and the second rotating disc around its rotation axis, to adjust the width of the spiral light transmitter.

22. The projection type video display according to claim 21, wherein
the width adjustment mechanism comprises
means for forming a direct or indirect meshed state between the first rotating disc and the second rotating disc and releasing the meshed state, and
means for releasing the meshed state after stopping the rotation of the first rotating disc and the second rotating disc, to fix either one of the first rotating disc and the second rotating disc and rotate the other rotating disc.

23. The projection type video display according to claim 21, wherein
the width adjusting mechanism is composed of driving means for generating a relative rotation driving force between the first rotating disc and the second rotating disc while maintaining a state where the first rotating disc and the second rotating disc are together rotated.

24. The projection type video display according to claim 23, wherein
one of the rotating discs is provided with an actuator, and a rotation driving force is applied to the other rotating disc from the actuator.

25. The projection type video display according to claim 23, wherein
one of the rotating discs is provided with one constituent portion of a magnetic force actuator, and the other rotating disc is provided with the other constituent portion of the magnetic force actuator.

26. The projection type video display according to claim 20, wherein
the light deflecting means is constructed by putting a first rotating disc having at least two spiral light transmitters and a second rotating disc having a spiral light transmitter for adjustment corresponding to the spiral light transmitter close together, and
there is further provided a width adjusting mechanism for changing and setting a relative rotation angle between the first rotating disc and the second rotating disc around its rotation axis, to adjust the width of the spiral light transmitter.

27. The projection type video display according to claim 26, wherein
the width adjustment mechanism comprises
means for forming a direct or indirect meshed state between the first rotating disc and the second rotating disc and releasing the meshed state, and
means for releasing the meshed state after stopping the rotation of the first rotating disc and the second rotating disc, to fix either one of the first rotating disc and the second rotating disc and rotate the other rotating disc.

28. The projection type video display according to claim 26, wherein
the width adjusting mechanism is composed of driving means for generating a relative rotation driving force between the first rotating disc and the second rotating disc while maintaining a state where the first rotating disc and the second rotating disc are together rotated.

29. The projection type video display according to claim 28, wherein
one of the rotating discs is provided with an actuator, and a rotation driving force is applied to the other rotating disc from the actuator.

30. The projection type video display according to claim 28, wherein
one of the rotating discs is provided with one constituent portion of a magnetic force actuator, and the other rotating disc is provided with the other constituent portion of the magnetic force actuator.

31. The projection type video display according to claim 1, wherein
the light deflecting means comprises at least two light deflecting elements, and periodically produces at least two different scrolling lights, and
there is further provided video signal correcting means for subjecting the input video signal to luminance value correction corresponding to each of at least the two different scrolling lights for each irradiation period of the scrolling light.

32. The projection type video display according to claim 31, wherein
there is provided means which receives the video signal to control the rotation driving of the light deflecting means in synchronization with a synchronizing signal in the video signal,
the video signal correcting means comprises a plurality of correction tables corresponding to at least the two scrolling lights,
the correction table is selected by phase information in the rotation of the light deflecting means, and
an address is generated on the basis of the synchronizing signal in the video signal, to read out correction data from the selected correction table.

33. The projection type video display according to claim 32, comprising
image photographing means, and
means for producing a plurality of correction tables on the basis of luminance information in each area at the time of projecting a predetermined image on a screen obtained by the image photographing means and phase information in the rotation of the light deflecting means.

34. The projection type video display according to claim 32, wherein
the correction table also serves as a correction table for correcting color nonuniformity.

35. The projection type video display according to claim 1, comprising
means for driving a light source by a pulse which is synchronized with the video signal, and
means for controlling the rotation driving of the light deflecting means in synchronization with the video signal.

36. The projection type video display according to claim 35, comprising
frequency multiplying circuit for converting the pulse into a positive number multiple of the synchronizing signal.

37. The projection type video display according to claim 1, wherein
the lights in the respective colors separated by the color separating means are introduced into the hold type elements in the respective colors in optical path lengths which are equal to one another.

38. The projection type video display according to claim 37, wherein
means for separating two of the lights in the three primary colors and the other light and means for recombining the separated lights in the three primary colors are arranged on an optical axis of the lights which have not been separated,
the optical path of the two lights and the optical path of the one light are symmetrical about the optical axis, and
one of the two lights is separated at a halfway portion on the optical path of the two lights and is introduced onto the optical axis.

39. The projection type video display according to claim 37, further comprising
optical means in a rectangular parallelepiped shape serving as means for recombining the image lights in the respective colors,
one surface of the optical means in a rectangular parallelepiped shape being a light exit surface, a surface oppositely facing the light exit surface being a light entrance surface at the center, and right and left surfaces thereof being light entrance surfaces on the right and left sides,
first color separating means for separating white light into lights having the two primary color components and a light having the other primary color component, second color separating means for separating the lights having the two primary color components into two lights having the one primary color component, and a double-face mirror arranged on the incident side of the hold type display element arranged on the light entrance surface at the center so as to be inclined at 45 degrees to its light incident optical axis, and in that the optical axis of the light having the one primary color component separated by the first color separating means and the optical axis of the light having the one primary color component separated by the second color separating means are set so as to cross each other, and the double-face mirror is arranged at the position where the optical axes cross each other.

40. The projection type video display according to claim 39, wherein the optical means in a rectangular parallelepiped shape, the hold type display element arranged on the light entrance surface at the center, the double-face mirror, and the first color separating means are arranged on one straight line.

41. The projection type video display according to claim 40, wherein the light deflecting means is arranged with its optical axis matched with the straight line.

42. The projection type video display according to claim 40, wherein the light deflecting means is provided with its optical axis crossing the straight line at right angles.

43. The projection type video display according to claim 1, wherein the light deflecting means is arranged on the optical path of the light in each of the colors in the color separation optical system.

44. In a rotation driving type illuminating device for circularly deflecting, in receiving light irradiated from a light source and transmitting the received light, the light, an illuminating device comprising:

a rod prism which is foldable such that the light entrance direction and the light exit direction differ, and a cylindrical member having light transmitters and reflectors alternately formed periodically on its surface, the whole or a part of the rod prism being positioned inside the cylindrical member, wherein the cylindrical member is rotated so that the irradiated light is scrolled.

* * * * *